(12) United States Patent
Okamoto et al.

(10) Patent No.: US 11,198,473 B2
(45) Date of Patent: Dec. 14, 2021

(54) SUBFRAME STRUCTURE

(71) Applicant: Mazda Motor Corporation, Hiroshima (JP)

(72) Inventors: Hiroyuki Okamoto, Bath (GB); Masaaki Tanaka, Hiroshima (JP); Masaya Hiramatsu, Hiroshima (JP); Yuki Hayakawa, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/970,762

(22) PCT Filed: Feb. 12, 2019

(86) PCT No.: PCT/JP2019/004892
§ 371 (c)(1),
(2) Date: Aug. 18, 2020

(87) PCT Pub. No.: WO2019/163582
PCT Pub. Date: Aug. 29, 2019

(65) Prior Publication Data
US 2021/0009206 A1    Jan. 14, 2021

(30) Foreign Application Priority Data

Feb. 20, 2018 (JP) .............................. JP2018-027989
Jun. 6, 2018 (JP) .............................. JP2018-108656
Sep. 19, 2018 (JP) .............................. JP2018-175215

(51) Int. Cl.
*B62D 21/11* (2006.01)
*B62D 21/03* (2006.01)
*B62D 21/15* (2006.01)

(52) U.S. Cl.
CPC .............. *B62D 21/11* (2013.01); *B62D 21/03* (2013.01); *B62D 21/155* (2013.01)

(58) Field of Classification Search
CPC ...... B62D 21/03; B62D 21/11; B62D 21/155; B62D 25/082; B62D 25/085
See application file for complete search history.

(56) References Cited

U.S. PATENT DOCUMENTS 8,393,673 B2 *   3/2013   Terada ................. B62D 21/152
                                                   296/193.09
8,490,988 B2 *   7/2013   Takeshita ............ B62D 21/155
                                                   280/124.109
(Continued)

FOREIGN PATENT DOCUMENTS

DE   112013001681 T5   1/2015
JP   2007216901 A *    8/2007
(Continued)

OTHER PUBLICATIONS

European Patent Office, Extended European Search Report Issued in Application No. 19756810.8, dated Feb. 8, 2021, Germany, 7 pages.

*Primary Examiner* — Laura Freedman
(74) *Attorney, Agent, or Firm* — Alleman Hall Creasman & Tuttle LLP

(57) ABSTRACT

A subframe structure includes a subframe disposed below a vehicle body structure of a vehicle, and an extension frame extending forward from the subframe and configured to absorb an impact load from forward of a vehicle body. The subframe has a body part extending in a vehicle front-and-rear direction and a mount support part supporting a power train through a mount. The body part is fixed to the vehicle body structure through the mount support part.

13 Claims, 30 Drawing Sheets

(56) References Cited

U.S. PATENT DOCUMENTS

| | | | |
|---|---|---|---|
| 8,794,370 B2* | 8/2014 | Hiramatsu | B60K 17/16 |
| | | | 180/378 |
| 9,505,295 B2* | 11/2016 | Watanabe | B62D 21/11 |
| 9,567,009 B2* | 2/2017 | Asano | B62D 21/11 |
| 10,118,643 B2* | 11/2018 | Komiya | B60K 5/12 |
| 10,220,880 B2* | 3/2019 | Ayukawa | B62D 25/08 |
| 10,967,905 B2* | 4/2021 | Okamoto | B62D 21/11 |
| 2014/0152051 A1 | 6/2014 | Saitou et al. | |
| 2015/0021115 A1 | 1/2015 | Komiya | |
| 2017/0166258 A1 | 6/2017 | Kim et al. | |
| 2021/0024132 A1* | 1/2021 | Okamoto | B62D 21/11 |
| 2021/0024134 A1* | 1/2021 | Okamoto | B62D 21/15 |
| 2021/0024135 A1* | 1/2021 | Okamoto | B62D 21/155 |
| 2021/0024137 A1* | 1/2021 | Okamoto | B62D 21/11 |

FOREIGN PATENT DOCUMENTS

| | | |
|---|---|---|
| JP | 2011240787 A | 12/2011 |
| JP | 2013203243 A | 10/2013 |
| JP | 2014084046 A | 5/2014 |
| JP | 2014144715 A | 8/2014 |
| JP | 2015058856 A | 3/2015 |
| JP | 2015231781 A | 12/2015 |

* cited by examiner

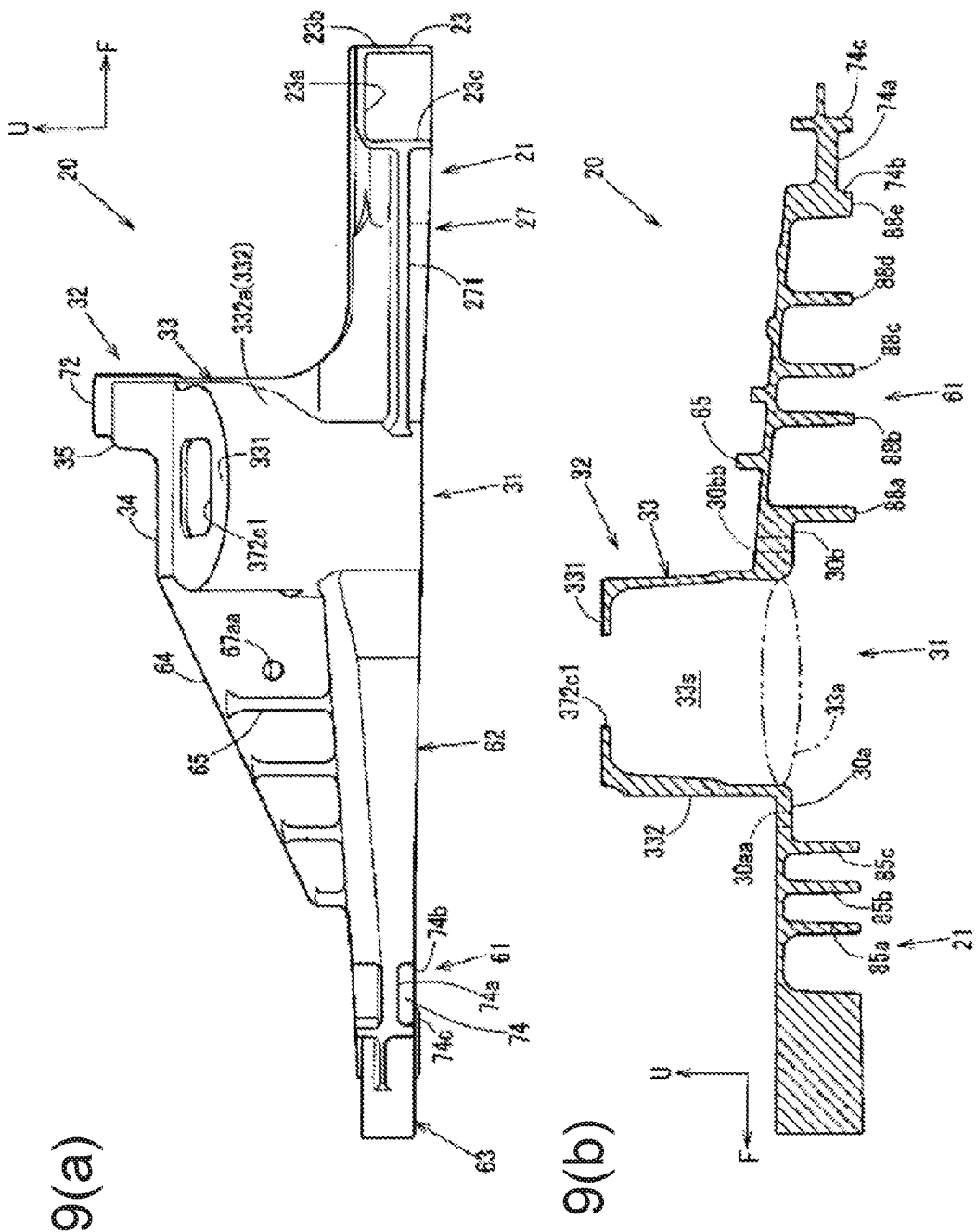

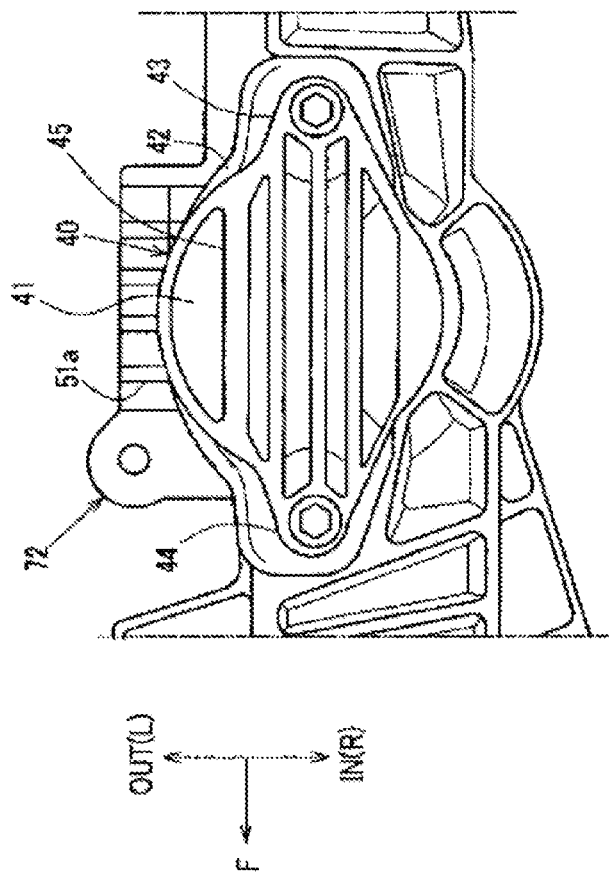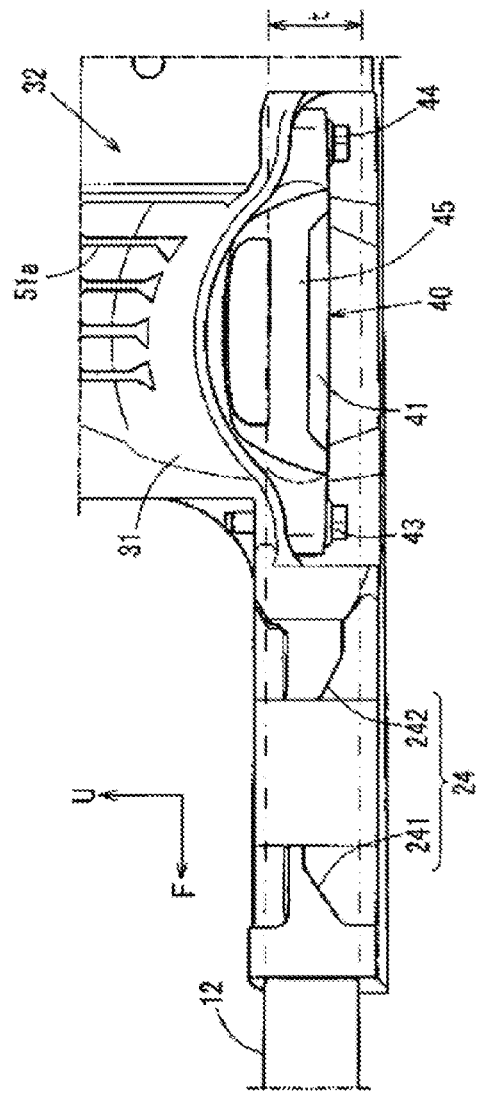
FIG. 11(a)
FIG. 11(b)

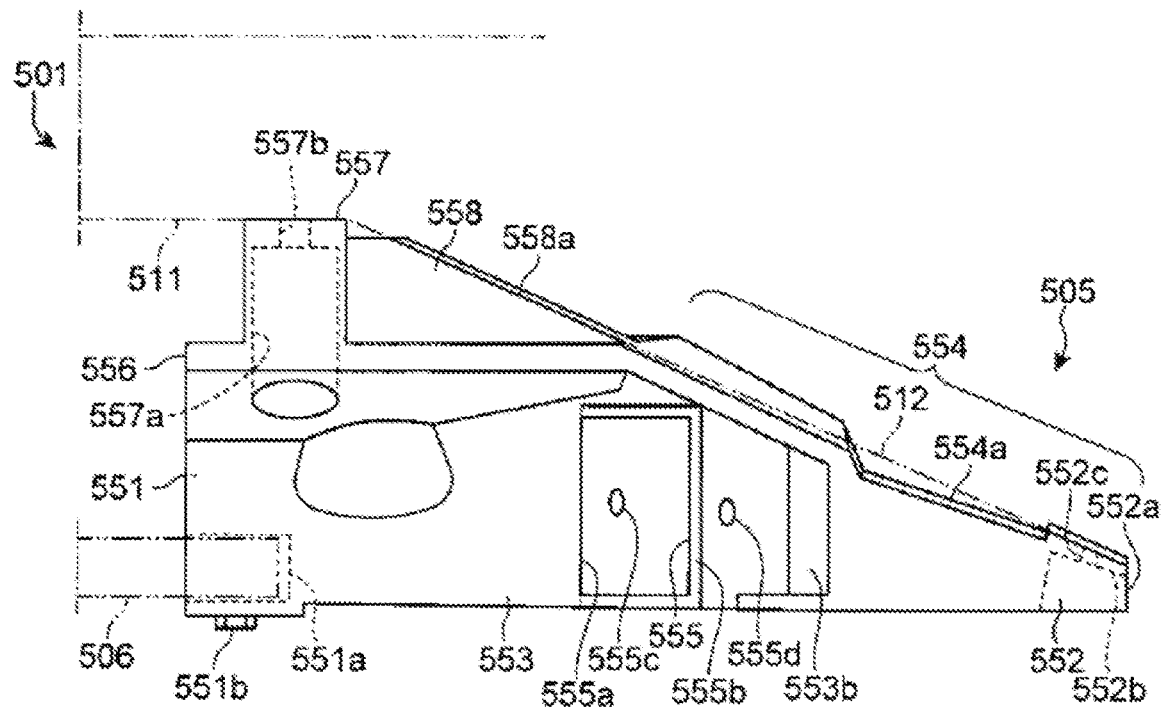
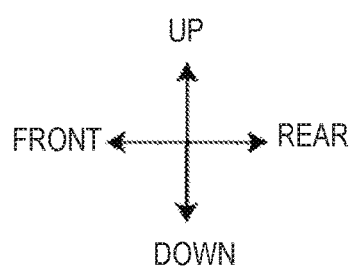
FIG. 18

SUBFRAME STRUCTURE

TECHNICAL FIELD

The present disclosure relates to a subframe structure, and belongs to a technical field of a vehicle body structure of a vehicle, such as an automobile.

BACKGROUND ART

Generally, as a vehicle body front part structure, it is known that a pair of left and right frontside frames which extend in the front-and-rear direction of a vehicle and support a front part of a vehicle body are provided, and a subframe which supports a power train is disposed below the frontside frames.

Patent Document 1 discloses a vehicle body front part structure which adopts a subframe structure including a subframe which has left and right side parts disposed below frontside frames, and a front side part which connects front ends of the left and right side parts in the width direction, and opens rearwardly and is formed in a U-shape in the plan view, tower members which stand up from the left and right side parts and are connected to lower surfaces of the frontside frames, and a pair of extension frames which extend forward from intermediate locations of the tower members in the up-and-down direction, and collaboratively deform with the frontside frames when a front collision of the vehicle occurs to absorb the impact.

The subframe disclosed in Patent Document 1 has a function to support a power train through mount support members fixedly fastened to the side parts. Further, the tower members provided to the subframe dividedly transmit load inputted via an extension frame from forward of the vehicle body to left and right side parts of the extension frame and an upper frontside frame. That is, the tower members certainly receive the input load from forward of the vehicle body to promote impact absorption by the extension frame while preventing rearward movement of the power train.

Thus, the subframe structure disclosed in Patent Document 1 achieves, by the structure described above, both the mount support function of the power train and the impact absorbing function from forward of the vehicle body during the impact-load input.

Meanwhile, there is a demand of reducing the vehicle weight and the number of components of the vehicle body front part structure including the subframe.

Therefore, it is thought that the subframe structure disclosed in Patent Document 1 is effective when it is constructed without having the robust tower members which extend in the up-and-down direction from the subframe to the frontside frame.

However, for example, if the subframe structure is simply constructed without the tower members, a load path through which the load inputted via the extension frame is transmitted to the frontside frame on a vehicle body side will not be formed.

Thus, the subframe needs to independently bear the function for promoting the impact absorption by the extension frame while preventing the rearward movement of the power train against the frontal collision input load.

Therefore, when the subframe independently receives the impact load inputted into the subframe, since between the mount support function of the power train and the forward impact absorbing function which the subframe bears, the burden of the latter particularly becomes larger, a certain measure is needed for properly achieving both the functions.

Meanwhile, in a vehicle where the power train is supported by the subframe through a PT mount, some of vibration of the power train which cannot be absorbed by the PT mount is propagated to the vehicle body via the subframe.

Therefore, as a conventional common measure for the vibration, in addition to attenuating the vibration of the power train by the PT mount, a measure to attenuate the vibration described above is also adopted to a path from a mount support part to the vehicle body via the subframe. In detail, for example, prevention of the transmission of the vibration of the power train to the vehicle body is achieved by extending the length of the vibration transmitting path from the mount support part to the vehicle body via the subframe, and adding a damping member, such as a rubber bush, between the subframe and the vehicle body.

Note that according to the concept described above of the subframe structure disclosed in Patent Document 1, both of the vibration transmitting path from the mount support part to the vehicle body via the front part of the subframe and the tower members, and the vibration transmitting path from the mount support part to the vehicle body via the rear part of the subframe, are extended.

DESCRIPTION OF THE DISCLOSURE

Problem to be Solved by the Disclosure

However, when the length of the vibration transmitting path from the mount support part to the vehicle body via the subframe, like in the conventional art, is extended, and when the damping member other than the PT mount is provided in the path, the present inventors found that it becomes difficult for the PT mount to demonstrate the aimed damping performance of the passage, depending on the mode of attenuation of the vibration in the path. Therefore, in the subframe structure having the mount support part, there is room for improvement in effectively reducing the vibration of the power train.

The present disclosure is made in view of such a situation, and one purpose thereof is to provide a subframe structure which more effectively reduces vibration of a power train, while achieving both a PT mount function of the subframe and an impact absorbing function during an impact-load input from forward of a vehicle body, and achieving a reduction in the weight of a vehicle and a reduction in the number of components.

SUMMARY OF THE DISCLOSURE

First, the present disclosure according to a first aspect is characterized in that a subframe structure includes a subframe disposed below a vehicle body structure of a vehicle, and an extension frame extending forward from the subframe and configured to absorb an impact load from forward of a vehicle body. The subframe has a body part extending in a vehicle front-and-rear direction and a mount support part supporting a power train through a mount. The body part is fixed to the vehicle body structure through the mount support part.

Note that the "vehicle body structure" used herein indicates a part configuring a frame of the vehicle body of the vehicle.

Moreover, the present disclosure according to a second aspect may be characterized in the first aspect that the mount support part and the vehicle body structure are rigidly coupled, without having an attenuating element therebetween.

Moreover, the present disclosure according to a third aspect may be characterized in the first or second aspect that the mount support part is provided with an accommodating part configured to permit a connection of the mount with a bracket provided to the power train side and accommodate the mount therein from below, a vehicle body attaching part extending upward from near the accommodating part, and a reinforcement part disposed between the accommodating part and the vehicle body attaching part, and reinforcing between the accommodating part and the vehicle body attaching part.

Moreover, the present disclosure according to a fourth aspect may be characterized in the third aspect that the reinforcement part is a rib connecting the vehicle body attaching part and a part of the accommodating part below the vehicle body attaching part, between the vehicle body attaching part and the part of the accommodating part.

Moreover, the present disclosure according to a fifth aspect may be characterized in the third or fourth aspect that the vehicle body attaching part is disposed adjacent to the accommodating part in a bottom view.

Moreover, present disclosure according to a sixth aspect may be characterized in any one of the first to fifth aspects that the body part and the mount support part are separate parts, a cross member extending inward from the body part in a vehicle width direction is coupled to the body part, and the mount support part is fixed to the body part and the cross member.

Moreover, the present disclosure according to a seventh aspect may be characterized in the first or second aspect that the subframe includes a pair of left and right subframes. Each of the subframes further includes a link support part supporting a suspension link, a rear vehicle body attaching part fixing the body part to the vehicle body structure at a location rearward of the link support part, and a second vehicle body attaching part fixing the body part to the vehicle body structure at a location forward of the link support part. The suspension link extends forward from the link support part. A rotational axis of the suspension link is provided so as to intersect with a line segment connecting between the rear vehicle body attaching part and the second vehicle body attaching part.

Moreover, the present disclosure according to a eighth aspect may be characterized in any one of the first to seventh aspects that the vehicle body structure includes a frontside frame extending in a vehicle front-and-rear direction above the extension frame and the body part, and the subframe is fixed to the frontside frame.

[Effect of the Disclosure]

According to the present disclosure according to a first aspect, since the body part of the subframe is fixed to the vehicle body structure through the mount support part, the vibration of the power train which cannot be absorbed by the mount can be transmitted to the vehicle body, without being transmitted via the body part from the mount support part. That is, a vibration transmitting path from the mount support part to the vehicle body is formed short compared to a path from the mount support part via the body part of the subframe to the vehicle body as in a conventional case. Therefore, the path from the mount support part to the vehicle body as a whole can demonstrate a vibration characteristic close to a rigid body, and thus, by the mount demonstrating the desired damping characteristic, the vibration of the power train can be effectively reduced.

That is, as schematically illustrated in FIG. 30, the vibration of the power train is inputted into the subframe, and further to the vehicle body, mainly through a rubber of the mount (hereinafter, may be referred to as the "mount rubber") and the mount support part. In this system, the vibration inputted into the vehicle body depends on the spring constant of the mount rubber and the spring constant and the attenuating element between the vehicle body and the mount support part.

The spring constant of the mount rubber can be optimized in its characteristics so as to reduce the vibration to be inputted from the power train into the vehicle body. But, even if the spring constant of the mount rubber is optimized in this way, it may not function as the characteristics depending on the spring constant or the attenuating element between the vehicle body and the mount support part.

In this regard, according to the present disclosure of the first aspect, since the path from the mount support part to the vehicle body as a whole can demonstrate a vibration characteristic close to a rigid body, the spring constant between the vehicle body and the mount support part can be improved and the attenuating element is eliminated as much as possible. Thus, the mount demonstrates the desired damping performance and the vibration of the power train can be reduced effectively.

Moreover, according to the present disclosure of the second aspect, since the mount support part and the vehicle body structure are rigidly coupled without having the attenuating element, such as a rubber bush, therebetween, the vibration characteristic of the vibration transmitting path from the mount support part to the vehicle body can be closer to a rigid body. Thus, totally different from the conventional measure in which the attenuating element other than the mount is added to the vibration transmitting path from the mount support part via the subframe to the vehicle body, the mount can surely demonstrate the desired damping performance. As a result, the vibration of the power train can be effectively reduced.

Moreover, according to the present disclosure of the third aspect, the support rigidity of the PT mount can be increased, and the reinforcement part can increase the rigidity between the accommodating part and the vehicle body attaching part which is the vibration transmitting path of the power train. Therefore, the spring constant between the accommodating part and, thus, the vehicle body attaching part increases and the mount can surely demonstrate the desired damping performance.

Moreover, according to the present disclosure of the fourth aspect, the transmitting path for transmitting again upward, among the vibration of the power train inputted into the upper wall part, the vibration that was previously transmitted below an upper wall part of the accommodating part, can be constituted by the rib extending in the up-and-down direction.

Moreover, according to the present disclosure of the fifth aspect, the reinforcement part and the vehicle body attaching part can reinforce the perimeter of the accommodating part against the vibration inputted into the PT mount from the power train.

Moreover, according to present disclosure of the sixth aspect, since the mount support part is fixed not only to the body part of the subframe but also to the cross member extending inward from the body part in the vehicle width direction, the mount support part can be supported by the large area in the vehicle width direction. Thus, when the body part and the mount support part are separately provided, a displacement of the mount support part leaning inwardly in the vehicle width direction is suppressed.

Moreover, according to the present disclosure of the seventh aspect, since the attaching parts of the subframe to the vehicle body are provided at two locations in the vehicle front-and-rear direction, including the rear vehicle body attaching part and the second vehicle body attaching part, the support rigidity of the subframe is increased.

Moreover, since the link support part is provided to the subframe and the suspension link extends forward from the link support part, the load in the front-and-rear direction is inputted into the support part from the suspension link.

Since the rotational axis of the suspension link is provided so as to intersect with a line segment connecting between the rear vehicle body attaching part and the second vehicle body attaching part, for example, when the load in the vehicle front-and-rear direction is inputted into the link support part of the subframe, the input load can be efficiently received by the vehicle body. As a result, increases in the weight and the size of the structure by increasing the rigidity of the subframe can be avoided.

Moreover, according to the present disclosure of the eighth aspect, the load inputted from forward of the vehicle body can be received collaboratively by the path for transmitting from the frontside frame to rearward of the vehicle body and the path for transmitting from the extension frame described above via the body part of the subframe to the vehicle body. Thus, by these two paths surely absorbing the impact, influences on the interior of the vehicle can be suppressed.

BRIEF DESCRIPTION OF DRAWINGS

FIG. 9(a) is a side view of the subframe when seen from inward in the width direction, and FIG. 9(b) is a cross-sectional view taken along a line Q2-Q2 of FIG. 8.

FIG. 11(a) is an enlarged bottom view of a substantial part of the subframe provided with the hold member, and FIG. 11(b) is an enlarged side view of the substantial part when seen from outward in the width direction.

FIG. 18 is a side view illustrating the subframe of the second embodiment.

MODES FOR CARRYING OUT THE DISCLOSURE

Figure 1:
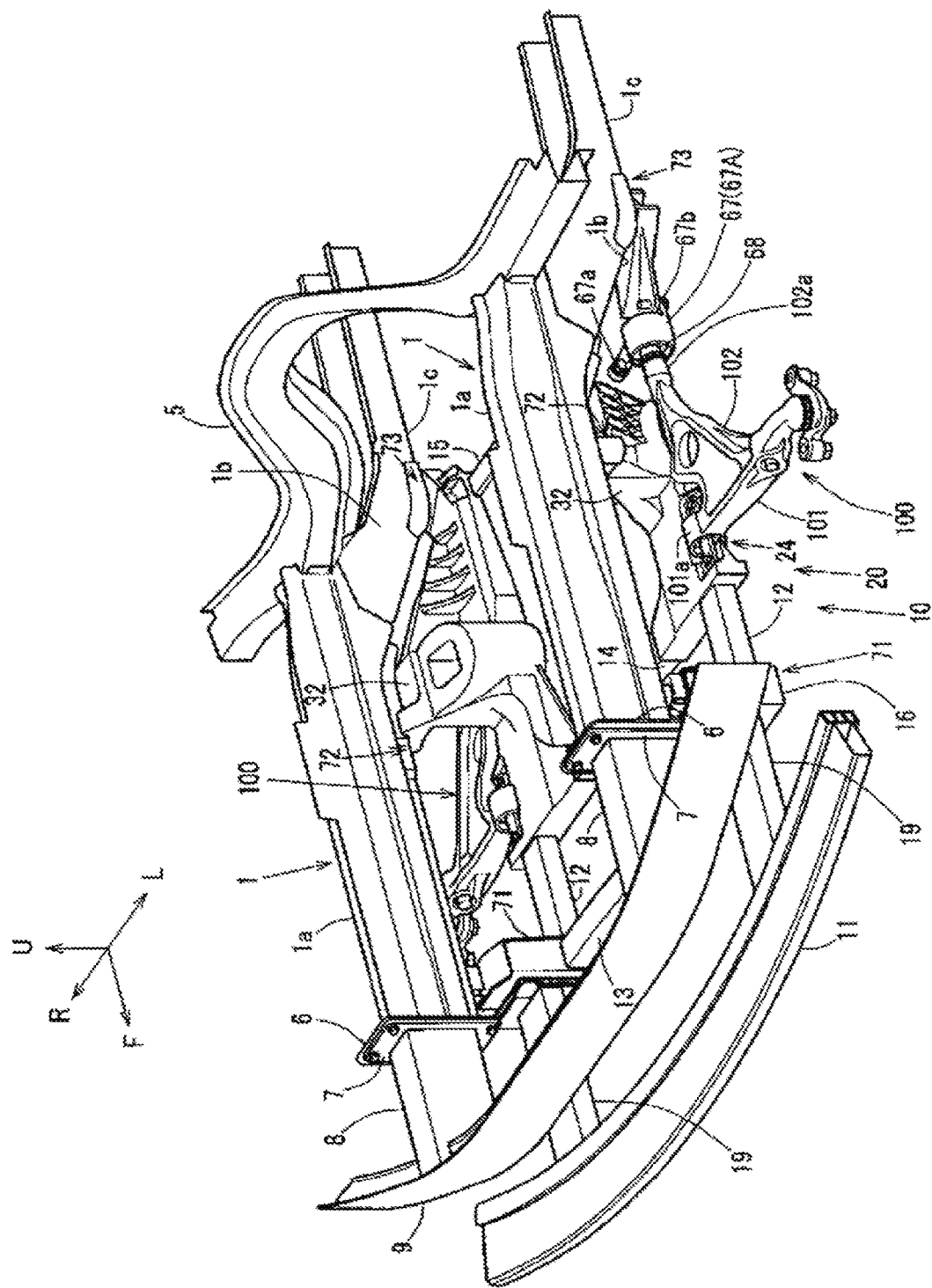
FIG. 1 is a perspective view of a vehicle body font part provided with a subframe structure of a first embodiment.

Hereinafter, a subframe structure according to the present disclosure will be described in detail for every embodiment with reference to the accompanying drawings.

First Embodiment

A subframe structure 10 according to a first embodiment of the present disclosure is described with reference to FIGS. 1 to 12.

Note that in the drawings, an arrow F indicates forward of the vehicle, an arrow R indicates a rightward of the vehicle, an arrow L indicates leftward of the vehicle, an arrow U indicates upward of the vehicle, an arrow OUT indicates outward in a vehicle width direction, and an arrow IN indicates inward in the width direction.

Figure 2:
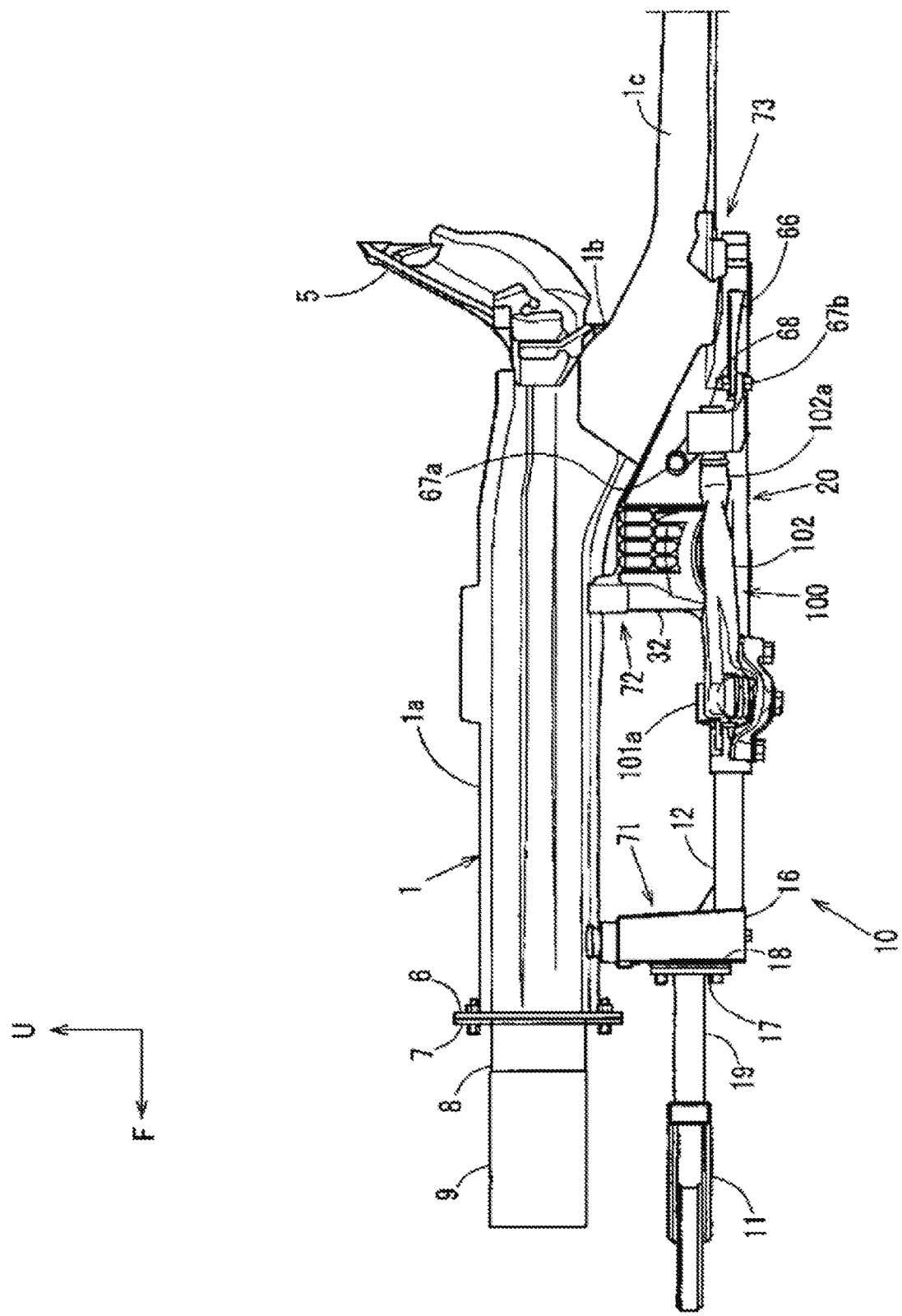
FIG. 2 is a side view of the vehicle body front part provided with the subframe structure of the first embodiment.
Figure 3:
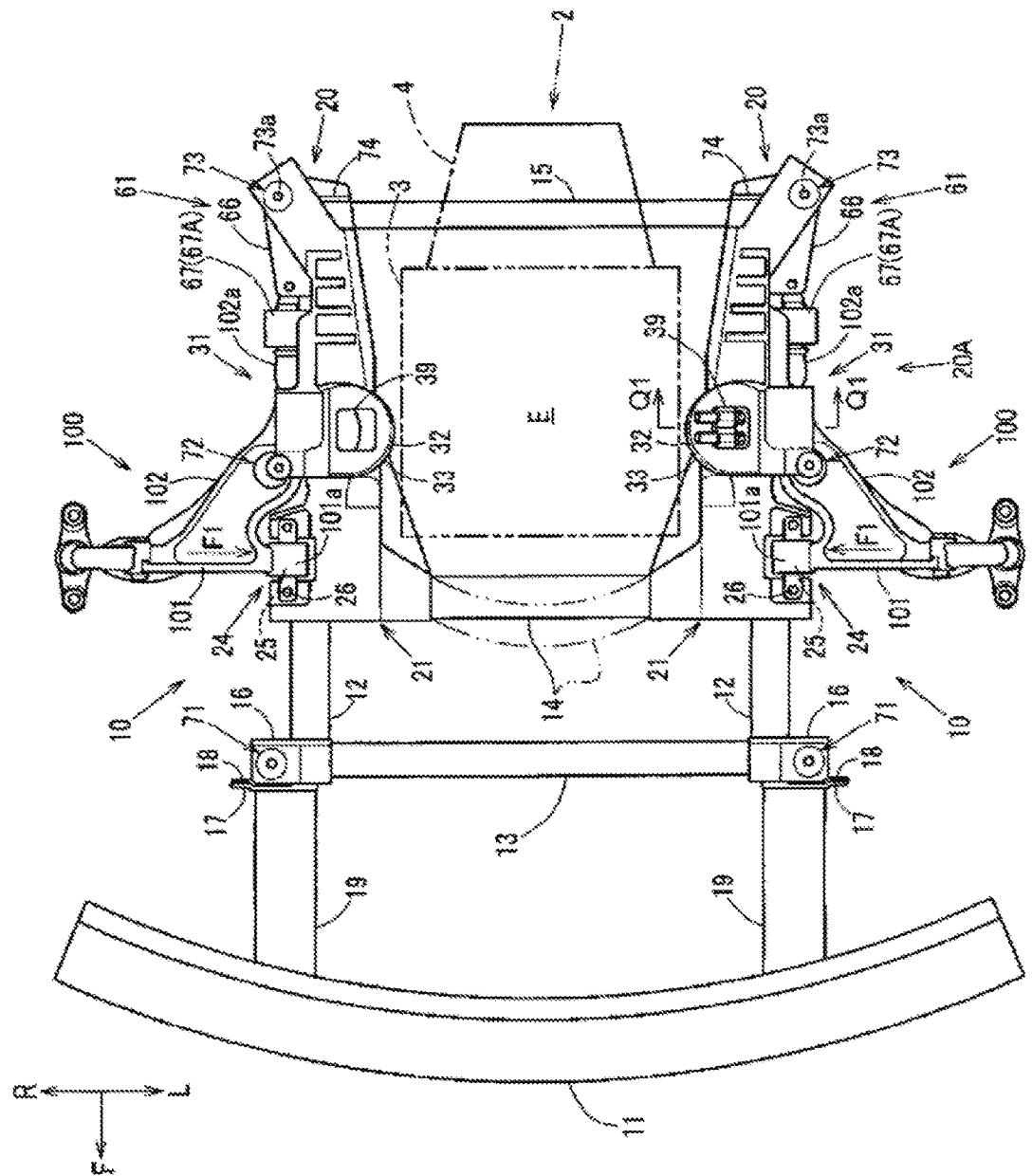
FIG. 3 is a plan view of the vehicle body front part provided with the subframe structure of the first embodiment.

FIGS. 1 to 3 illustrate a front part of a vehicle body structure provided with the subframe structure 10 of the first embodiment. First, the vehicle body front part structure is mainly described as a premise structure of the subframe structure 10 of this embodiment with reference to FIGS. 1 to 3.

As illustrated in FIGS. 1 and 2, a pair of left and right frontside frames 1 each comprised of a frame member as a reinforcement member extending in a vehicle front-and-rear direction is provided on both left and right side parts of an engine bay E (see FIG. 3). The frontside frames 1 constitute a part of the vehicle body structure of a vehicle. A dash cross 5 extending in the width direction is connected to rear parts of the frontside frames 1.

In this embodiment, a drive system is a Front-engine Rear-drive (FR), and as illustrated in FIG. 3, a power train 2 provided with a longitudinal engine 3 and a transmission 4 coupled to a rear part of the engine 3 is disposed in the engine bay E between the frontside frames 1.

As illustrated in FIGS. 1 and 2, each frontside frame 1 is provided with a front straight part 1a extending linearly forward from the dash cross 5, an inclined part 1b inclining downward and rearward from the dash cross 5, and a rear straight part 1c further extending linearly from a lower end of the inclined part 1b and connected to a floor frame (not illustrated). As illustrated in FIG. 2, each frontside frame 1 is formed so that the rear straight part 1c is lower than the front straight part 1a.

As illustrated in FIGS. 1 and 2, a pair of left and right main crash cans 8 each comprised of a cylindrical body which absorbs an impact of a collision is provided to a front end of the frontside frame 1 through a set plate 6 and an attaching plate 7. A bumper reinforcement 9 extending in the width direction is attached to front end faces of the pair of left and right main crash cans 8.

The subframe structure 10 which supports a lower arm 100 of a suspension device is disposed below each frontside frame 1.

As illustrated in FIGS. 1 to 3, the subframe structure 10 is mainly provided with a pair of left and right suspension subframes 20 (hereinafter, simply referred to as "subframes 20"), a pair of left and right extension frames 12, first and second front cross members 13 and 14 (see FIGS. 1 and 3), and a rear cross member 15 (see these drawings).

In a front part of the subframe structure 10, subcrash cans 19 extending forward from both left and right ends of the first front cross member 13 extending in the width direction at a front end of the subframe structure 10. As illustrated in FIG. 3, these subcrash cans 19 are connected to both the left and right ends of the first front cross member 13 respectively through a set plate 18 and an attaching plate 17. A subbumper beam 11 is provided to a part forward of the subcrash cans 19. This subbumper beam 11 is a so-called "leg-sweeping member" for preventing a secondary collision when the vehicle collides with a pedestrian, by sweeping the pedestrian's legs to make the pedestrian lean on an engine hood.

As illustrated in FIG. 2, each subframe 20 extends in the front-and-rear direction and is disposed below the front straight part 1a of the frontside frame 1 from an intermediate location thereof in the front-and-rear direction to the inclined part 1b, and as illustrated in FIG. 3, a front end of the subframe 20 is disposed forward of a front end of the engine 3. Note that the details of the subframe 20 will be described later.

The extension frame 12 is a frame member as a front collision load absorbing member extending linearly forward from a front end part of the subframe 20, and as illustrated in FIG. 2, it is disposed below a front part of the front straight part 1a of the frontside frame 1.

As illustrated in FIG. 3, the first front cross member 13 extends linearly so as to bridge between the front end parts of the pair of left and right extension frames 12 in the width direction.

Both left and right end parts of the first front cross member 13 extending in the width direction are each connected a front end part of the extension frame 12 and a rear end part of the subcrash can 19 at each of the left and right sides through a connecting member 16.

As illustrated in FIG. 2, the connecting member 16 is connected to the extension frame 12 at a lower part thereof, and is formed in a tower shape which extends upwardly from the connected part. Further, each connecting member 16 is formed in a hollow box shape, attaches an upper surface part of an outward part thereof in the width direction to a lower surface of the frontside frame 1 through a mount bush by using a fastening member (not illustrated), and constitutes a front vehicle body attaching part 71.

The set plate 18 which joins to a rear surface of the attaching plate 17 provided to a rear end of the subcrash can 19 is attached in abutted fashion to a vertical-wall-like front surface of each connecting member 16, and the subcrash can 19 is coupled to the connecting member 16 through the attaching plate 17 and the set plate 18.

Moreover, although it will be described later, vehicle body attaching parts (a middle vehicle body attaching part 72, a rear vehicle body attaching part 73) attached to the lower surface of each frontside frame 1 by the fastening member (not illustrated) are also provided to an outward part of the subframe 20 extending in the front-and-rear direction, at an intermediate location and a rear end (see FIGS. 1 to 3).

Thus, the subframe structure 10 is attached to the frontside frame 1 at the three locations (one side in the width direction) of the middle vehicle body attaching part 72, the rear vehicle body attaching part 73, and the front vehicle body attaching part 71.

That is, the subframe structure 10, particularly the subframe 20 adopts the structure in which it is attached to each frontside frame 1 at the two locations of the intermediate part in the front-and-rear direction (the middle vehicle body attaching part 72) and the rear part (the rear vehicle body attaching part 73), without being provided with the vehicle body attaching part attached to the lower surface of each frontside frame 1 in the front part of the subframe 20 (see FIG. 2).

The subframe 20 of the subframe structure 10 has, in addition to being provided with the vehicle body attaching parts 72 and 73 described above, a support function of the lower arm 100 and a support function of the power train 2, which will be described later. As illustrated in FIG. 3, the lower arm 100 has a front arm part 101 which is a suspension arm provided to the lower part of a suspension device (not illustrated) and extends substantially parallel to the width direction, and a rear arm part 102 which extends inwardly from an intermediate part of the front arm part 101 in the width direction and extends rearward substantially horizontally, and is formed in a substantially L-shape in the plan view. Moreover, a front coupling part 101a coupled to the front side of the subframes 20 and a rear coupling part 102a similarly coupled to the rear side are formed in inner ends of the front and rear arm parts 101 and 102 in the width direction, respectively (see FIGS. 1 to 3).

Below, the subframe structure 10 is described mainly using the subframe 20 with reference to FIGS. 1 to 12. Note that since the pair of left and right subframe structures 10 are symmetrically arranged and have a mirror shape in the left-and-right direction, the left structure is described below, unless otherwise particularly described.

Figure 4:
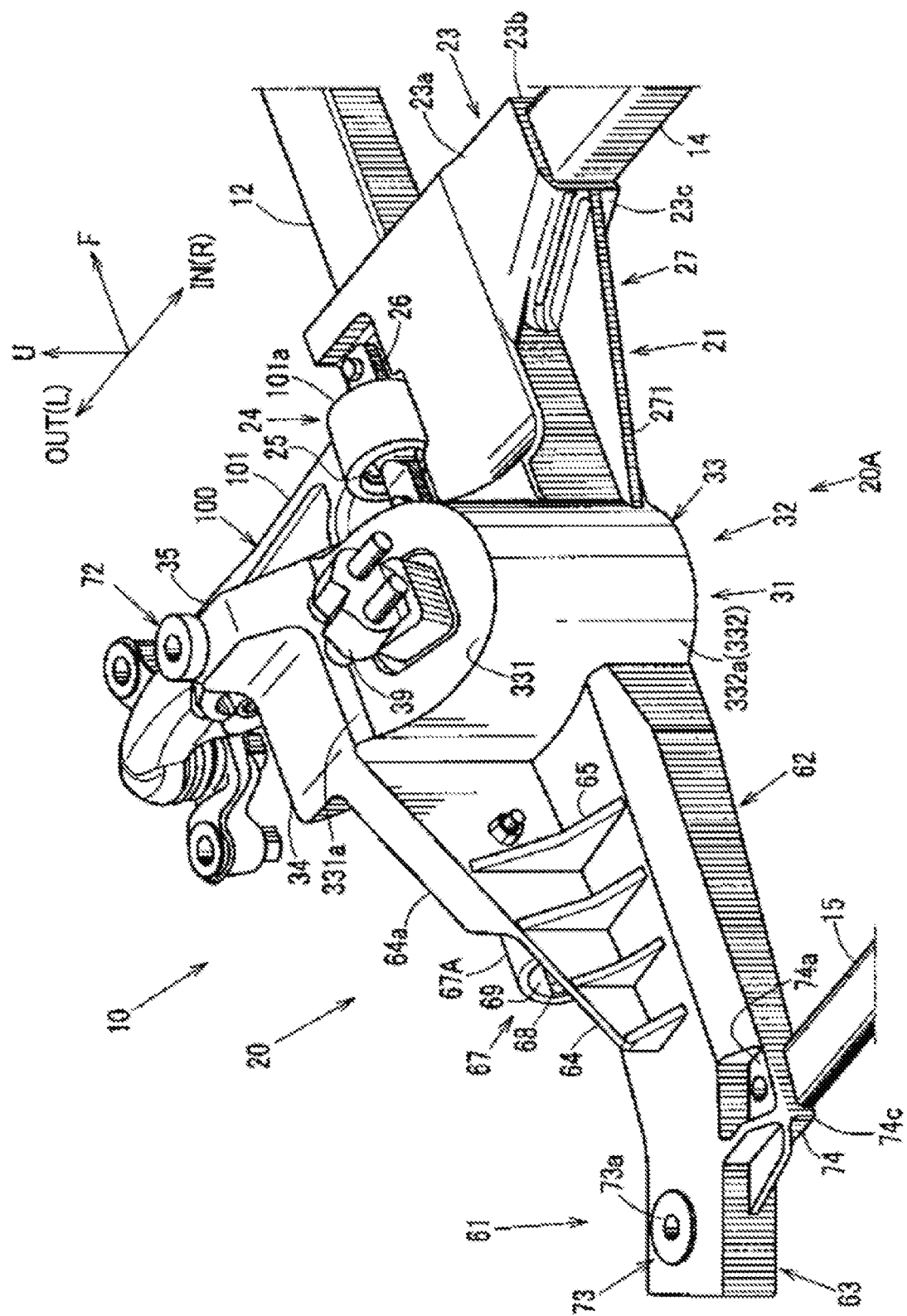
FIG. 4 is a perspective view of a subframe and its perimeter when seen from inward in a vehicle width direction and obliquely rearward and upward.

As illustrated in FIGS. 3 and 4, a body part 20A of the subframe 20 of the suspension subframe structure 10 has a front part 21 to which the extension frame 12 and the second front cross member 14 are connected, a rear part 61 to which the rear cross member 15 is connected, and a middle part 31 which connects the front part 21 with the rear part 61, and it is formed so as to extend in the front-and-rear direction as a whole. The subframe 20 is an aluminum block comprised of a member integrally molded by casting, such as aluminum die-casting. Note that the subframes 20 may be made of metal other than aluminum, such as iron.

Figure 5:
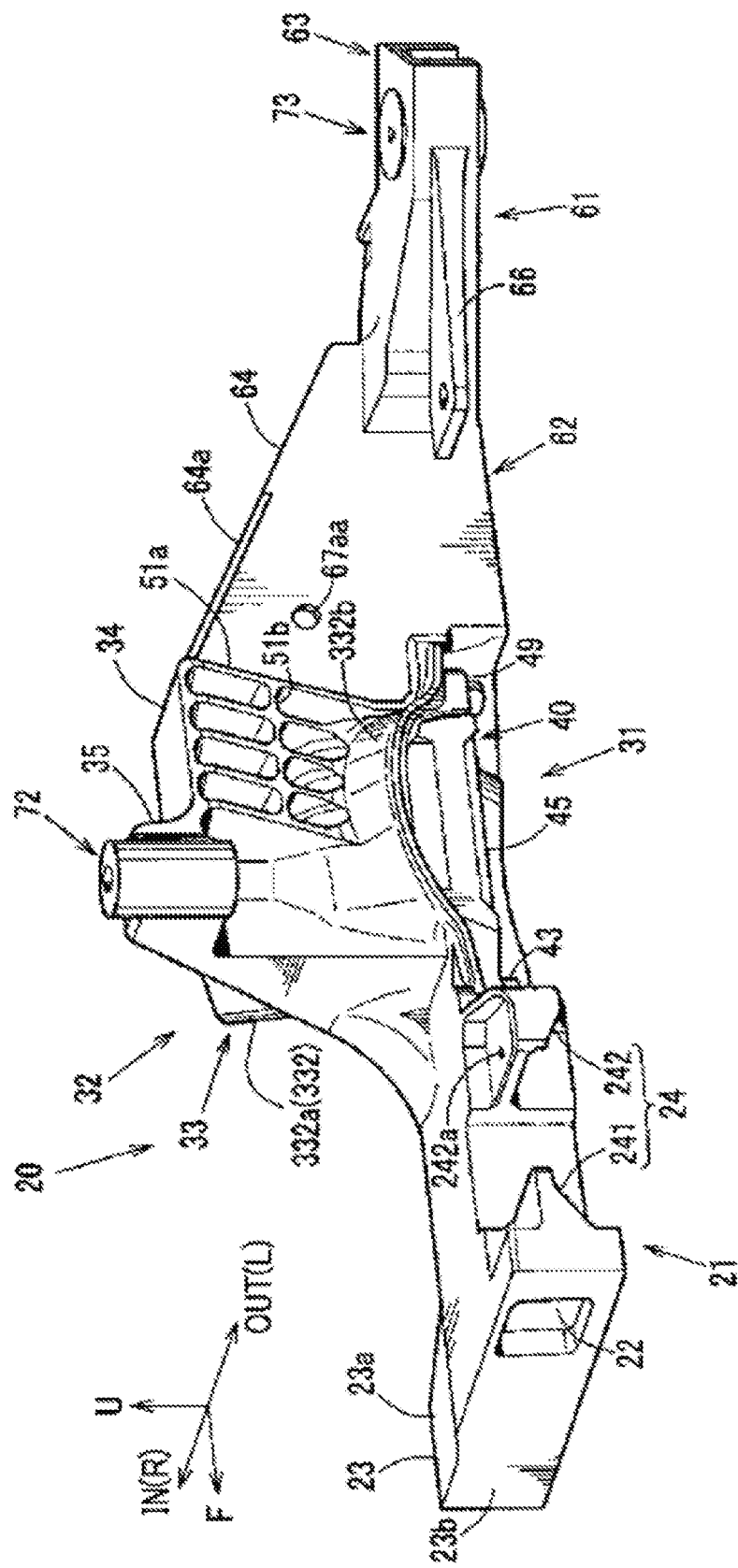
FIG. 5 is a perspective view of the subframe when seen from outward in the width direction and obliquely forward and upward.
Figure 6:
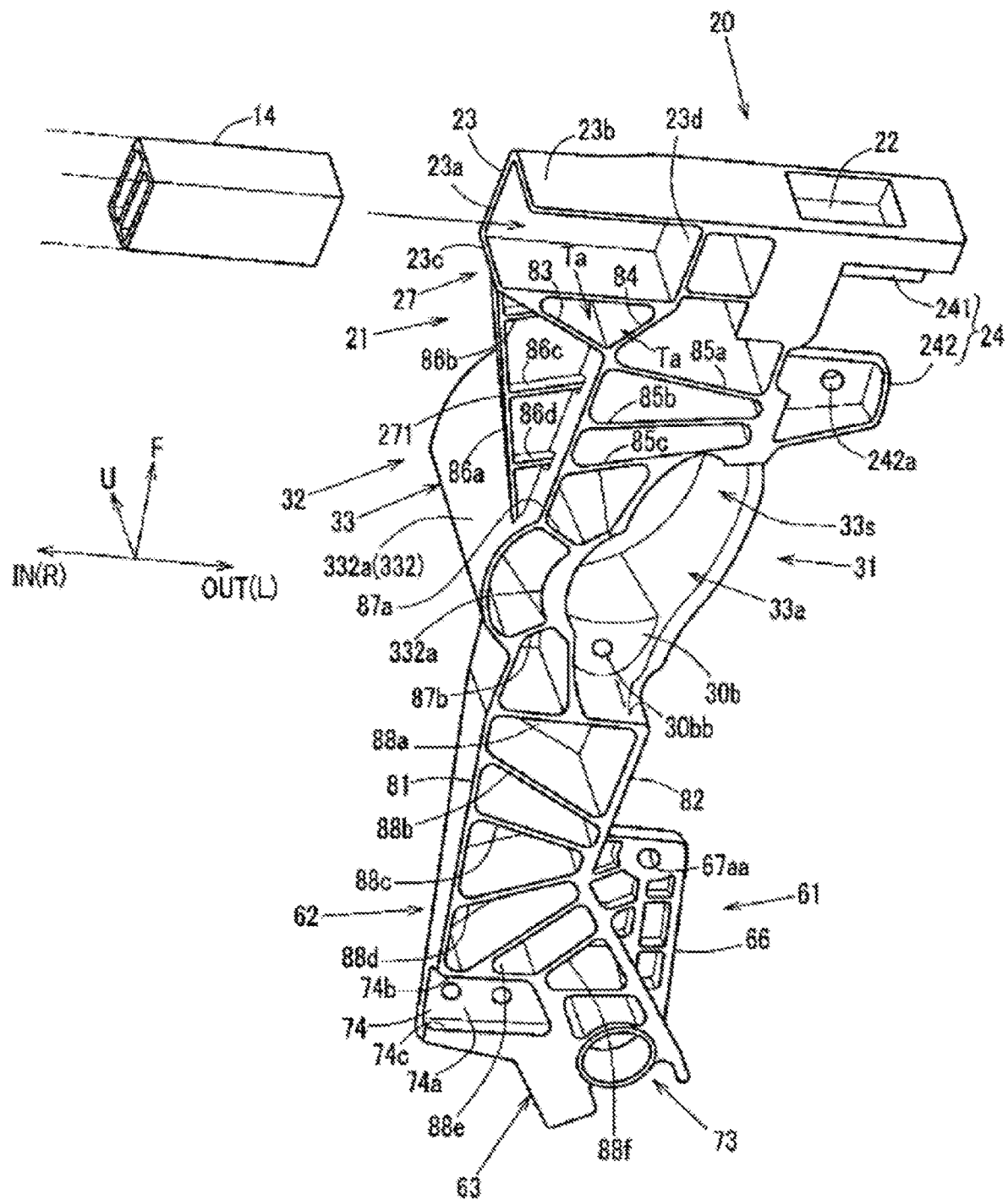
FIG. 6 is an exploded perspective view of the subframe and a part of a second front cross member when seen from downward.

As illustrated in FIGS. 5 and 6, in the front part 21, an insert part 22 into which a rear part of the extension frame 12 (see FIGS. 1 to 4) is inserted is formed in an outward and front part of the front part 21, in a form of a rearward recess from a front end. As illustrated in FIGS. 1 to 4, the extension frame 12 is integrally connected to the subframe 20 by the rear part thereof being inserted into the insert part 22.

As illustrated in FIGS. 4 to 6 and 8, in the front part of the front part 21, a guide recess 23 of which an inner edge extends inward of a rear part, and which is connected to an outer end part of the second front cross member 14 by inserting the outer end part therein is provided.

In the guide recess 23, an upper wall part 23a, a pair of guide wall parts 23b and 23c extending downwardly from both front and rear ends of the upper wall part 23a, and an outer wall part 23d extending downwardly from an outer end of the upper wall part 23a form a recess shape which opens downwardly and inwardly corresponding to the shape of the outer end part of the second front cross member 14 so that the second front cross member 14 is insertable therein (particularly, see FIG. 6).

As illustrated in FIGS. 4 and 6, the second front cross member 14 is integrally joined to the wall parts 23a-23c by welding, etc. while the outer end part is fitted into the guide recess 23. Thus, the second front cross member 14 extends linearly so as to bridge between the front parts of the pair of left and right subframes 20 in the width direction (see FIG. 3).

Particularly, the pair of guide wall parts 23b and 23c extend in the width direction so as to be adjacent to the second front cross member 14 from both the front and rear sides, and form a front guide rib and a rear guide rib which guide the second front cross member 14 from both the front and rear sides, respectively. Thus, the second front cross member 14 is joined to the front part 21 in a state where it is guided by the pair of front and rear guide wall parts 23b and 23c.

As illustrated in FIGS. 3 to 8, a front support part 24, which rotatably supports the front coupling part 101a (see FIGS. 3 and 4) provided to the inner end of the front arm part 101 of the lower arm 100, is formed in an outward part of the front part 21.

In detail, as illustrated in FIGS. 5 to 8, the front support part 24 is formed of a pair of front and rear attaching parts 241 and 242 in an outward part of the front part 21, each projecting outward in a flange shape and separated from each other in the front-and-rear direction. Bolt fastening holes 241a and 242a (see FIG. 8) are formed so as to penetrate the pair of front and rear attaching parts 241 and 242 in the up-and-down direction, respectively.

On the other hand, as illustrated in FIGS. 3 and 4, the front coupling part 101a of the lower arm 100 is provided with a shaft member 26 which extends in parallel to the front-and-rear direction and is inserted into an elastic bush 25 embedded in the front coupling part 101a. Both sides of this shaft member 26 outward of the elastic bush 25 in the axial direction are each formed in a flat flange shape so as to be supportable of a bolt head, and are installed on upper surfaces of the front and rear attaching parts 241 and 242 and are fixedly fastened to the upper surfaces with bolts, etc. in the bolt fastening holes 241a and 242a.

Thus, the shaft member 26 extends in the front-and-rear direction so as to bridge between the pair of front and rear attaching parts 241 and 242, and the elastic bush 25 embedded in the front coupling part 101a is pivotally supported by the shaft member 26.

Note that as described above, when the extension frame 12 connects to the insert part 22 (see FIGS. 5 and 6) formed outward of the intermediate location of the front surface of the subframe 20, at least a part of the extension frame 12 in the width direction overlaps with the front support part 24 which has high rigidity because the fastening part is provided thereto which fastens the front coupling part 101a of the lower arm 100. Therefore, when a front collision of the vehicle occurs, the subframe 20 improves the impact absorbing function of the extension frame 12.

As illustrated in FIGS. 4 and 6, a front overhang part 27 protruding inward from a base part of the subframe 20 extending in the front-and-rear direction is integrally formed at least in the front part 21 of the subframe 20.

This front overhang part 27 is constructed as a displacement reducing means which reduces a relative displacement of the second front cross member 14 with respect to the subframe 20, when a force in the width direction (lateral force) from the lower arm 100 is inputted into the subframe 20 of the subframe structure 10 while the vehicle travels.

In detail, by the force in the width direction (lateral force) being inputted into the subframes 20 of the subframe structure 10 from front wheels through the lower arms 100 while the vehicle travels, load (see arrows F1 in FIG. 3) may act on the pair of left and right subframes 20 so that a mutual spacing is narrowed in the width direction.

Accordingly, load may be inputted into the second front cross member 14 from the pair of left and right subframes 20 so that a center part thereof in the width direction is deformed to bulge forward (see the second front cross member 14 illustrated by imaginary lines in FIG. 3).

Meanwhile, in this embodiment, since priority is given to the impact load of the front collision crushing the extension frame 12 entirely to its rear end, the vehicle body attaching parts (71, 72, 73) are not provided to the front part of the subframes 20 of the subframe structure 10, as described above (see FIGS. 2 and 3). Particularly in such a structure, since the rigidity of the front parts of the subframes 20 tends to be lower as compared with the structure in which the vehicle body attaching parts are provided to the front parts of the subframes 20. As described above, it may become more difficult to secure the rigidity of the subframes 20 against the force in the width direction applied from the lower arm 100 while the vehicle travels.

Therefore, in this embodiment, as described above, the front overhang part 27 is provided to at least the front parts 21 of the subframes 20.

Figure 8:
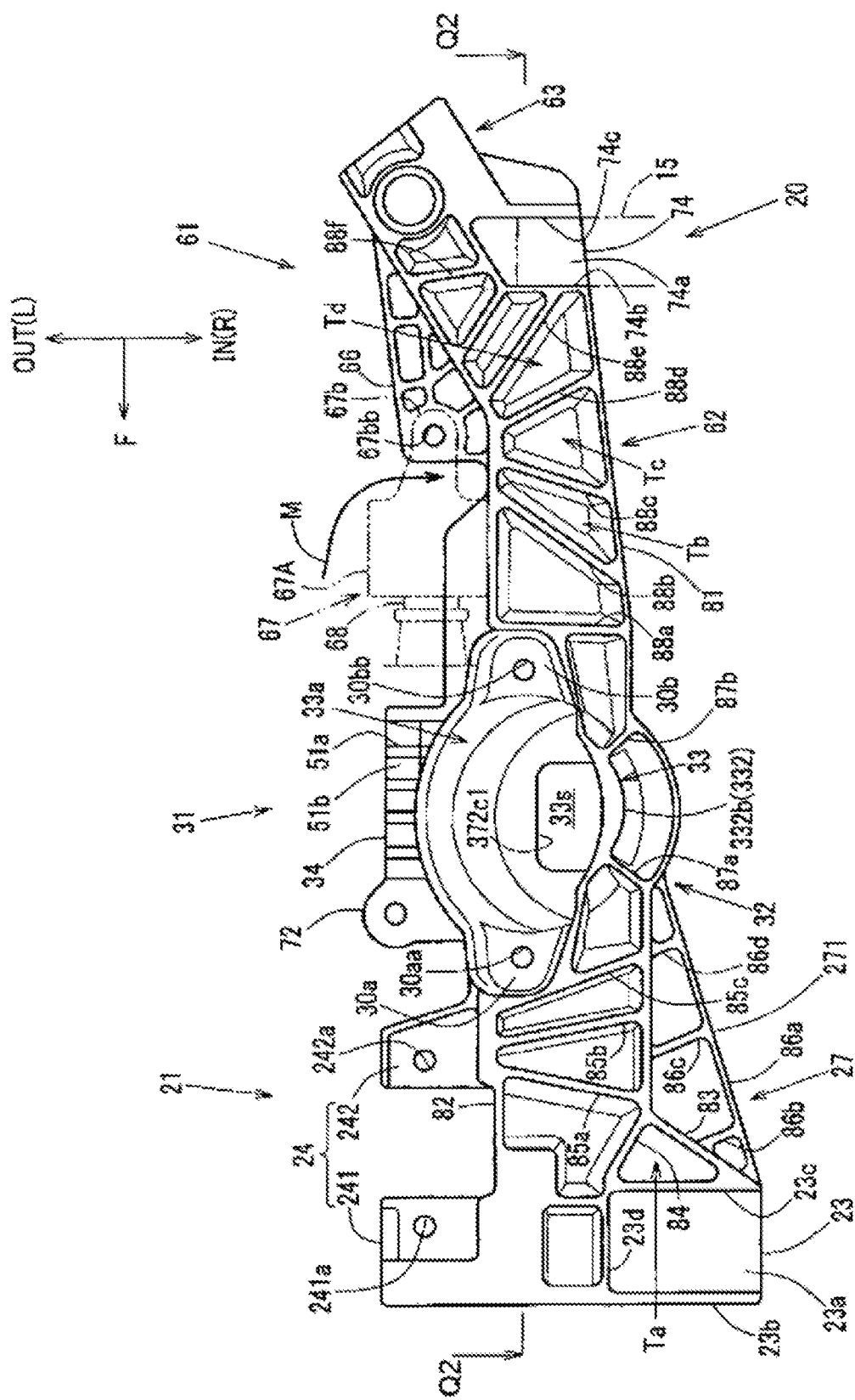
FIG. 8 is a bottom view of the subframe.

As illustrated in FIGS. 4, 6, and 8, this front overhang part 27 is integrally formed by the guide recess 23 which joins to the second front cross member 14 while the second front cross member 14 is fitted therein, and a reinforcement overhang part 271 which reinforces the guide recess 23 rearward of the guide recess 23.

The reinforcement overhang part 271 of the front overhang part 27 extends inwardly from the base part of the subframe 20 (a center part in the width direction extending in the front-and-rear direction) within a range from forward of a rear support part 67 (described later) (see FIGS. 2 and 3) which supports the rear coupling part 102a of the lower arm 100 to a rear edge of the guide recess 23.

The reinforcement overhang part 271 of this embodiment is formed within a range from a side wall of the middle part 31 (an accommodating part 33 described later) inward in the width direction to the rear edge of the guide recess 23 (see FIGS. 4, 6, and 8). Further, the reinforcement overhang part 271 is integrally formed with the rear edge of the guide recess 23 so that its front end has substantially the same extending-out length inwardly in the width direction as that of the guide recess 23, and is formed in a tapered shape in the plan view so that the extending-out length inwardly in the width direction becomes gradually shorter to the rear.

As illustrated in FIGS. 1, 2, 4 to 7, 9(a), 9(b), 10(a), 10(b), 11(b), and 12, the middle part 31 of the subframe 20 of the subframe structure 10 forms a mount support part 32 as the bulged part which substantially entirely bulges upwardly from the front part 21.

As illustrated in FIGS. 4 to 8, 9(a), 9(b), 10(a), 10(b), 11(a), 11(b), and 12, the mount support part 32 is provided with the accommodating part 33 which accommodates a mount support structure 36 (PT mount 36) (see drawings) connected to a PT-side bracket 201 (see FIG. 12) provided to the power train 2 side, from below.

As illustrated in FIGS. 4, 6, 9(a), 9(b), 10(a), 10(b), and 12, the accommodating part 33 is formed in a hollow shape having inside an accommodation space 33s (see FIGS. 6, 8, 9(b), and 12) which opens downwardly by an upper wall part 331 and a side wall part 332 which constitutes a part of the mount support part 32.

As illustrated in FIGS. 4, 5, 8, and 10(b), a middle overhang part 34 which extends horizontally and outwardly from an outward edge of the upper wall part 331 of the accommodating part 33 is formed in the mount support part 32.

As illustrated in FIGS. 4, 5, 7, and 9(a), the middle vehicle body attaching part 72 described above stands up in a pillar shape (cylindrical shape) so as to protrude upwardly in a corner part of a forward edge and an outward edge of the middle overhang part 34 in the plan view. This middle vehicle body attaching part 72 is rigidly coupled to a lower surface of a rear part of the front straight part 1a of the frontside frame 1 with a bolt, without any dumper elements, such as a rubber bush, therebetween. Thus, the rigidity between the middle vehicle body attaching part 72 and the frontside frame 1 is increased. Moreover, the middle vehicle body attaching part 72 is disposed so that it becomes substantially the same height as the height of the front vehicle body attaching part 71 (see FIGS. 1 and 2).

Note that as illustrated in FIGS. 4 and 5, a ridge 35 which bulges upwardly with respect to its perimeter is formed in a forward part of the middle overhang part 34, and, in detail, the middle vehicle body attaching part 72 stands from an upper surface of the ridge 35.

Figure 12:
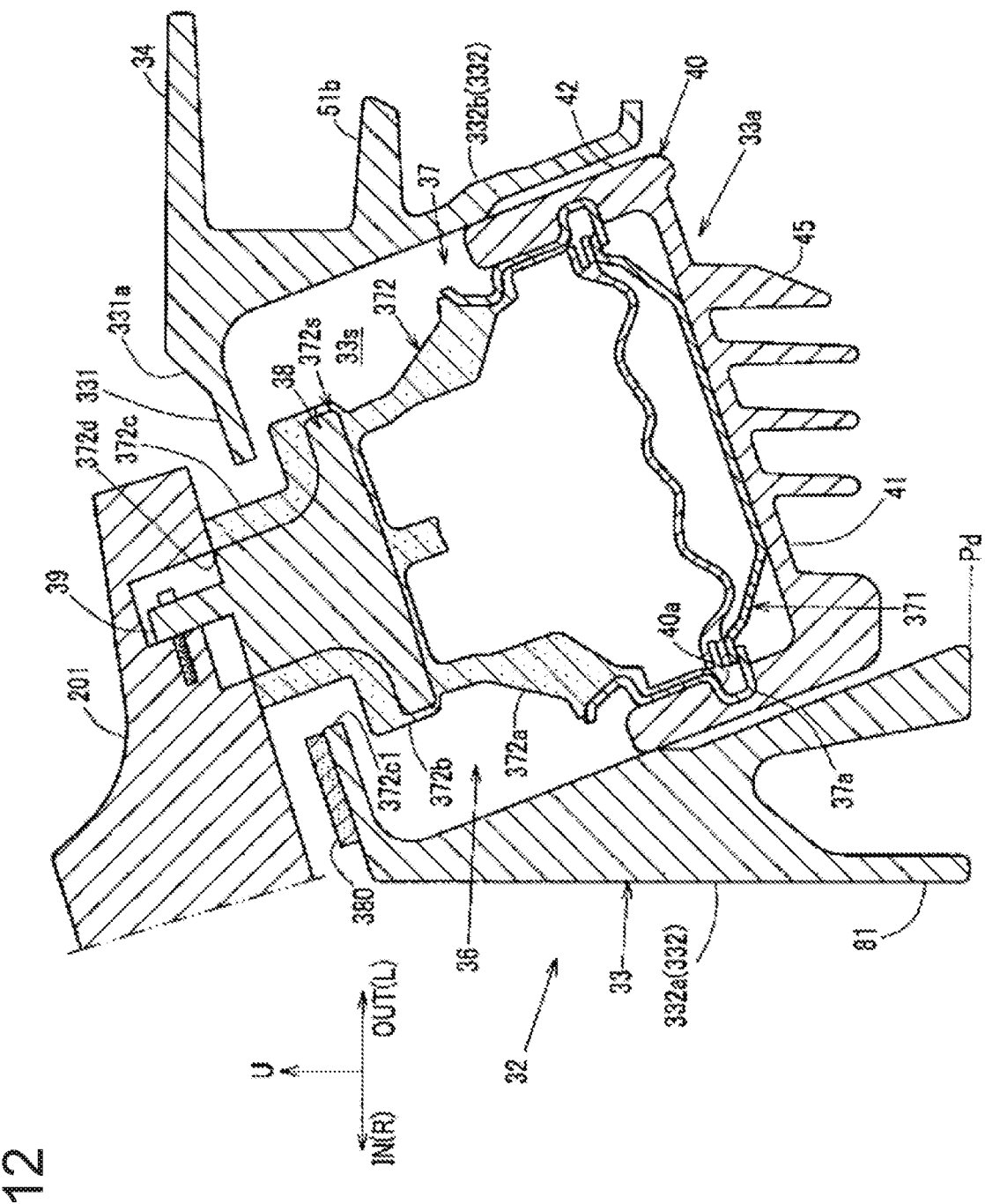
FIG. 12 is an enlarged cross-sectional view taken along a line Q1-Q1 of FIG. 3.

As illustrated in FIG. 12, an inner surface of the side wall part 332 of the accommodating part 33 (a surface facing the accommodation space 33s) is formed in a tapered shape where an upper part thereof inclines inwardly with respect to a lower part. Further, as illustrated in FIGS. 4, 10(a), 10(b), and 12, the upper wall part 331 of the accommodating part 33 is formed in a tapered shape so that an inward part is located below an outward part.

Accordingly, the PT mount 36 is accommodated in the accommodating part 33 in an inclined posture in which its upper part inclines inwardly with respect to the lower part (see FIG. 12).

As illustrated in FIG. 12, the PT mount 36 is comprised of an accommodated member 37 which is substantially entirely accommodated in the accommodating part 33, and a core member 38 made of a hard material accommodated inside the accommodated member 37.

The accommodated member 37 is comprised of an outer shell part 371 provided at a lower part thereof and having a bowl shape which opens upwardly, and a mount rubber member 372 which is fitted into the outer shell part 371 from above. The mount rubber member 372 has a body part 372a, a shoulder part 372b, and a neck part 372c in this order from below to above, is made of an elastic material, such as rubber, and is integrally formed in a stepped shape in the longitudinal cross-section.

The accommodated member 37 has an interior space corresponding to the diameters of the outer shell part 371, the body part 372a, the shoulder part 372b, and the neck part 372c, and is formed in a substantially hollow truncated-cone shape as a whole. In the accommodated member 37, the neck part 372c projects upwardly from the shoulder part 372b, and interior spaces 372s of the shoulder part 372b and the neck part 372c communicate with each other in the up-and-down direction. Further, an opening 372d in which the interior space 372s opens upwardly is formed in an upper end of the neck part 372c.

The core member 38 is accommodated in the interior space 372s of the accommodated member 37 from the shoulder part 372b to the neck part 372c, and its lower part is formed larger in the diameter than its upper part corresponding to the interior space of the shoulder part 372b, and engages with an upper wall of the interior space of the shoulder part 372b.

On the other hand, the upper part of the core member 38 projects upward of the opening 372d. As illustrated in FIGS. 3, 4, and 12, the upper part of the core member 38 is provided with a protrusion piece 39 for attaching a PT bracket attached to the PT-side bracket 201 (coupled part) which extends outwardly from the power train 2 side.

Note that in FIG. 3, only the PT mount 36 provided to the left subframe is illustrated, and in drawings other than FIGS. 4, 3, and 12, illustration of the PT mount 36 is omitted.

A neck part insertion hole 372c1 into which the neck part 372c provided to the accommodated member 37 accommodated in the accommodating part 33 is inserted is formed so as to penetrate the center part of the upper wall part 331. This neck part insertion hole 372c1 is formed smaller in the diameter than the shoulder part 372b provided to the accommodated member 37.

Thus, by engaging the shoulder part 372b with the circumferential edge of the neck part insertion hole 372c1, the accommodated member 37 will not slip out from the accommodation space 33s of the accommodating part 33 through the neck part insertion hole 372c1.

The protrusion piece 39 for attaching the PT bracket provided to the core member 38 projects upwardly from the opening 372d of the neck part 372c while the accommodated member 37 is accommodated in the accommodating part 33, and is connected to the PT-side bracket 201 by being fastened with a bolt, etc. The PT mount 36 elastically supports the PT-side bracket 201 from below.

When the PT-side bracket 201 vibrates greatly while the vehicle travels, the PT mount 36 is elastically deformed, and the PT-side bracket 201 is supported from below (its position is regulated so as not to be lowered any more) by the upper wall part 331 through a rubber member 380 (buffer member) (see FIG. 12) provided to the upper surface of the upper wall part 331.

Since the upper wall part 331 of the accommodating part 33 is integrally formed as a part of the subframe 20 formed by an aluminum block, it can support the PT-side bracket 201 with high support rigidity.

Moreover, the lower part of the accommodating part 33 opens slightly outward with respect to the vertically downward direction. The accommodating part 33 is not formed up to a lower end position Pd (bottom surface part) (see FIG. 12) of the subframe 20, but, as illustrated in FIGS. 5 to 8, 9(*b*), and 12, an opening 33*a* (see FIG. 9(*b*)) located at a lower end of the accommodating part 33 is formed at a location higher than the bottom surface.

As illustrated in FIG. 12, the subframe structure 10 is also provided with a hold member 40 which holds from below the PT mount 36 accommodated in the accommodating part 33.

Figure 7:
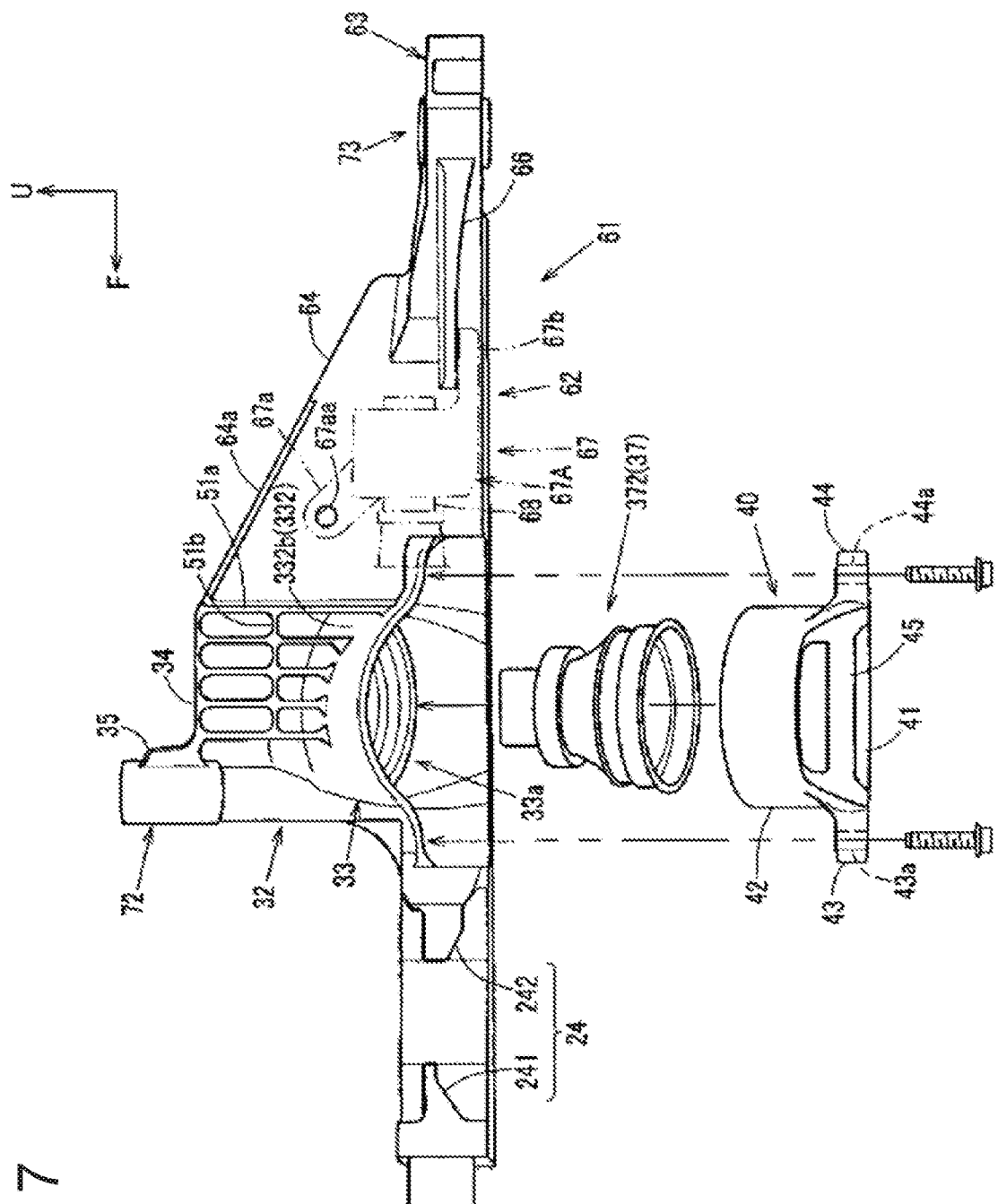
FIG. 7 is a side view of the subframe where a PT mount and a hold member are disassembled when seen from outward in the width direction.

As illustrated in FIGS. 5, 7, 11(*a*), 11(*b*), and 12, the hold member 40 has a disk-shaped bottom wall part 41 which closes the opening 33*a* of the accommodating part 33, a side wall part 42 which stands up from an outer circumferential edge of the bottom wall part 41, flange parts 43 and 44 (see FIG. 7) which project forward and rearward from the front and rear sides, respectively, and where bolt insertion holes 43*a* and 44*a* are formed. The hold member 40 is integrally molded by casting, such as aluminum die-casting. A plurality of ribs 45 are disposed in the bottom wall part 41, which project downwardly from a lower surface part thereof (bottom surface part), and extend in the front-and-rear direction so as to be separated from each other in the width direction.

Moreover, as illustrated in FIG. 8, in front and rear edge parts of the circumferential edge of the opening 33*a*, attaching seat surfaces 30*a* and 30*b* for attaching the hold member 40 are formed, respectively, and these front and rear attaching seat surfaces 30*a* and 30*b* are formed flat at a location one step higher than the bottom surface part of the subframe 20 (see FIG. 9(*b*)), where bolt insertion holes 30*aa* and 30*bb* are formed, respectively.

Further, by the front and rear flange parts 43 and 44 fixedly fastened with bolts from below, to the corresponding attaching seat surfaces 30*a* and 30*b* (see FIG. 7), the hold member 40 closes the opening 33*a* so that the accommodated member 37 accommodated in the accommodating part 33 will not fall out from the opening 33*a* (see FIGS. 11(*a*) and 11(*b*)).

As illustrated in FIGS. 11(*b*) and 12, the hold member 40 holds the PT mount 36 from below at a location higher than the bottom surface part of the subframe 20 (see the bottom surface location Pd in FIG. 12). In detail, as illustrated in FIG. 11(*b*), the hold member 40 is attached to the accommodating part 33 of the subframe 20 at an installed height so that at least a part of the hold member 40 is included in a range of a vertical thickness t of the extension frame 12 extending forward, in other words, an installed height so that the hold member 40 overlaps with the extension frame 12 in the up-and-down direction.

Further, as illustrated in FIG. 12, an engaging recess 40*a* is formed in an inner circumferential surface of the side wall part 42 of the hold member 40, and an engaging convex part 37*a* is formed in an outer circumferential surface of the outer shell part 371 provided to the lower part of the PT mount 36. The PT mount 36 is accommodated in the accommodating part 33 in a state where the engaging convex part 37*a* engages with the engaging recess 40*a* and the PT mount 36 is installed on the upper surface of the bottom wall part 41 of the hold member 40 (see FIG. 12).

As illustrated in FIGS. 4, 6, and 9(*a*), among the side wall parts 332 (332*a* and 332*b*) of the accommodating part 33, the side wall part 332*a* located inward in the width direction (inward side wall part 332*a*) is formed having a cylindrical outer circumferential surface which constitutes a part of the outer circumferential surface having a substantially cylindrical shape which extends in the up-and-down direction so that it is bulged inwardly from an outer edge 331*a* (see FIG. 4) of the upper wall part 331.

On the other hand, as described above, since the inner surface of the side wall part 332 of the accommodating part 33 is formed to have the tapered shape so that the upper part inclines inwardly with respect to the lower part, a side wall part 332*b* (outward side wall part 332*b*) of the wall parts 332 of the accommodating part 33, which is located outward of the outer edge 331*a* (see FIG. 4) of the upper wall part 331 is formed so that the lower part is bulged outwardly with respect to the upper part, as illustrated in FIGS. 5 to 7, 10(*a*), 10(*b*), and 12.

As illustrated in FIGS. 5, 7, 8, 10(*a*), 10(*b*), and 12, a plurality of reinforcement ribs 51*a* and 51*b* which reinforce between the accommodating part 33 and the middle vehicle body attaching part 72 are provided between the accommodating part 33 and the middle vehicle body attaching part 72.

In detail, among the reinforcement ribs 51*a* and 51*b*, the plurality of reinforcement ribs 51*a* extending in the up-and-down direction are formed linearly in the up-and-down direction so that the lower surface of the middle overhang part 34 located at a base end of the middle vehicle body attaching part 72 is connected to an outside surface of the outward side wall part 332*b* located below the middle vehicle body attaching part 72, and are provided so as to be separated from each other in the front-and-rear direction (see FIG. 5).

As illustrated in FIG. 8, the reinforcement ribs 51*a* extending in the up-and-down direction are formed so that the outward projecting length in the width direction is gradually longer from the outward side wall part 332*b* of the accommodating part 33 as they go upward, and extend in the width direction so that the upper end parts reach the outer end of the middle overhang part 34.

Further, in the intermediate parts of the plurality of reinforcement ribs 51*a* in the up-and-down direction, the reinforcement ribs 51*b* extending substantially horizontally in the front-and-rear direction are formed so as to cross the reinforcement ribs 51*a*, and therefore, the plurality of reinforcement ribs 51*a* extending in the up-and-down direction are coupled to each other by the reinforcement ribs 51*b* extending in the front-and-rear direction.

As illustrated in FIG. 8 the plurality of reinforcement ribs 51*a* and 51*b* described above and the middle vehicle body attaching part 72 are disposed outwardly adjacent to the accommodating part 33 (the opening 33*a*) in the bottom view of the subframe 20.

As illustrated in FIGS. 4 to 7, the rear part 61 of the subframe 20 has a front-side rear part 62 extending substantially linearly in the front-and-rear direction, and a rear-side rear part 63 extending substantially linearly from a rear end of the front-side rear part 62 so as to incline more outwardly as it goes to rearward, which are integrally formed.

Further, as illustrated in FIGS. 4, 5, 7, and 9(*a*), a wall part 64 which stands up from an upper surface of a base part of the rear part 61 is formed in the rear part 61 of the subframe 20. The wall part 64 extends in an outer edge part of the front-side rear part 62 of the rear part 61, in the front-andrear direction from a front end thereof to a front part of the rear-side rear part 63, and it is formed in a tapered shape so that its height becomes gradually lower to the rear in the side view.

Figure 10A:
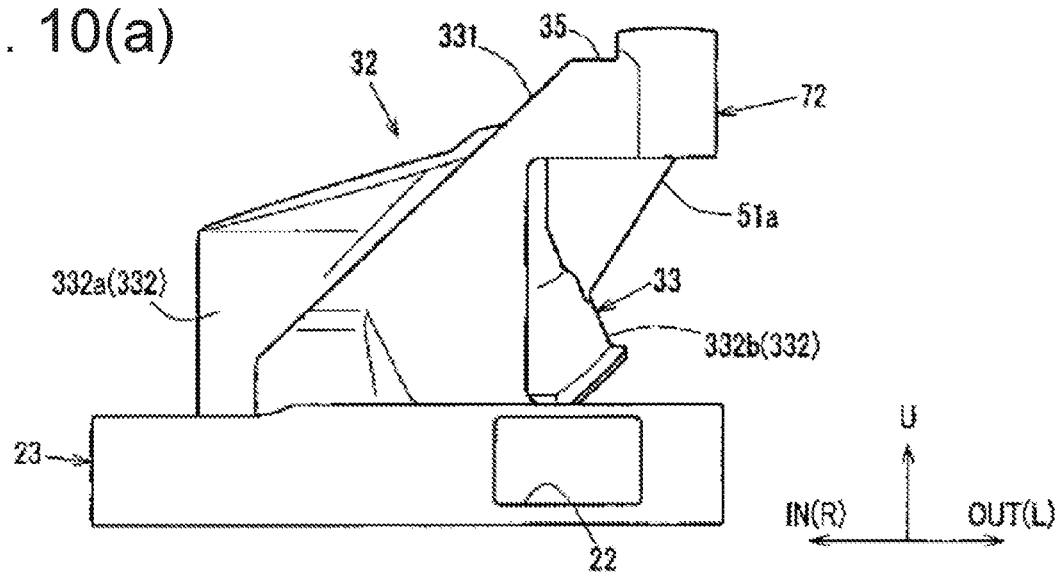
FIG. 10(a) is a front view of the subframe.
Figure 10B:
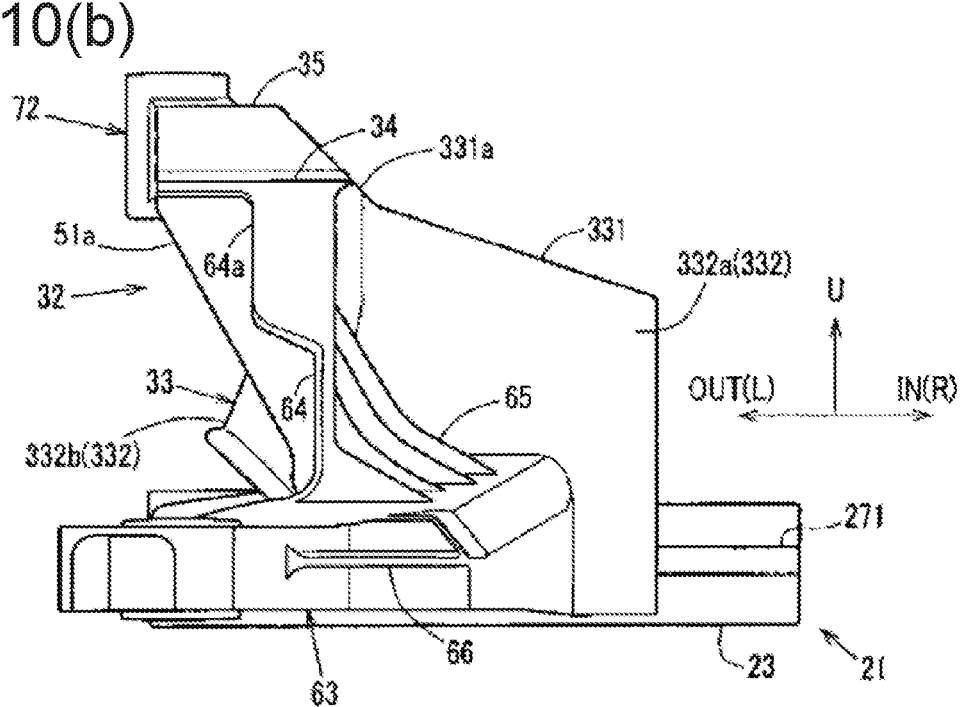
FIG. 10(b) is its rear view.

The front end of the wall part 64 is formed integrally with the accommodating part 33 so that it extends continuously from the rear end of the side wall part 332 of the accommodating part 33 to the rear, and it is formed with the same height as the upper wall part 331 of the accommodating part 33. Moreover, a roof part 64a projecting inwardly from a front end thereof to an intermediate part in the front-and-rear direction is formed in the upper end of the wall part 64. As illustrated in FIGS. 4, 9(a), and 10(a), a plurality of reinforcement ribs 65 stand at a corner part between an inner surface of the wall part 64 and an upper surface of the base part of the front-side rear part 62 so as to connect the inner surface of the wall part 64 and the upper surface of the base part of the front-side rear part 62. The plurality of reinforcement ribs 65 are provided so as to be separated from each other in the front-and-rear direction.

As illustrated in FIGS. 5 to 8, 9(a), and 10(b), a rear overhang part 66 extending outwardly is formed at an outward corner part between the front-side rear part 62 and the rear-side rear part 63 (an interior angle part in the plan view). This rear overhang part 66 extends rearward along the rear-side rear part 63 so that its rear end reaches a rear-side part of the rear part 61 of the subframe 20.

As illustrated in FIG. 8, the rear support part 67 which rotatably supports the rear coupling part 102a (see FIG. 2) provided to an inner end of the rear arm part 102 of the lower arm 100 is formed outward of the rear part 61.

In detail, as illustrated in FIGS. 1 to 3, the rear support part 67 is provided with a lower arm rear support bracket 67A.

As illustrated in FIGS. 7 and 8, this lower arm rear support bracket 67A is provided with attaching flange parts 67a and 67b attached to the subframe 20 of the subframe structure 10, at both sides in the front-and-rear direction, respectively. The front attaching flange part 67a of the pair of front and rear attaching flange parts 67a and 67b is fixedly fastened to a bolt fastening hole 67aa (see FIGS. 5, 7, and 9(a)) formed in an outward wall surface of the wall part 64 with a bolt, and the rear attaching flange part 67b is fixedly fastened to a bolt fastening hole 67bb (see FIGS. 6 and 8) formed in the rear overhang part 66 with a bolt.

The rear coupling part 102a of the lower arm 100 is pivotally supported by the rear support part 67 by inserting a shaft member 68 extending rearward into an elastic bush 69 (see FIG. 4) provided to the inside of the lower arm rear support bracket 67A.

Thus, the front coupling part 101a and the rear coupling part 102a of the lower arm 100 are disposed coaxially to each other and parallel to the front-and-rear direction.

As illustrated in FIGS. 3, 4, 5, and 7, the rear vehicle body attaching part 73 which is fixedly fastened to the lower surface of the frontside frame 1 through a mount bush is formed in the upper surface part of the rear part of the rear-side rear part 63.

As illustrated in FIG. 3, the rear vehicle body attaching part 73 is formed in a seat surface shape having a bolt insertion hole 73a at a location of the rear-side rear part 63 corresponding to the front part of the rear straight part 1c of the frontside frame 1 in the plan view, and is formed at a height lower than the front vehicle body attaching part 71 and the middle vehicle body attaching part 72, where the rear vehicle body attaching part 73 is attachable to the lower surface of the front part of the rear straight part 1c (see FIG. 2).

The middle vehicle body attaching part 72, the rear vehicle body attaching part 73, and the front vehicle body attaching part 71 are disposed in the front-and-rear direction so that they are substantially aligned in the width direction, and, as described above, the subframe structure 10 is coupled to the frontside frame 1 through the three vehicle body attaching parts 71, 72, and 73.

Particularly, as described above, the subframe structure 10 of this embodiment intentionally adopts a structure in which it is attached to the frontside frame 1 through the three vehicle body attaching parts 71, 72, and 73, without providing a vehicle body attaching part at the front end location of the subframe 20 of the subframe structure 10 which corresponds to a substantially middle location between the front vehicle body attaching part 71 and the middle vehicle body attaching part 72.

Thus, unlike the case where the vehicle body attaching part is provided at the front end location of the subframe 20 of the subframe structure 10, there is no possibility that the vehicle body attaching part impedes the extension frame 12 from being crushed up to the rear end during a front collision, and therefore, this structure can promote the extension frame 12 being crushed up to the rear end.

As illustrated in FIGS. 4, 6, 8, and 9(a), a guide recess 74 into which an outer end part of the rear cross member 15 is fitted for connection is provided inward of the rear part of the front-side rear part 62 of the rear part 61 (in other words, the front part of the rear-side rear part 63).

The guide recess 74 is formed in a concave shape which opens downwardly and inwardly corresponding to the shape of the outer end part of the rear cross member 15 so that the rear cross member 15 is insertable, and is comprised of an upper wall part 74a, a pair of guide wall parts 74b and 74c extending downwardly from both ends of the upper wall part 74a in the front-and-rear direction, and an outer wall part extending downwardly from the outer end of the upper wall part 74a.

The rear cross member 15 is integrally joined to the upper wall part 74a by fastening in a state where it is fitted into the guide recess 74. Thus, the rear cross member 15 extends linearly between the rear parts of the pair of left and right subframes 20 so as to bridge between the rear parts in the width direction.

Further, as illustrated in FIGS. 6, 8, and 9B, a plurality of reinforcement ribs 81-88 which project downwardly from the bottom surface part of the subframe 20 of the subframe structure 10 are formed in the bottom surface part. The plurality of reinforcement ribs 81-88 are described with reference to FIGS. 6, 8, 9(b), and 12.

As illustrated in FIGS. 6, 8, and 12, the inner edge rib 81 and the outer edge rib 82 are formed at both inner and outer end sides of the base part of the subframe 20, respectively, which continuously extend substantially parallel to each other in the front-and-rear direction from the front part of the subframe 20 (substantially the middle part of the front part 21 in the front-and-rear direction) to the rear part (the rear end of the rear part 61).

The inner edge rib 81 is formed by bulging a part thereof corresponding to the accommodating part 33 in the front-and-rear direction, inwardly in an arc shape so that the part bypasses the accommodating part 33 in the bottom view (see FIGS. 6 and 8). Moreover, in the inner edge rib 81, a part thereof in the front-and-rear direction corresponding to the front side guide wall part 74b of the guide recess 74 for connecting the rear cross member 15 is formed by the front side guide wall part 74*b*. On the other hand, the outer edge rib 82 is formed in the front-and-rear direction over the middle part 31 so that it is disconnected in the middle part 31.

As illustrated in FIGS. 6 and 8, a pair of guide wall reinforcement ribs 83 and 84 extending forward so as to branch in a V-shape in the width direction from the front end of the inner edge rib 81 in the bottom view are formed in the front part 21. Although the pair of guide wall reinforcement ribs 83 and 84 are both formed in the width direction, the inner guide wall reinforcement rib 83 (the first guide wall reinforcement rib 83) among these guide wall reinforcement ribs 83 and 84 is formed in the front overhang part 27 (the reinforcement overhang part 271).

In detail, the first guide wall reinforcement rib 83 among the pair of guide wall reinforcement ribs 83 and 84 is coupled to the inner end of the rear guide wall 23*c* in the guide recess 23 for connecting the second front cross member 14, the outer guide wall reinforcement rib 84 (the second guide wall reinforcement rib 84) is coupled to the outer end of the rear guide wall 23*c* of the guide recess 23. Thus, the first guide wall reinforcement rib 83, the second guide wall reinforcement rib 84, and the rear guide wall 23*c* constitute a truss shape Ta in the bottom view.

As illustrated in FIGS. 6, 8, and 9(*b*), first to third bottom surface front reinforcement ribs 85*a*, 85*b*, and 85*c* extending linearly in the width direction are disposed in the front part 21 in this order in the front-and-rear direction so that they couple between the outer edge rib 82 and the inner edge rib 81.

As illustrated in FIGS. 6 and 8, first to third bottom surface front reinforcement ribs 85*a*, 85*b*, and 85*c* are formed in a periphery part inward of the rear attaching part 242 among the pair of front and rear attaching parts 241 and 242 which constitute the front support part 24, and they extend radiatedly centering on the rear attaching part 242 in the bottom view so that the spacing therebetween in the front-and-rear direction becomes gradually wider toward the inner edge rib 81 from the outer edge rib 82.

By the first to third bottom surface front reinforcement ribs 85*a*, 85*b*, and 85*c*, the load in the width direction (lateral force) inputted into the front support part 24 from the front wheels through the lower arm 100 while the vehicle travels is efficiently distributed to the entire front part 21.

As illustrated in FIGS. 6 and 8, in the reinforcement overhang part 271 of the front overhang part 27, an inner edge reinforcement rib 86*a* extending along the inner edge, and first to third front overhang part reinforcement ribs 86*b*-86*d* extending in the width direction so as to be separated from each other in the front-and-rear direction, are formed.

Moreover, as illustrated in FIGS. 6 and 12, a lower part of the inward side wall part 332*a* of the accommodating part 33 provided to the middle part 31 of the subframe structure 10 is formed branched in a V-shape on both inner and outer sides in the width direction in a cross section perpendicular to the front-and-rear direction, the inner branch part among the V-shape in the width direction is formed by the inner edge rib 81.

Further, as illustrated in FIGS. 6 and 8, first and second bottom surface middle ribs 87*a* and 87*b* which couple lower parts of the V-shape of the inward side wall part 332*a* of the accommodating part 33 are formed in the middle part 31 of the subframe structure 10 in the width direction.

Moreover, as illustrated in FIGS. 6 and 8, first to sixth bottom surface rear ribs 88*a*-88*f* which couple the inner edge rib 81 and the outer edge rib 82 are formed in the rear part 61 in the width direction.

Particularly, the second to sixth bottom surface rear ribs 88*b*-88*f* among the first to sixth bottom surface rear ribs 88*a*-88*f* are provided to an inward perimeter part as a reinforcement part which reinforces the inward perimeter part of the rear part 61 inward of the rear support part 67, against moment load inputted from the lower arm 100 to the rear support part 67 mainly through the front support part 24.

In detail, when an impact load is inputted to the lower arm 100 from the front when a front collision of the vehicle occurs, a moment load M centering on the front support part 24 is added to the subframe 20 of the subframe structure 10 through the rear support part 67 in the plan view (see an arrow M in FIG. 8).

Such a moment load may be applied to the subframe 20 of the subframe structure 10 from the lower arm 100 through the rear support part 67, depending on the forward and rearward force applied to the front wheel while the vehicle travels, not limited to the case of the front collision of the vehicle.

For this reason, in this embodiment, the second to sixth bottom surface rear ribs 88*b*-88*f* are formed radiatedly centering on the rear support part 67 in the bottom view, for the moment load described above which is inputted into the rear support part 67 from the lower arm 100 mainly through the front support part 24.

In detail, the second and third bottom surface rear ribs 88*b* and 88*c* among the second to sixth bottom surface rear ribs extend linearly forward and inward from the rear support part 67, and the fourth to sixth bottom surface rear ribs 88*d*, 88*e*, and 88*f* extend linearly rearward and inward from the rear support part 67.

The inner edge rib 81, the outer edge rib 82, and the second and third bottom surface rear ribs 88*b* and 88*c* which are adjacent to each other in the front-and-rear direction and couple the edge ribs in the width direction form a substantially truss shape Tb in the bottom view.

The inner edge rib 81, the outer edge rib 82, and the third and fourth bottom surface rear ribs 88*c* and 88*d* which are adjacent to each other in the front-and-rear direction and couple the edge ribs in the width direction form a substantially truss shape Tc in the bottom view.

Further, the inner edge rib 81, the outer edge rib 82, and the fourth and fifth bottom surface rear ribs 88*d* and 88*e* which are adjacent to each other in the front-and-rear direction and couple the edge ribs in the width direction form a substantially truss shape Td in the bottom view.

As illustrated in FIGS. 1 to 3, the subframe structure 10 of this embodiment described above includes the subframe 20 which supports the power train 2 through the PT mount 36 (see FIG. 12), and the extension frame 12 which extends forward from the front part of the subframe 20 and absorbs the impact load from forward of the vehicle. The subframe structure 10 is attached below the frontside frame 1 (see FIGS. 1 and 2) extending in the front-and-rear direction in the front part of the vehicle body. The subframe 20 is provided with the accommodating part 33 which accommodates the PT mount 36 from below in the accommodation space 33*s* having therein, while permitting the connection with the PT-side bracket 201 (see FIG. 12) provided to the power train 2 side (see FIGS. 4, 5, 7 to 9(*a*), 9(*b*), and 12), and is provided with the vehicle body attaching part extending upward from near the accommodating part 33, and between the accommodating part 33 and the middle vehicle body attaching part 72 (vehicle body attaching part), the reinforcement ribs 51a and 51b as the reinforcement parts which reinforce between the accommodating part 33 and the middle vehicle body attaching part 72 are provided (see FIGS. 4, 5, and 7).

According to the structure described above, since the PT mount 36 can be supported by the entire subframe 20 (at the location closer to the center of gravity of the accommodating part 33 of the subframe 20) by accommodating the PT mount 36 in the accommodating part 33, the support rigidity of the power train 2 can be increased. Moreover, since the middle vehicle body attaching part 72 extends upwardly from near the accommodating part 33, vibration of the power train 2 can be transmitted to be absorbed by the front straight part 1a of the frontside frame 1 (located at a part far away from the ears of the person on board) through the middle vehicle body attaching part 72. In this case, the vibration from the accommodating part 33 to the middle vehicle body attaching part 72 can be efficiently transmitted through the reinforcement ribs 51a and 51b.

As one mode of the present disclosure, the reinforcement part is formed by the reinforcement ribs 51a (ribs) extending in the up-and-down direction between the middle vehicle body attaching part 72 and the parts of the accommodating part 33 lower than the middle vehicle body attaching part 72 so as to connect the middle vehicle body attaching part 72 and the parts of the accommodating part 33 (see drawings).

According to the structure described above, the transmitting path for transmitting the vibration once transmitted below the upper wall part 331, among the vibration of the power train 2 inputted into the upper wall part 331 of the accommodating part 33, again upward can be constituted by the reinforcement ribs 51a extending in the up-and-down direction. Therefore, the vibration transmitted below from the upper wall part 331 of the accommodating part 33 can be efficiently transmitted to the middle vehicle body attaching part 72 extending upward from near the accommodating part 33 through the reinforcement ribs 51a.

As one mode of the present disclosure, the reinforcement ribs 51a and 51b and the middle vehicle body attaching part 72 are disposed adjacent to the accommodating part 33 in the bottom view (see FIG. 8).

According to the structure described above, the reinforcement ribs 51a and 51b and the middle vehicle body attaching part 72 can reinforce the perimeter of the accommodating part 33 against the vibration inputted into the PT mount 36 from the power train 2.

In detail, the reinforcement ribs 51a and 51b and the middle vehicle body attaching part 72 can increase the rigidity of the accommodating part 33, particularly the rigidity of the upper wall part 331, and the reinforcement ribs 51a and 51b can increase the rigidity of the accommodating part 33, particularly the rigidity of the side wall part 332.

According to the first embodiment, since the subframe 20 is fixed to the frontside frame 1 at the mount support part 32, the vibration of the power train 2 which cannot be fully absorbed by the PT mount 36 is directly transmitted to the frontside frame 1 from the mount support part 32. Therefore, the vibration transmitting path from the mount support part 32 to the frontside frame 1 can illustrate a vibration characteristic close to a rigid body as a whole, and thereby, the vibration of the power train 2 can be effectively reduced by the PT mount 36 demonstrating a desired damping performance.

Second Embodiment

Next, the details of a subframe structure 500 according to a second embodiment of the present disclosure are described with reference to FIGS. 13 to 20.

Figure 13:
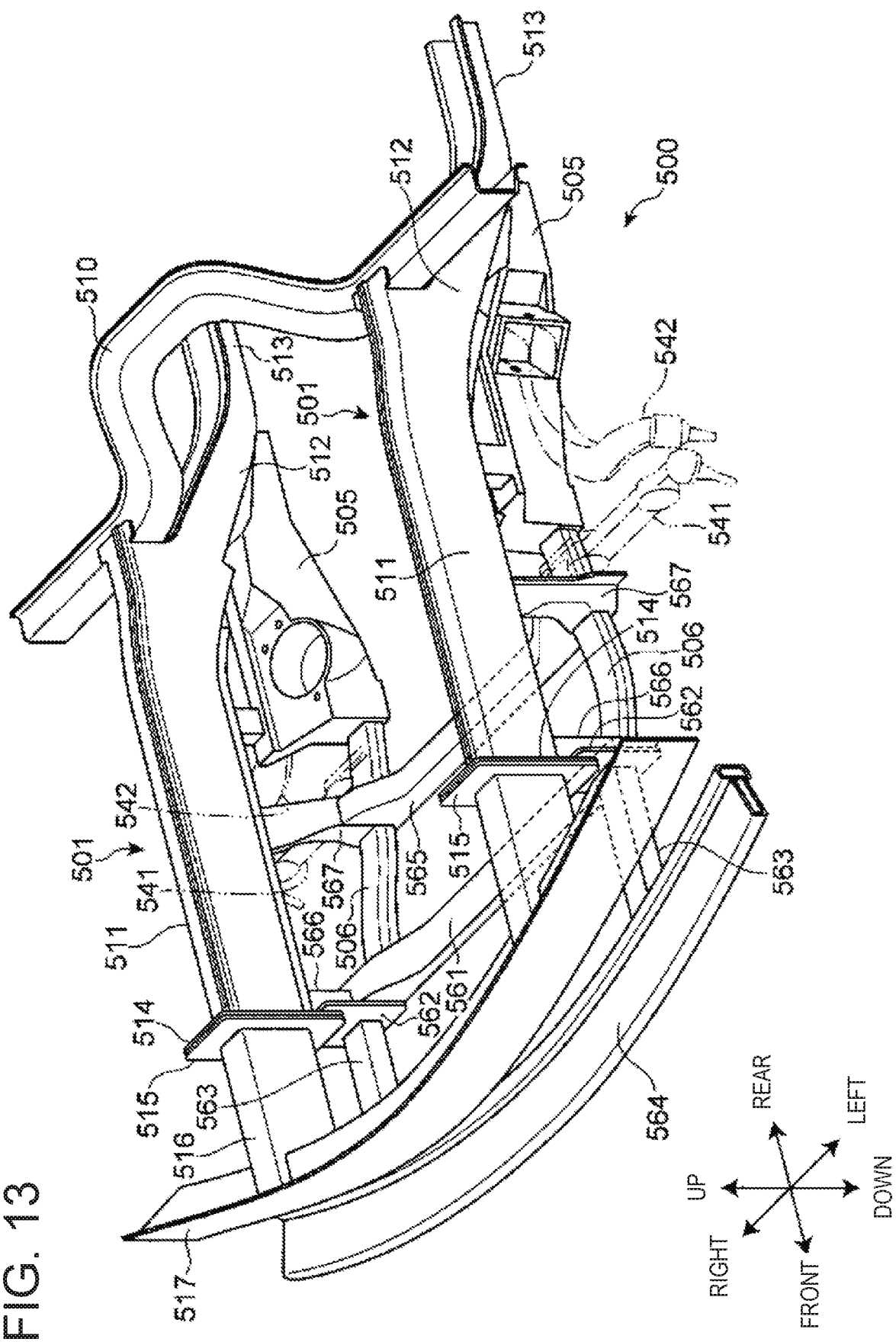
FIG. 13 is a perspective view illustrating a subframe structure of a second embodiment.
Figure 14:
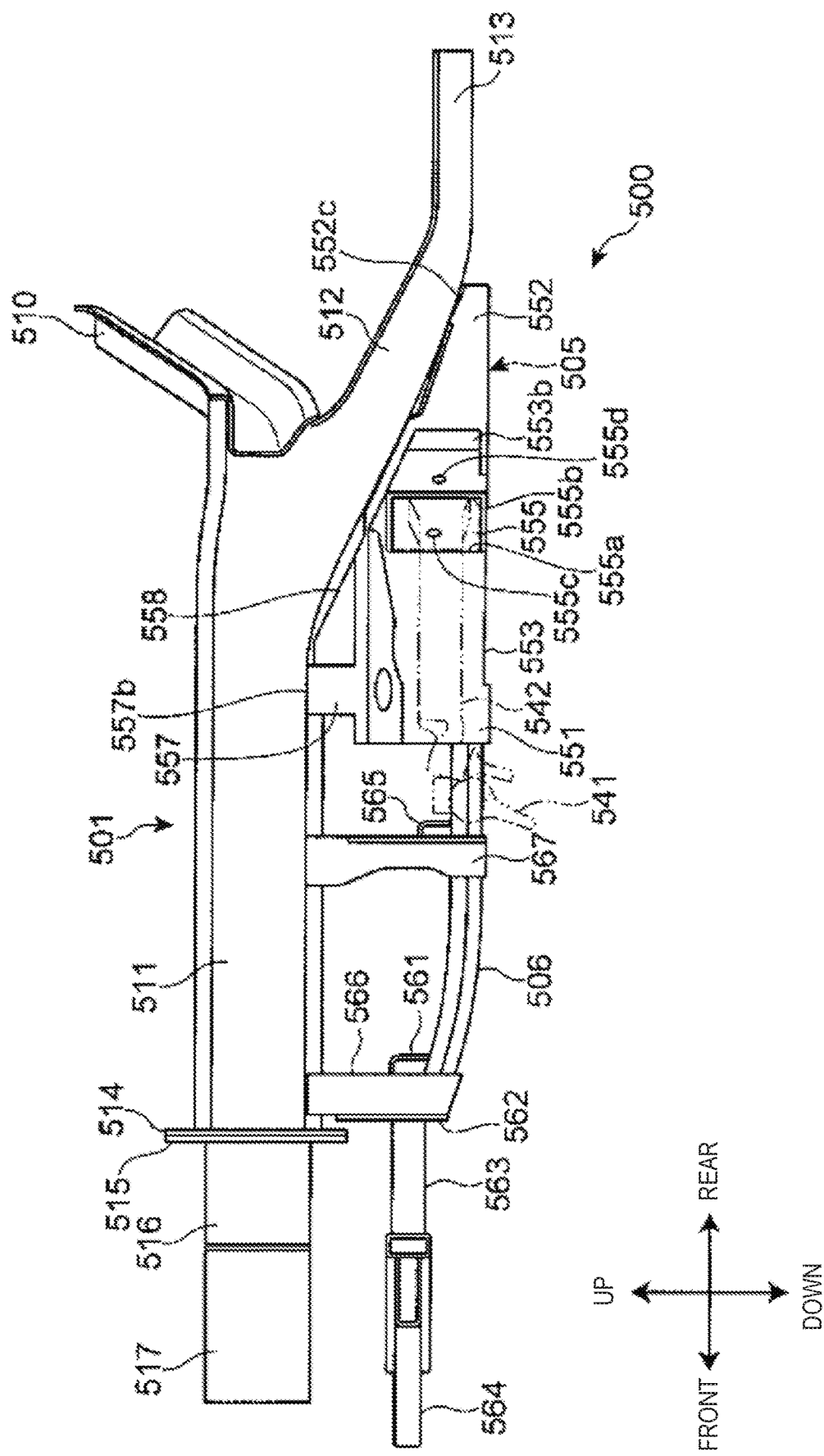
FIG. 14 is a side view illustrating the subframe structure of the second embodiment.

As illustrated in FIGS. 13 and 14, a pair of left and right frontside frames 501, each formed by a frame member as a reinforcement member extending in the front-and-rear direction are provided at both left and right sides of the engine bay E, respectively. The frontside frames 501 constitute a part of the vehicle body structure. A dash cross 510 extending in the width direction is connected to rear parts of the frontside frames 501.

Figure 15:
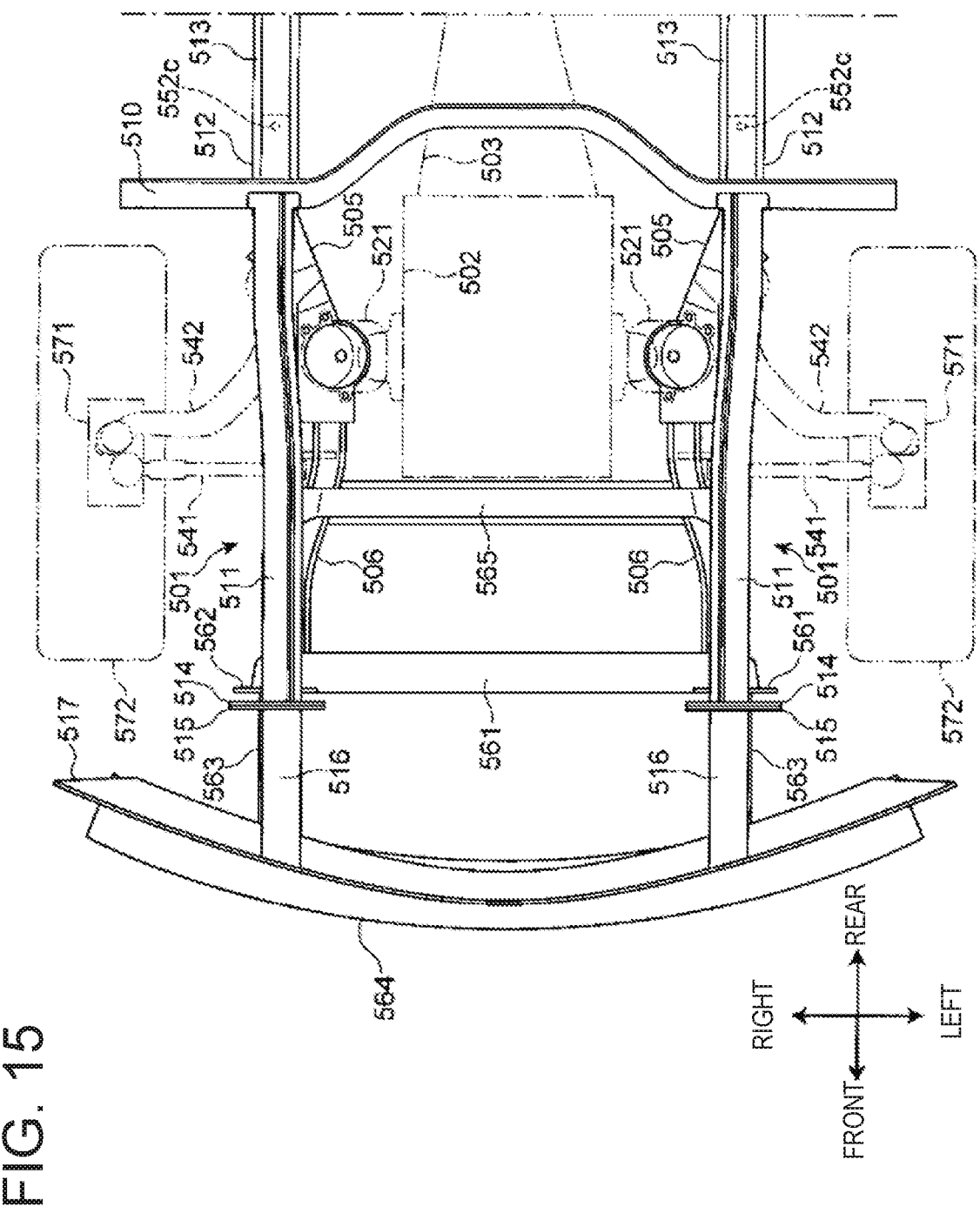
FIG. 15 is a plan view illustrating the subframe structure of the second embodiment.

As illustrated in FIG. 15, in this embodiment, a drive system is a Front-engine Rear-drive (FR). As the power train of the vehicle, a longitudinal engine 502 is disposed between the frontside frames 501, a transmission 503 is coupled to the rear part of the engine 502, and the transmission 503 is disposed below a floor tunnel part (not illustrated).

Each frontside frame 501 is provided with a front part 511 extending forward from the dash cross 510, an inclined part 512 which inclines downward from the dash cross 510 to the rear, and a rear part 513 which further extends rearward from a lower end of the inclined part 512 and is continuously coupled to a floor frame (not illustrated). Each frontside frame 501 is formed so that the rear part 513 is lower than the front part 511.

A pair of left and right main crash cans 516 each comprised of a cylindrical body which absorbs the impact of the collision is provided to a front end of the frontside frame 501 through a set plate 514 and an attaching plate 515. A bumper reinforcement 517 extending in the width direction is attached to front end faces of the pair of left and right main crash cans 516.

Below each frontside frame 501, a suspension subframe 505 (hereinafter, may also be referred to as "the subframe") formed by casting, such as aluminum die-casting, for supporting a suspension link 542 of a suspension device is disposed. Note that the subframe 505 may be made of metal other than aluminum, such as iron. The details of the subframe 505 will be described later.

A pair of left and right extension frames 506 formed by frame members as the load absorbing member extending forward are connected to the front parts of the subframes 505, respectively. A front cross member 561 extending in the width direction is attached to and couple the front ends of the extension frames 506.

Subcrash cans 563 are connected to both left and right ends of the front cross member 561 through flange parts 562, respectively. A lower member 564 is provided forward of the subcrash cans 563. This lower member 564 is a so-called leg-sweeping member which sweeps the pedestrian's legs to make the pedestrian lean on the engine hood when a collision of the vehicle with the pedestrian occurs, thereby preventing a secondary collision.

A subcross member 565 extending in the width direction and coupling both the extension frames 506 is provided to an intermediate part of the extension frames 506 in the front-and-rear direction.

A pair of left and right front pillar parts 566 which stand up in a pillar shape from upper surfaces of the front cross members 561 are provided to both ends of the front cross member 561, and upper ends of the front pillar parts 566 are coupled to lower surfaces of the front end parts of the frontside frames 501 through fastening members (not illustrated), respectively.

At locations in the front-and-rear direction where the subcross member 565 is connected to the extension frames 506, a pair of left and right pillar-shaped rear pillar parts 567 which stand up are provided so as to bridge the extension frames 506 from outside, respectively. An upper end of the rear pillar parts 567 is coupled to a lower surface of the frontside frames 501 by a fastening member (not illustrated).

By the front pillar parts 566 and the rear pillar parts 567, the extension frames 506 is coupled to the frontside frames 501.

Here, the subframes 505 is described in detail with reference to FIGS. 16 to 20. Note that although in FIGS. 16 to 20 only the subframe 505 on the left side illustrated is described, the right subframe 505 is similar in the structure.

Figure 16:
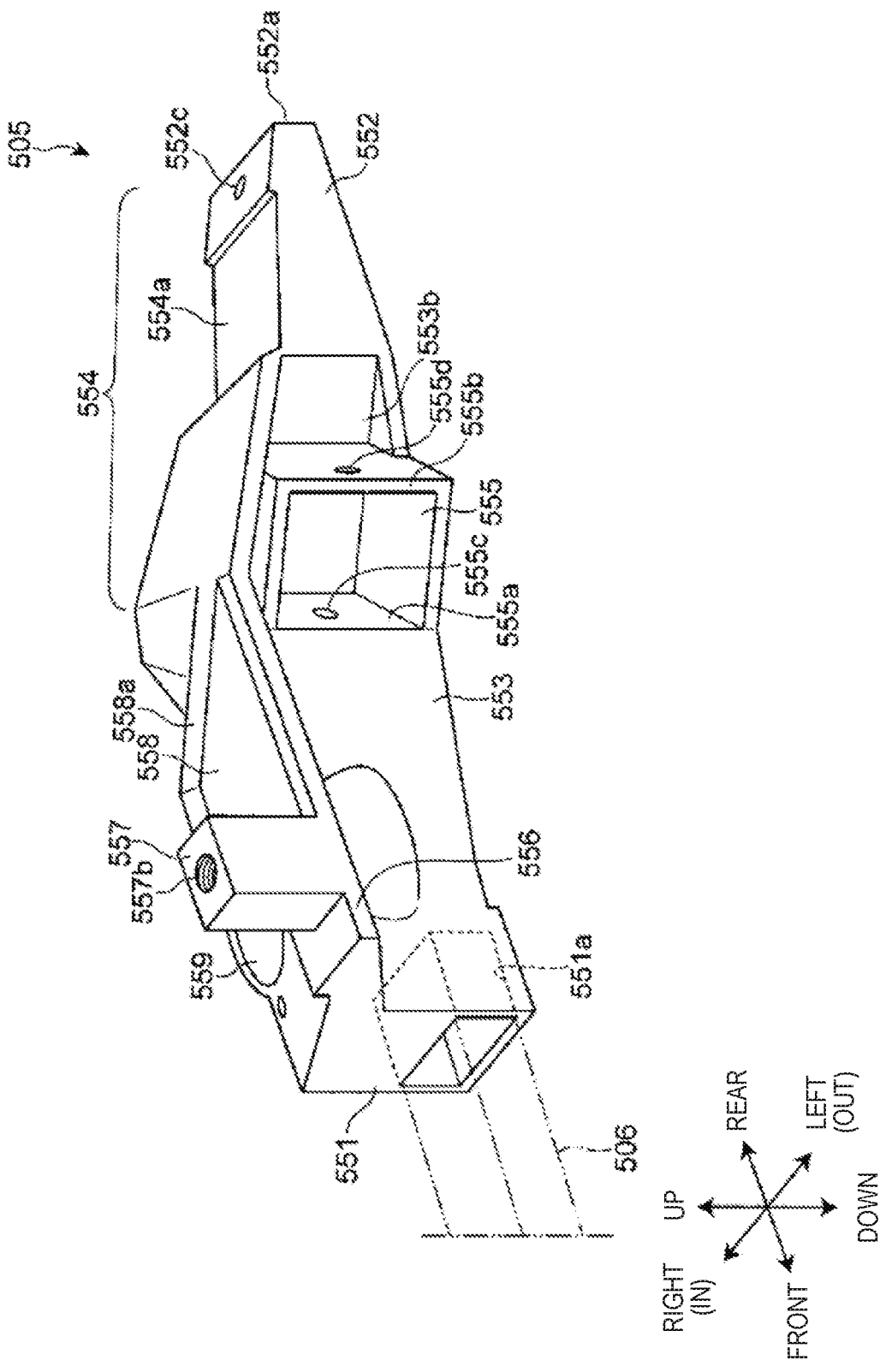
FIG. 16 is a perspective view illustrating a subframe of the second embodiment.
Figure 17:
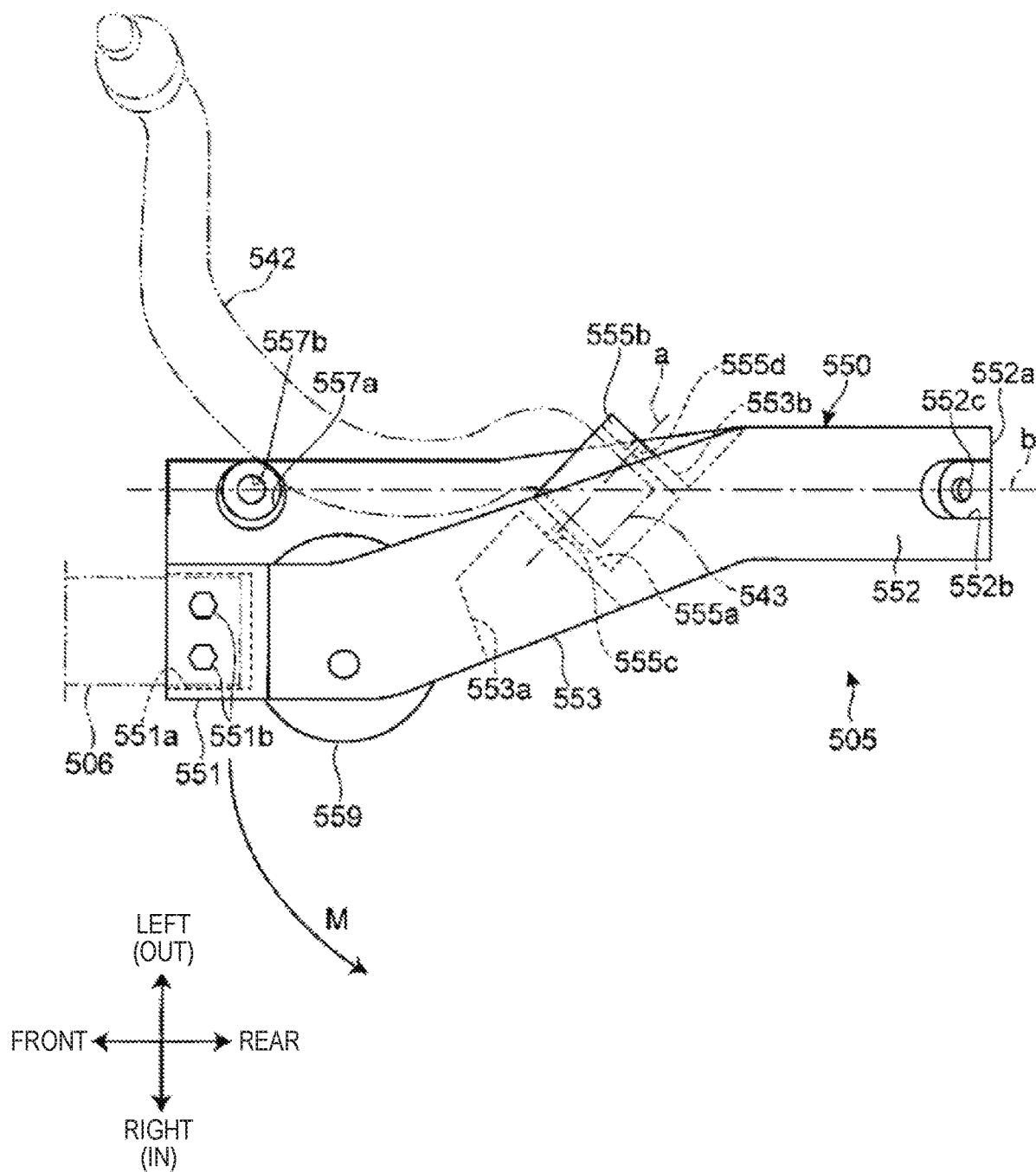
FIG. 17 is a bottom view illustrating the subframe of the second embodiment.

As illustrated in FIGS. 16 and 17, a body part 550 of the subframe 505 has a front part 551 to which the extension frame 506 is coupled, a rear part 552 extending in the front-and-rear direction and attached to a rear end part of the inclined part 512 of the frontside frame 501, and a middle part 553 coupling between the front part 551 and the rear part 552.

Since the front part 551 is disposed inward of the rear part 552, the front part 551 and the rear part 552 are provided so as to be offset in the width direction. The middle part 553 coupling the front part 551 and the rear part 552 is formed so as to spread outwardly to the rear.

As illustrated in FIG. 16, a coupling part 551a in a recessed shape which opens forward is formed in a front end face of the front part 551. A rear end part of the extension frame 506 is inserted from forward into and coupled to the coupling part 551a. The extension frame 506 and the coupling part 551a are fastened from a lower surface side of the front part 551 by fastening members 551b.

As illustrated in FIG. 17, a slot part 552b of a U-shape in cross section in the bottom view which opens rearward and downward is formed in a rear end part 552a of the rear part 552. A rear vehicle body attaching part 552c for fastening the subframe 505 to a rear part of the inclined part 512 of the frontside frame 501 by fastening members, such as a bolt, is formed in an upper surface of the slot part 552b (see FIG. 18). Note that as illustrated in FIG. 18, a recessed part 554a dented downward in the side view is formed in an upper surface part 554 forward of the slot part 552b.

As illustrated in FIGS. 16 and 17, a support part 555 of a recessed shape which opens outward for supporting a base end part 543 of the suspension link 542 is formed in the middle part 553. The details of the support part 555 of the suspension link 542 will be described later.

As illustrated in FIG. 18, from a rear half part of the middle part 553 to the rear part 552, its upper surface part 554 is formed so as to incline downward to the rear along a lower surface of the inclined part 512 of the frontside frame 501 in the side view.

Figure 19:
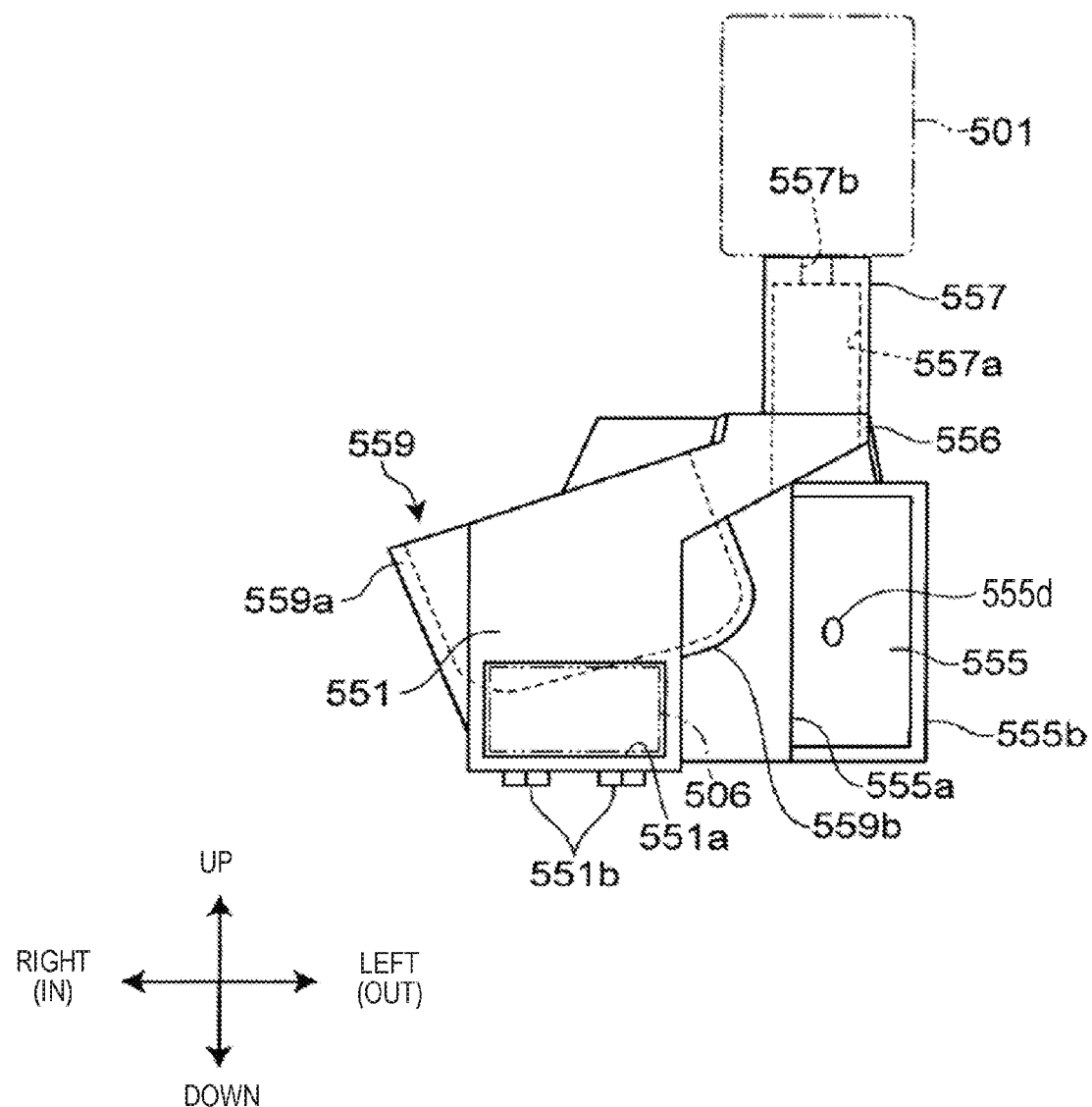
FIG. 19 is a front view illustrating the subframe of the second embodiment.

As illustrated in FIGS. 16 and 19, a roof part 556 as a deformation suppressing part which spreads outwardly is formed in upper parts of the front part 551 and a front half part of the middle part 553. The roof part 556 is formed so as to extend in the front-and-rear direction from a front end part of the front part 551 to the support part 555 of the middle part 553. The roof part 556 inclines upwardly to the outside. Thus, when the suspension link 542 disposed below the roof part 556 oscillates when the wheel bounces, the suspension link 542 interfering with the roof part 556 is avoided.

As illustrated in FIGS. 18 and 19, at a location between the front part 551 and the middle part 553 of the roof part 556 in the front-and-rear direction, a pillar-shaped pillar part 557 extending from an upper surface of the roof part 556 to a height of the lower surface of the front part 511 of the frontside frame 501 is provided. The pillar part 557 is formed in a hollow shape having a cylindrical space 557a extending upwardly therein. A second vehicle body attaching part 557b for attaching the subframe 505 to a lower surface of the front part 511 of the frontside frame 501 by a fastening member, such as a bolt, is provided to an upper surface of the pillar part 557. The second vehicle body attaching part 557b is rigidly coupled without any dumper element, such as a rubber bush. Thus, the rigidity between the pillar part 557 which constitutes the second vehicle body attaching part 557b and the frontside frame 501 is increased. Note that the space 557a inside the pillar part 557 is formed as an insert part into which a tool is inserted when attaching the subframe 505 to the frontside frame 501.

As illustrated in FIGS. 16 and 18, a rib part 558 extending from a rear end of the second vehicle body attaching part 557b to a rear part of the roof part 556 is provided to an upper surface of the roof part 556. The rib part 558 is formed so as to incline downward to the rear along a lower surface of the inclined part 512 of the frontside frame 501 in the side view. An upper surface 558a of the rib part 558 is formed continuously to the upper surface part 554 of the rear part 552 from the middle part 553.

Thus, the second vehicle body attaching part 557b and the rear vehicle body attaching part 552c are formed so as to continue through the rib part 558 and the upper surface part 554.

Figure 20:
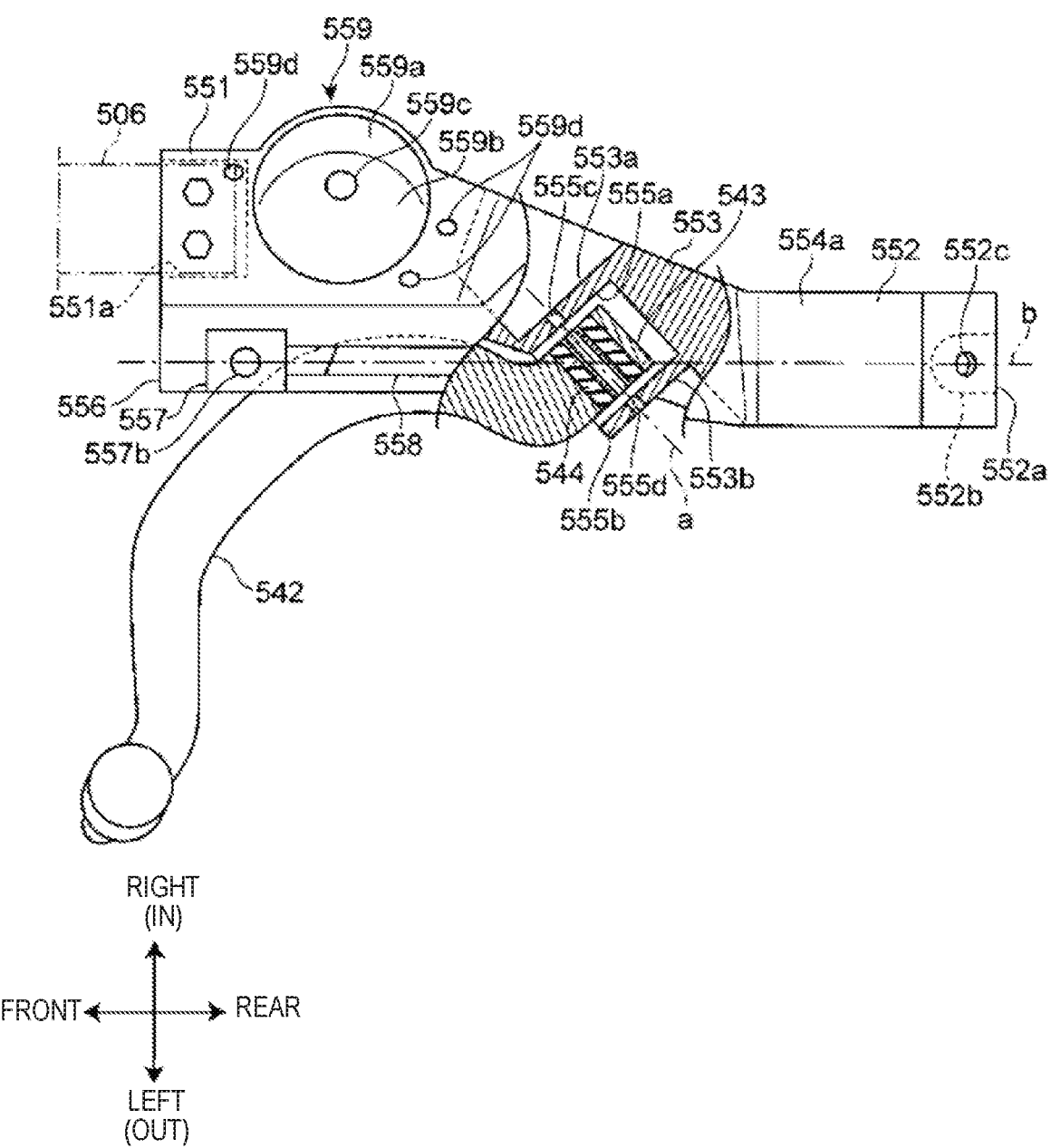
FIG. 20 is a partially cross-sectional plan view illustrating the subframe of the second embodiment.

As illustrated in FIGS. 19 and 20, a mount receiving part 559 as the mount support part which supports an engine mount (not illustrated) for mounting the engine 502 is provided rearward of the coupling part 551a of the front part 551.

The mount receiving part 559 has a cylindrical part 559a which inclines downwardly and inwardly, and a bottom part 559b which covers a lower end part of the cylindrical part 559a. The mount receiving part 559 is formed so that it bulges inwardly (engine room side) at an upper side and bulges to below the roof part 556 at a lower side. Note that a hole 559c for draining water is formed inward in the bottom part 559b. Mounting holes 559d are formed outside the mount receiving part 559, and a covering 521 (see FIG. 15) for a rubber bush of the engine mount is fixed thereto by using fastening members, such as bolts.

As illustrated in FIGS. 13 and 15, lower arms 541 and 542 of the suspension device of this embodiment are formed by two lower arms 541 and 542. The front lower arm 541 of the two lower arms 541 and 542 is comprised of a lateral link extending in the width direction, and an inner end part of the lateral lower arm 541 is pivotably supported by a bracket (not illustrated) attached behind the rear pillar part 567 of the extension frame 506.

The rear lower arm 542 of the two lower arms 541 and 542 is comprised of a compression link, and this compression lower arm 542 is provided so as to extend forward and outward from the support part 555 of the subframe 505. An inner end part of the compression lower arm 542 is pivotably supported by the support part 555 through a bush. Note that a "suspension link" in the present disclosure corresponds to the "compression lower arm."

Outward end parts of the lower arms 541 and 542 are rotatably coupled to knuckles 571, which are schematically illustrated, about axes extending in the up-and-down direction. Each knuckle 571 rotatably supports the front wheel 572 through a hub (not illustrated).

Next, a mounting structure of the compression lower arm 542 to the support part 555 is described with reference to FIGS. 16, 18, and 20.

The support part 555 is provided with wall parts 555a and 555b in the front-and-rear direction which form a recess. Insertion holes 555c and 555d into which a pin which penetrates and supports a bush 544 press-fitted into the base end part 543 of the compression lower arm 542 is inserted are formed in both the wall parts 555a and 555b, respectively.

Note that as illustrated in FIG. 20, a recessed part 553a which is located forward of the support part 555 and opens inwardly, and a recessed part 553b which is located rearward of the support part 555 and opens outwardly are formed in the middle part 553. These recessed parts 553a and 553b also function as inserting part for inserting a tool when attaching the compression lower arm 542 to the subframe 505.

As illustrated in FIG. 20, the compression lower arm 542 pivots about a rotation axis a which is a line segment connecting the insertion holes 555c and 555d. This rotation axis a is formed so that a front part thereof inclines inwardly in the plan view. Moreover, a line segment b which connects the rear vehicle body attaching part 552c and the second vehicle body attaching part 557b extends in the front-and-rear direction. The line segment b and the rotation axis a have a relation of crossing with each other in the plan view.

Next, operation and effects of the suspension link support structure and the suspension link support member of the vehicle according to this embodiment are described.

Since the frontside frames 501 and the extension frames 506 start a deformation after the main crash cans 516 and the subcrash cans 563 at the respective front ends are crushed when a front collision of the vehicle occurs, and the frontside frames 501 and the extension frames 506 collaboratively deform and absorb the impact, the load inputted during the front collision can be absorbed through the two paths and can then be transmitted to the vehicle body.

Moreover, the subframes 505 are coupled to the rear ends of the extension frames 506. The subframes 505 are each fastened to the front part 511 of the frontside frame 501 and the rear part of the inclined part 512 of the frontside frame 501 through the two vehicle body attaching parts 552c and 557b. Therefore, since the support rigidity of the subframes 505 is increased, the impact absorbing function of the extension frames 506 can be promoted.

As illustrated in FIG. 20, in the plan view, the rotation axis "a" of the compression lower arm 542, and the line segment "b" which connects the rear vehicle body attaching part 552c and the second vehicle body attaching part 557b are provided so as to intersect with each other. Since the support part 555 of the compression lower arm 542 is provided to the part where the mounting rigidity is increased by providing the rear vehicle body attaching part 552c and the second vehicle body attaching part 557b of the subframe 505, the input from the compression lower arm 542 which is caused by a behavior change of the vehicle can be efficiently received by the vehicle body. As a result, increases in the weight and the size of the structure by increasing the rigidity of the subframe 505 can be avoided.

Moreover, since the mount receiving parts 559 of the power train are provided to the subframes 505, they have the function for supporting the mount of the power train.

As described above, the subframes 505 have the three functions of the suspension link support function, the mount support function of the power train, and the function for promoting the impact absorption during a front collision.

Moreover, for example, as compared with the subframe which is formed by the left and right side parts which are disposed below the frontside frames 501 and support the suspension link, and pillar-shaped tower parts which stand up from the left and right side parts and connect the frontside frames 501 and the left and right side parts, since in this embodiment the subframes 505 have the functions of the left and right side parts and the tower parts, the number of components and the number of assembly processes can be reduced.

Since the subframes 505 are dividedly disposed on the left and right, the increase in the weight can be suppressed, as compared with the case where the pair of left and right side parts are coupled through the front side part like the subframes disclosed in Patent Document 1.

Since the load absorption of the extension frames 506 is promoted by the subframes 505 to certainly absorb the front collision load, and the engine 502 is supported by the subframes 505, the rearward movement of the power train can be suppressed effectively.

In the second embodiment, the pillar part 557 which constitutes the second vehicle body attaching part 557b is integrally provided to the upper surface of the mount receiving part 559. That is, the subframe 505 is fixed to the frontside frame 501 by the mount receiving part 559. Therefore, also in the second embodiment, the vibration of the power trains 502 and 503 which cannot be absorbed by the PT mounts (not illustrated) is directly transmitted to the frontside frames 501 from the mount receiving parts 559. Therefore, the vibration transmitting path from the mount receiving parts 559 to the frontside frames 501 can demonstrate the vibration characteristic close to a rigid body as a whole, and, thereby, the vibration of the power trains 502 and 503 can be reduced effectively by the PT mounts demonstrating the desired damping performance.

Third Embodiment

Below, the details of a subframe structure 700 according to a third embodiment are described with reference to FIGS. 21 to 29.

A vehicle body front part structure 601 provided with the subframe structure 700 of this embodiment is described with reference to FIGS. 21 to 23.

Figure 21:
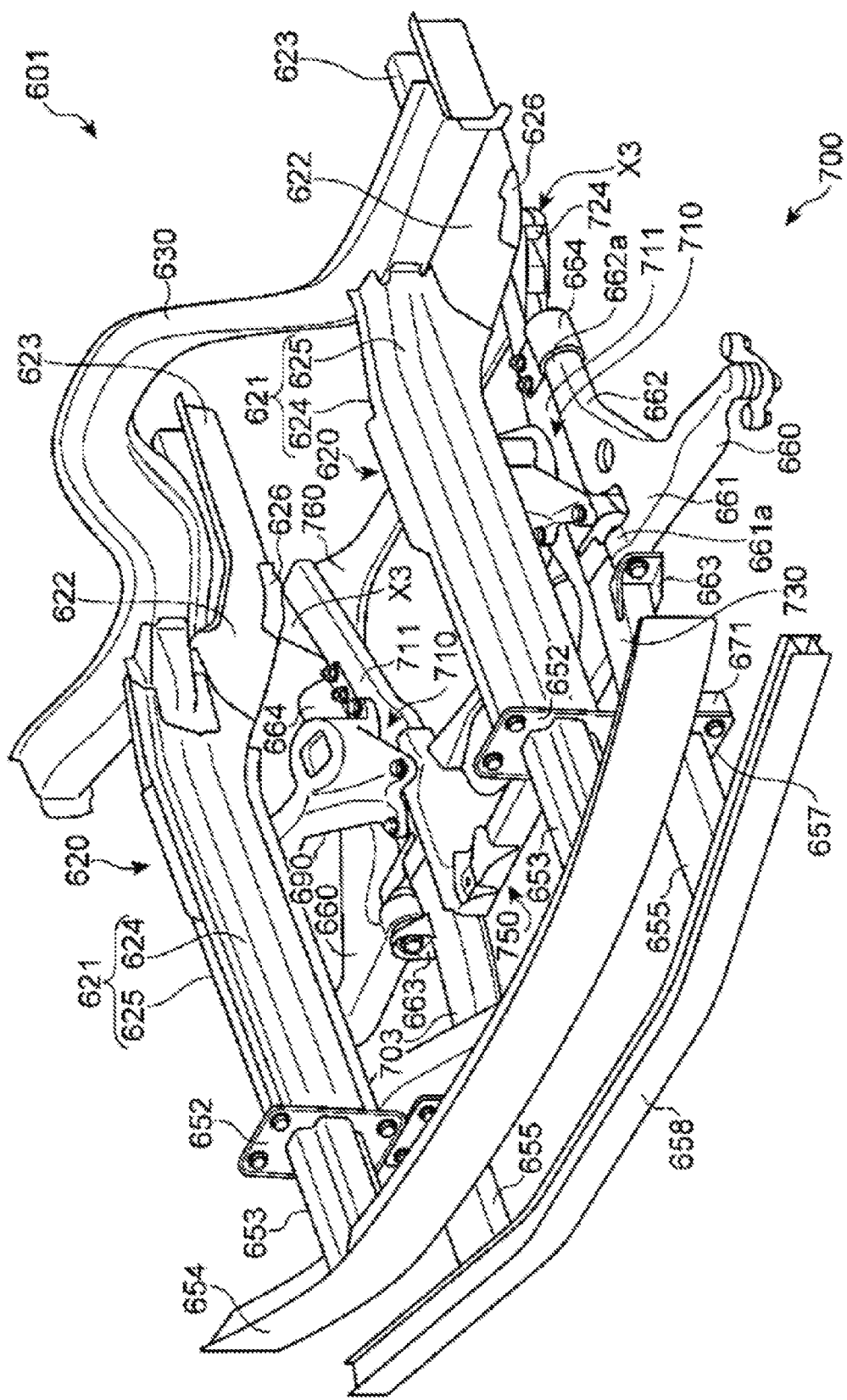
FIG. 21 is a perspective view of a vehicle body front part provided with a subframe structure according to a third embodiment.
Figure 22:
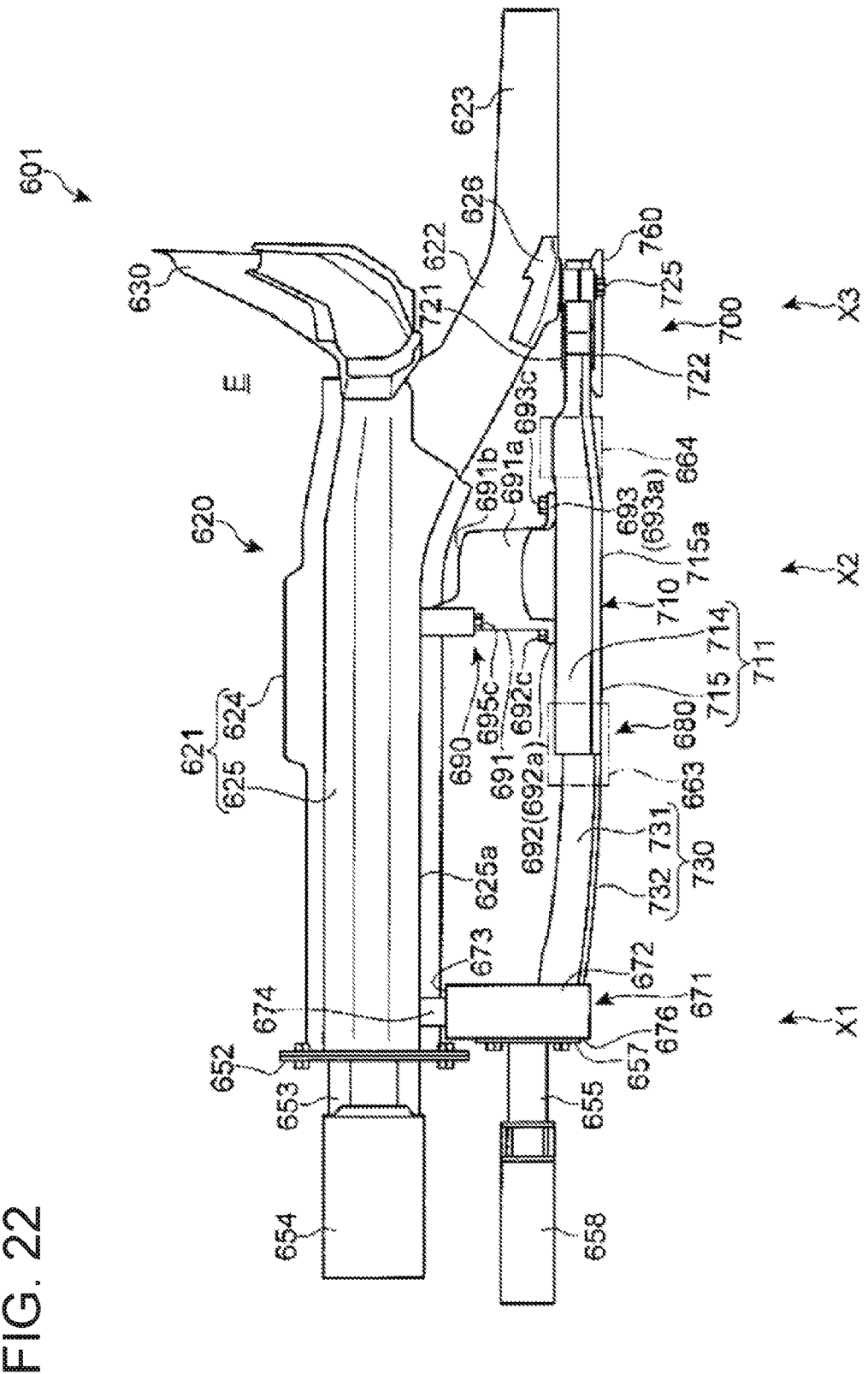
FIG. 22 is a side view of the vehicle body front part provided with the subframe structure according to the third embodiment.

As illustrated in FIGS. 21 and 22, the vehicle body front part structure 601 includes a pair of left and right frontside frames 620 extending in the front-and-rear direction, a dash cross 630 which is disposed along a front surface of a dash panel (not illustrated) and couples between the frontside frames 620, and the subframe structure 700 disposed below both the frontside frames 620.

In this embodiment, the drive system of the vehicle is a Front-engine Rear-drive (FR). A power train 604 provided with a longitudinal engine 641 and a transmission 642 coupled to a rear part of the engine is disposed in an engine bay E between the frontside frames 620 (see FIG. 23).

Each frontside frame 620 has a front straight part 621 extending substantially horizontally to forward from the dash cross 630, an inclined part 622 extending obliquely downward to the rear from a rear end part of the front straight part 621, and a rear straight part 623 extending substantially horizontally rearward further from a lower end part of the inclined part 622.

The front straight part 621 of each frontside frame 620 has an inner panel 624 located inward, and an outer panel 625 located outward, and it is constructed by joining the inner and outer panels in the width direction. The inner panel 624 has a hat shape in cross section which opens outward, and the outer panel 625 has a hat shape in cross section which opens inward. The inner and outer panels 624 and 625 extend in the front-and-rear direction. The outer panel 625 and the inner panel 624 are joined to each other between their upper edge parts and between their lower edge parts. Thus, the front straight part 621 forms a closed section which continues in the front-and-rear direction by a frame itself.

The inclined part 622 of each frontside frame 620 has a hat shape in cross section which opens upwardly. The inclined part 622 is disposed so that its rear part is lower along the shape of the dash panel (not illustrated), and an upper edge part of the inclined part 622 is joined to the dash panel. Thus, a closed section which continues in the front-and-rear direction is formed between the inclined part 622 and the dash panel.

The rear straight part 623 of the frontside frame 620 is connected at a rear end part thereof to a front end part of a floor frame (not illustrated) extending in the front-and-rear direction. A floor panel (not illustrated) is joined onto the rear straight part 623 and the floor frame, and a front edge of the floor panel is coupled to the dash panel. The rear straight part 623 and the floor frame have a hat shape in cross section which opens upwardly, and a closed section which continues in the front-and-rear direction is formed between the rear straight part 623 and the floor frame, and the floor panel.

A front end of each frontside frame 620 is coupled to a main crash can 653 comprised of a cylindrical body which absorbs the impact load from forward of the vehicle body through a set plate and an attaching plate 652. A bumper reinforcement 654 extending in the width direction is attached to front end faces of the pair of left and right main crash cans 653.

Next, the subframe structure 700 described above is described with reference to FIG. 23 in addition to FIGS. 21 and 22. The subframe structure 700 includes a pair of left and right subframes 710 which are disposed below the frontside frames 620 and support lower arms 660 as suspension links for the front wheels, a pair of left and right extension frames 730 which are joined to front ends of the subframes 710 and extend forward, and first to third cross members 740, 750, and 760 which couple between the left and right subframes 710 and between the left and right extension frames 730.

A subcrash can 655 extends forward from a front end part of the extension frame 730. A subbumper reinforcement 658 extending in the width direction is provided forward of the subcrash cans 655. The left and right subcrash cans 655 are coupled to each other through the subbumper reinforcement 658.

Each lower arm 660 supported by the subframe 710 has a front arm part 661 extending substantially parallel to the width direction, and a rear arm part 662 extending substantially horizontally inward and rearward from an intermediate part of the front arm part 661 in the width direction. The lower arm 660 is formed in a substantially L-shape as a whole in the plan view.

A front coupling part 661a which is coupled to a comparatively forward part of the subframe 710, and a rear coupling part 662a which is coupled to a comparatively rearward part of the subframe 710 are formed inward of the lower arm 660. The front coupling part 661a is provided to an inner end part of the front arm part 661, and the rear coupling part 662a is provided to a rear end part of the rear arm part 662.

The front coupling part 661a of the front arm part 661 is pivotably supported about an axis extending in the front-and-rear direction by a front bracket 663 attached to both the front end part of the subframe 710 and the rear end part of the extension frame 730. On the other hand, the rear coupling part 662a of the rear arm part 662 is pivotably supported about an axis extending in the front-and-rear direction by a rear bracket 664 attached to the subframe 710.

Figure 24:
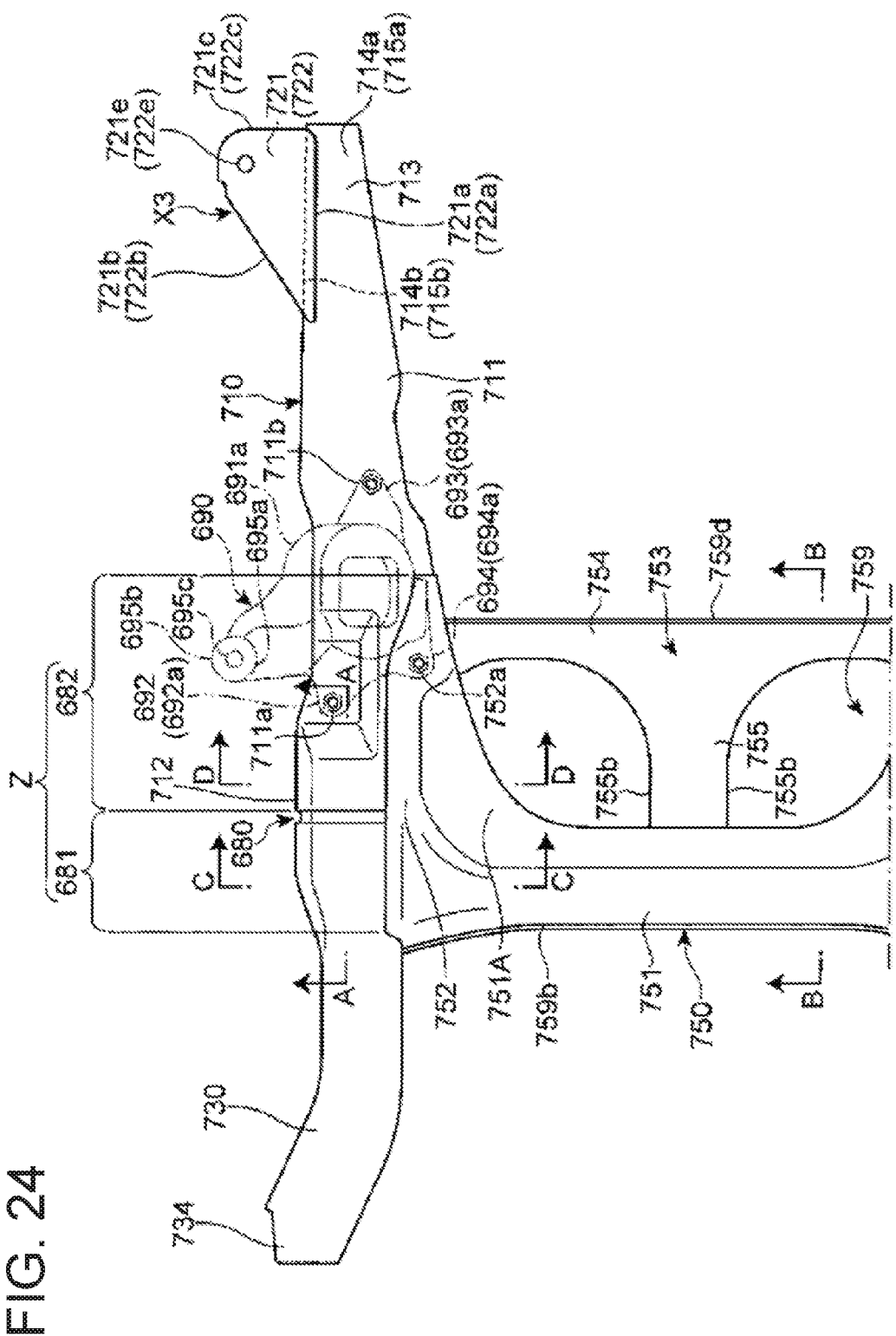
FIG. 24 is an enlarged view of a joined part of the subframe, the extension frame, and the second cross member in FIG. 23.

As illustrated in FIGS. 24 and 25, the subframe 710 has a body part 711 which supports the lower arm 660. The rear end part of the extension frame 730 is connected to a front end part 712 of the body part 711 of the subframe 710. Note that a rear end part 713 of the body part 711 is fixed to the frontside frame 620 through a rear vehicle body attaching part X3 described later.

The body part 711 of the subframe 710 is an elongated part disposed so as to extend in the front-and-rear direction. The body part 711 is provided with an upper member 714 having a channel shape in cross section which opens downwardly, and a lower member 715 having a channel shape in cross section which opens upwardly. A lower edge part of the upper member 714 and an upper edge part of the lower member 715 are joined to each other by welding, for example. The body part 711 forms a closed section which continues in the front-and-rear direction between the upper member 714 and the lower member 715.

In detail, the upper member 714 includes an upper surface part 714a, and an outer surface part 714b and an inner surface part 714c in the width direction, and the lower member 715 includes a lower surface part 715a, and an outer surface part 715b and an inner surface part 715c in the width direction. By joining the outer surface parts 714b and 715b and the inner surface parts 714c and 715c of the upper member 714 and the lower member 715, a closed section which continues in the front-and-rear direction is formed (see FIG. 25(d)).

Figure 25A:
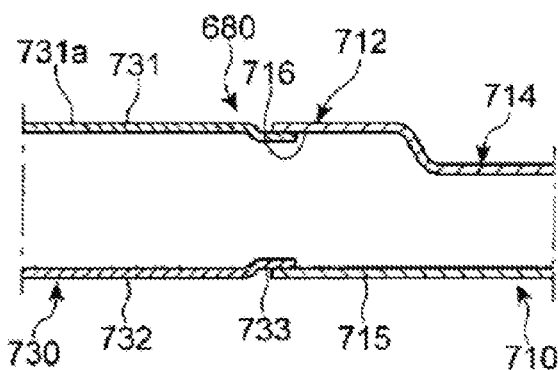
FIG. 25(a) is a cross-sectional view taken along a line A-A of FIG. 24.

By the upper member 714 and the lower member 715, an opening 716 (see FIG. 25(a)) is formed in the front end part 712 of the body part 711 of the subframe 710.

Figure 25B:
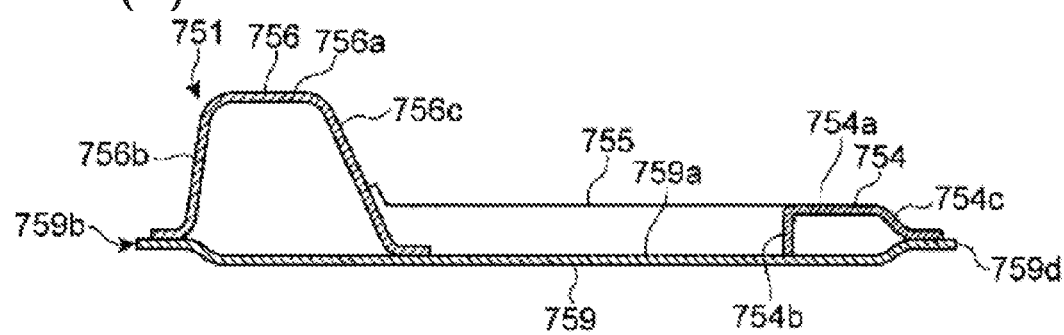
FIG. 25(b) is a cross-sectional view taken along a line B-B.
Figure 25C:
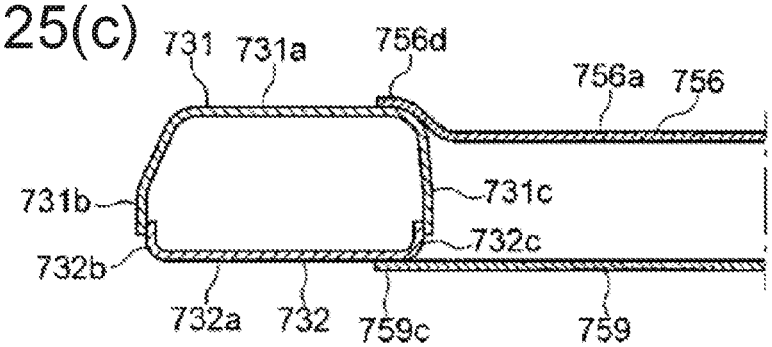
FIG. 25(c) is a cross-sectional view taken along a line C-C.

As illustrated in FIGS. 25(a) and 25(c), similar to the body part 711 of the subframe 710, the extension frame 730 forms a closed section which continues in the front-and-rear direction by a frame itself comprised of an upper member 731 having a channel shape in cross section which opens downwardly, and a lower member 732 having a channel shape in cross section which opens upwardly.

In detail, the upper member 731 includes an upper surface part 731a, and an outer surface part 731b and an inner surface part 731c in the width direction, and the lower member 732 includes a lower surface part 732a, and an outer surface part 732b and an inner surface part 732c in the width direction. By joining the outer surface parts 731b and 732b and the inner surface parts 731c and 732c of the upper member 731 and the lower member 732, a closed section which continues in the front-and-rear direction is formed (see FIG. 25(c)).

Note that a rear end part 733 of the extension frame 730 is formed so that it becomes smaller in the outer diameter than a part forward of the rear end part 733.

By inserting the rear end part 733 of the extension frame 730 into the opening 716 (see FIG. 25(a)) of the front end part 712 of the body part 711 of the subframe 710, both the frames 710 and 730 are coupled to each other. In a connecting part 680 between both the frames 710 and 730, the frames 710 and 730 are joined by welding, for example.

Thus, the extension frame 730 and the subframe 710 continue integrally in the front-and-rear direction (see FIG. 25(a)).

In this embodiment, the extension frame 730 is set lower in the rigidity against the input load in the front-and-rear direction than the subframe 710. Therefore, the front extension frame 730 among the extension frame 730 and the subframe 710 which continue in the front-and-rear direction, can bear the load absorption function, and the rear subframe 710 can bear the function as the load receiving part.

Next, the first to third cross members 740, 750, and 760 provided between the left and right subframes 710 and the left and right extension frames 730 of the subframe structure 700 are described with reference to FIG. 23.

The first cross member 740 of a frame shape extending substantially linearly so as to bridge between front end parts 734 of the pair of left and right extension frames 730 in the width direction is attached to the front end parts 734 of the extension frames 730.

The connecting part 680 of the right subframe 710 and the extension frame 730, and the connecting part 680 of the left subframe 710 and the extension frame 730 are coupled to each other through the second cross member 750.

The second cross member 750 has a front side part 751 which extends in the width direction and couples between the left and right extension frames 730, left and right side parts 752 extending rearwardly from left and right ends of the front side part 751, and a reinforcement frame 753 disposed between the left and right side parts 752. The reinforcement frame 753 has a transverse frame part 754 which extends in the width direction and couples between rear end parts of the left and right side parts 752, and a longitudinal frame part 755 which extends in the front-and-rear direction and couples between the transverse frame part 754 and the front side part 751.

As illustrated in FIG. 25(b), the front side part 751 is comprised of a front side part upper member 756 which extends in the width direction and has a channel shape in cross section which opens downwardly, and a lower member 759 of a plate shape which closes the opening of the front side part upper member 756. The lower member 759 is larger in the width than the front side part upper member 756 in the front-and-rear direction, and is disposed so as to project rearward of the front side part upper member 756. Moreover, the lower member 759 is disposed in an area in the front-and-rear direction over the extension frame 730 and the subframe 710.

The front side part upper member 756 has an upper surface part 756a, a front surface part 756b, and a rear surface part 756c. The front side part upper member 756 is disposed on an upper surface 759a of the lower member 759, and the front surface part 756b is disposed along a front end part 759b of the lower member 759. By joining lower ends of the front surface part 756b and the rear surface part 756c to the upper surface of the lower member 759, a closed section which continues in the width direction is formed between the front side part upper member 756 and the lower member 759.

As illustrated in FIG. 25(c), the upper surface part 756a of the front side part upper member 756 is joined at both edge parts 756d in vehicle width direction to the upper surface parts 731a of the extension frames 730.

Figure 25D:
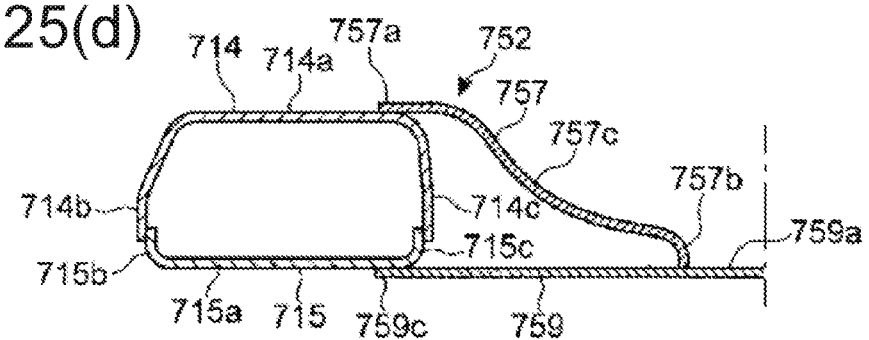
FIG. 25(d) is a cross-sectional view taken along a line D-D.
Figure 26:
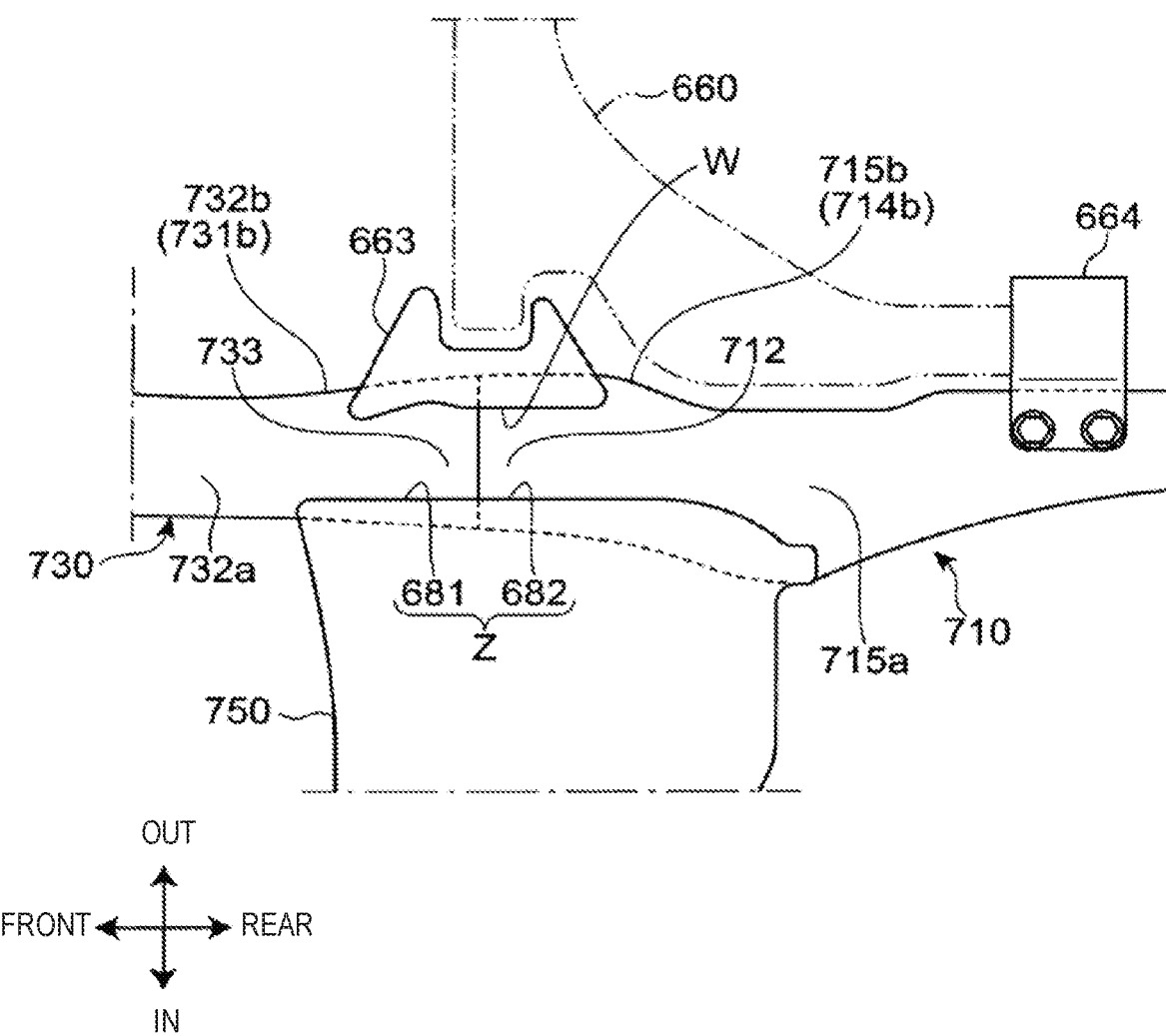
FIG. 26 is an enlarged bottom view of a joined part of the subframe, the extension frame, the second cross member, and a front bracket.

As illustrated in FIGS. 25(c) and 25(d), both end parts 759c, 759c in the width direction of the lower member 759 are joined to the lower surface parts 732a of the extension frames 730 and the lower surface parts 715a of the body parts 711 of the subframes 710.

As illustrated in FIG. 25(d), the left and right side parts 752 are comprised of left and right side part upper members 757 which integrally continue to the front side part upper member 756, and the lower member 759, respectively. Each of the left and right side part upper members 757 is disposed so as to extend in the front-and-rear direction, and continues at its front end part to the front side part upper member 756. Thus, the front side part upper member 756 and the left and right side part upper members 757 are formed in a U-shape as a whole which opens rearwardly in the plan view (see FIG. 23).

In the left and right side part upper members 757, an inner edge part 757b is disposed lower than an outer edge part 757a. Each of the left and right side part upper members 757 has a slope part 757c which is gradually lower toward the inner edge part 757b from the outer edge part 757a.

The inner edge part 757b of each of the left and right side part upper members 757 is joined to the upper surface 759a of the lower member 759, and the outer edge part 757a is joined to the upper surface part 714a of the body part 711 of the subframe 710.

Thus, each of the left and right side part upper members 757, the lower member 759, and the inner surface parts 714c and 715c of the body part 711 of the subframe 710 form a closed section which continues in the front-and-rear direction.

Figure 23:
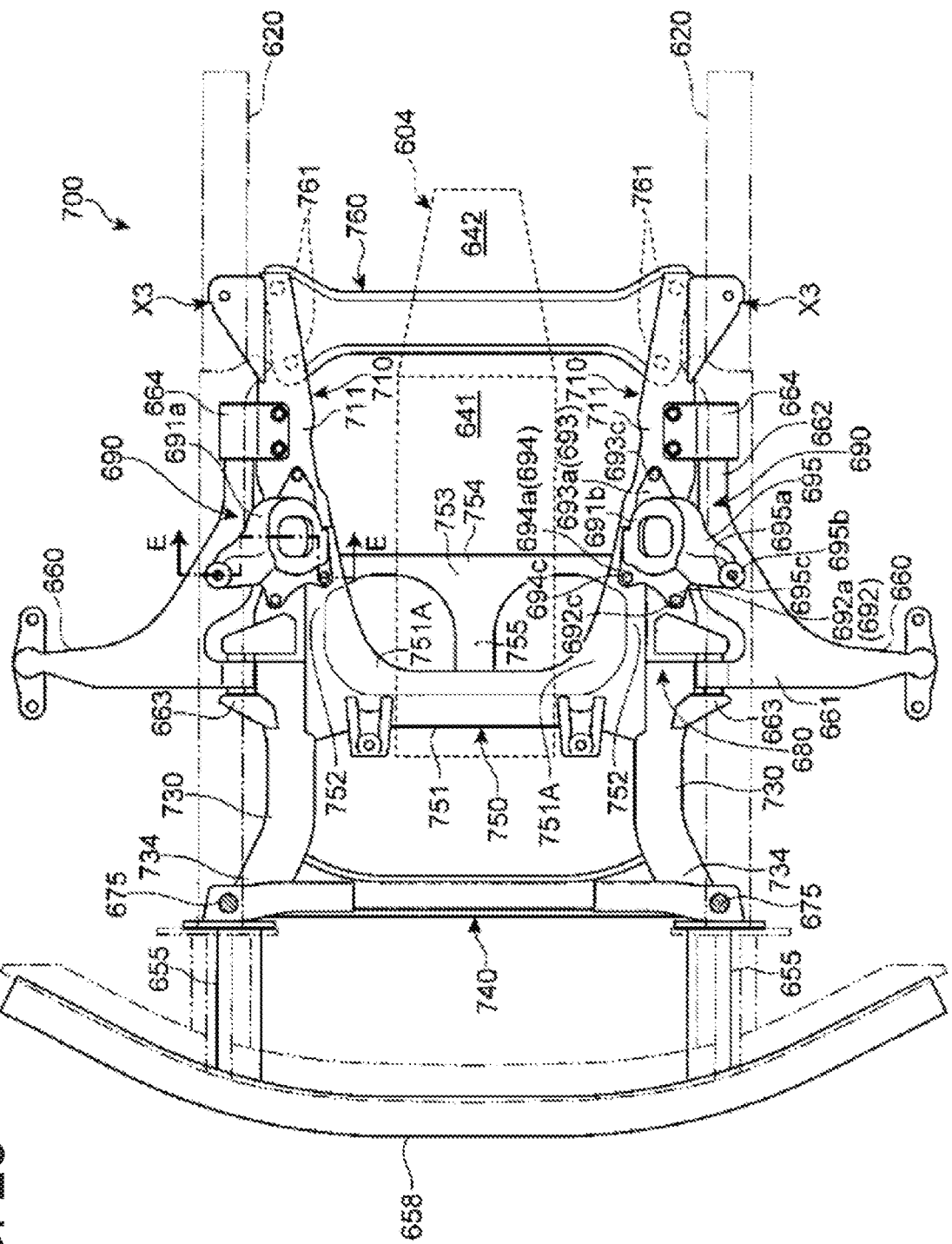
FIG. 23 is a plan view of a suspension subframe structure according to the third embodiment.

As illustrated in FIG. 23, each of the left and right side parts 752 of the second cross member 750 has a width gradually expanded forward in the plan view. A reinforcement part 751A having an arc-shaped contour is formed at a corner part between the front side part 751 and each of the left and right side parts 752. Thus, since the rigidity against the lateral force from the lower arm 660 of the suspension device is increased, an inward deformation of the subframe 710 and the extension frame 730 is suppressed.

As described above, the second cross member 750 includes the reinforcement frame 753 which forms a substantially T-shape by the transverse frame part 754 which couples between rear end parts of the left and right side parts 752 of the second cross member 750, and the longitudinal frame part 755 which couples a middle part of the transverse frame part 754 and a middle part of the front side part 751.

As illustrated in FIG. 25(b), the transverse frame part 754 extends in the width direction and is formed in a channel shape in cross section which opens downwardly. On the other hand, the longitudinal frame part 755 extends in the front-and-rear direction and is formed in a channel shape in cross section which opens downwardly.

The transverse frame part 754 has an upper surface part 754a, a front surface part 754b forward of the upper surface part 754a, and a rear surface part 754c rearward of the upper surface part 754a, and the rear surface part 754c is disposed along a rear end part 759d of the lower member 759. The front surface part 754b and the rear surface part 754c of the transverse frame part 754 are joined to the upper surface of the lower member 759. Thus, a closed section which continues in the width direction is formed between the transverse frame part 754 and the lower member 759. Note that both side parts of the transverse frame part 754 are joined to the slope parts 757c of the left and right side parts 752, respectively (see FIGS. 23 and 24).

The longitudinal frame part 755 has an upper surface part and both side surface parts 755b, 755b in the width direction, and lower end parts of the both side surface parts 755b are joined to the lower member 759. Thus, a closed section which continues in the front-and-rear direction is formed between the longitudinal frame part 755 and the lower member 759. Note that a front end part of the longitudinal frame part 755 is joined to the rear surface part 756c of the front side part 751.

Here, a joined area Z of the second cross member 750, and the subframe 710 and the extension frame 730 is described in detail with reference to FIG. 24.

As described above, the outer edge part 756d of the front side part upper member 756 of the second cross member 750, and the outer edge part 757a of each of the left and right side part upper members 757 of the second cross member 750 are joined to the upper surface part 731a of the rear end part 733 in the extension frame 730, and the upper surface part 714a of the front end part 712 in the subframe 710, respectively.

The both end parts 759c, 759c of the lower member 759 are joined to the lower surface part 732a of the rear end part 733 in the extension frame 730 and the lower surface part 715a of the front end part 712 in the subframe 710.

Thus, since the second cross member 750 bridges between the extension frame 730 and the subframe 710 over the connecting part 680 of the extension frame 730 and the subframe 710, and is joined to the extension frame 730 and the subframe 710 so as to be caught from inward, vertical and inward bending of the connecting part 680 between the frames 710 and 730 is particularly suppressed.

Moreover, as described above, the lower arm 660 of the suspension device is supported through the front bracket 663 by the outer side surfaces 732b, 731b, 714b, and 715b of the rear end part 733 of the extension frame 730 and the front end part 712 of the subframe 710. As illustrated in the bottom view of FIG. 26, the front bracket 663 is joined to the lower surface parts 715a and 732a on the outer side surfaces 732b, 731b, 714b, and 715b side of the rear end part 733 of the extension frame 730 and the front end part 712 of the subframe 710 so that it continues to both the frames 710 and 730 (W).

Thus, the connecting part 680 of the extension frame 730 and the subframe 710 is reinforced by the left and right side parts 752 of the second cross member 750 inward in the width direction, and is reinforced by the front bracket 663 outward in the width direction. As a result, the bending deformation at the connecting part 680 between both the frames 730 and 710 can be suppressed more effectively. Note that the reinforcement of the connecting part 680 of the frames 710 and 730 is achieved by using the front bracket 663 outward in the width direction, without using additional components.

As illustrated in FIG. 24, the outer end part of the second cross member 750 is joined to both the extension frame 730 and the subframe 710. That is, the joined area Z of the second cross member 750 to the extension frame 730 and the subframe 710 has an extension frame side joined area 681 joined to the extension frame 730, and a subframe side joined area 682 joined to the subframe 710.

The dimension of the joined area Z in the front-and-rear direction is set shorter in the extension frame side joined area 681 than in the subframe side joined area 682.

By avoiding that the extension frame side joined area 681 is formed longer than needed, a deformation of the extension frame 730 is suppressed during the impact-load input from forward of the vehicle body is impeded by the second cross member 750. Therefore, it is possible to suitably exhibit the impact absorbing function of the extension frame 730.

On the other hand, by forming the subframe side joined area 682 comparatively long, the strength and the rigidity of the subframe 710 against the load in the front-and-rear direction are improved. Therefore, the subframes 710 can suitably exhibit the function as the load receiving part during the impact-load input from forward of the vehicle body, and thus, the extension frames 730 are able to suitably exhibit the impact absorbing function.

As illustrated in FIG. 23, the third cross member 760 which connects the rear end parts 713 of the subframes 710 in the width direction is coupled to the rear end parts 713. The third cross member 760 is a plate member extending in the width direction, and is fixed from below to the rear end parts 713 of the subframes 710 with a plurality of bolts 761.

Further, as illustrated in FIG. 22, three attaching parts of a front vehicle body attaching part X1, a middle vehicle body attaching part X2, and the rear vehicle body attaching part X3 are provided to each of the left and right of the subframe structure 700, as the attaching parts to the frontside frames 620, and these are described next.

Each front vehicle body attaching part X1 is comprised of a connecting member 671 provided to the front end part 734 of the extension frame 730. In detail, the connecting member 671 is connected at its lower part 672 to the extension frame 730, and is formed in a tower shape extending upwardly from the connected part.

Further, the connecting member 671 is formed in a hollow box shape, and an upper surface part 673 outward in the width direction is attached to a lower surface 625a of the outer panel 625 of the frontside frame 620 through a mount bush 674 by a fastening member 675.

Note that the subcrash can 655 is connected to a vertical-wall like front surface 676 of the connecting member 671 through an installation plate 657.

The middle vehicle body attaching part X2 is comprised of a power train mount bracket (hereinafter, may also referred to as "the mount bracket") 690 ("mount support part" in the present disclosure) for accommodating the power train mount (not illustrated) which elastically supports the power train 604. Note that the detail of the mount bracket 690 will be described later.

As illustrated in FIGS. 22 and 23, the rear vehicle body attaching part X3 is provided at a side of the rear end part 713 of the body part 711 of the suspension subframe 710. The rear vehicle body attaching part X3 has an upper plate member 721 disposed above, and a lower plate member 722 disposed below.

As illustrated in FIG. 24, the upper plate member 721 and the lower plate member 722 have side edge parts 721a and 722a extending parallel to the outer side surfaces 714b and 715b of the suspension subframe 710, front edge parts 721b and 722b extending in a direction which inclines outwardly and rearwardly, and rear edge parts 721c and 722c connecting rear end parts of the side edge parts 721a and 722a and the front edge parts 721b and 722b, respectively, and are formed in a substantially triangular shape in the plan view as a whole.

The upper plate member 721 and the lower plate member 722 are coupled to each other by welding the flange parts (not illustrated) provided to the rear edge parts 721c and 722c.

The side edge part 721a of the upper plate member 721 is joined to the upper surface 714a of the rear part in the body part 711 of the suspension subframe 710, for example, by welding, and the side edge part 722a of the lower plate member 722 is joined to the lower surface 715a of the rear part in the body part 711 of the suspension subframe 710. Thus, the rear vehicle body attaching part X3 is joined to the body part 711 of the suspension subframe 710.

In the upper plate member 721 and the lower plate member 722 of the rear vehicle body attaching part X3, bolt insertion holes 721*e* and 722*e* for fastening the suspension subframe 710 to the frontside frame 620 at locations separated from the body part 711 of the suspension subframe 710 outward in the width direction are formed.

Between the upper plate member 721 and the lower plate member 722, a sleeve member 724 (see FIG. 21) fixed to the frontside frame 620 with a bolt 725 is provided. The sleeve member 724 is connected to the body part 711 through the upper plate member 721 and the lower plate member 722.

On the other hand, a bracket 626 for fixing the rear vehicle body attaching part X3 is joined to the rear end part of the inclined part 622 of the frontside frame 620 from below. A weld nut (not illustrated) with which the bolt 725 is threadedly engaged is joined to an upper surface of the bracket 626.

In the rear vehicle body attaching part X3, a tip-end part of the bolt 725 which is inserted from below into the bolt insertion hole 722*e* of the lower plate member 722, a hole (not illustrated) of the sleeve member 724, and the bolt insertion hole 721*e* of the upper plate member 721 are threadedly engaged with the weld nut of the bracket 626. Thus, in the rear vehicle body attaching part X3, the suspension subframe 710 is fixedly fastened to the lower surface of the frontside frame 620.

Figure 27:
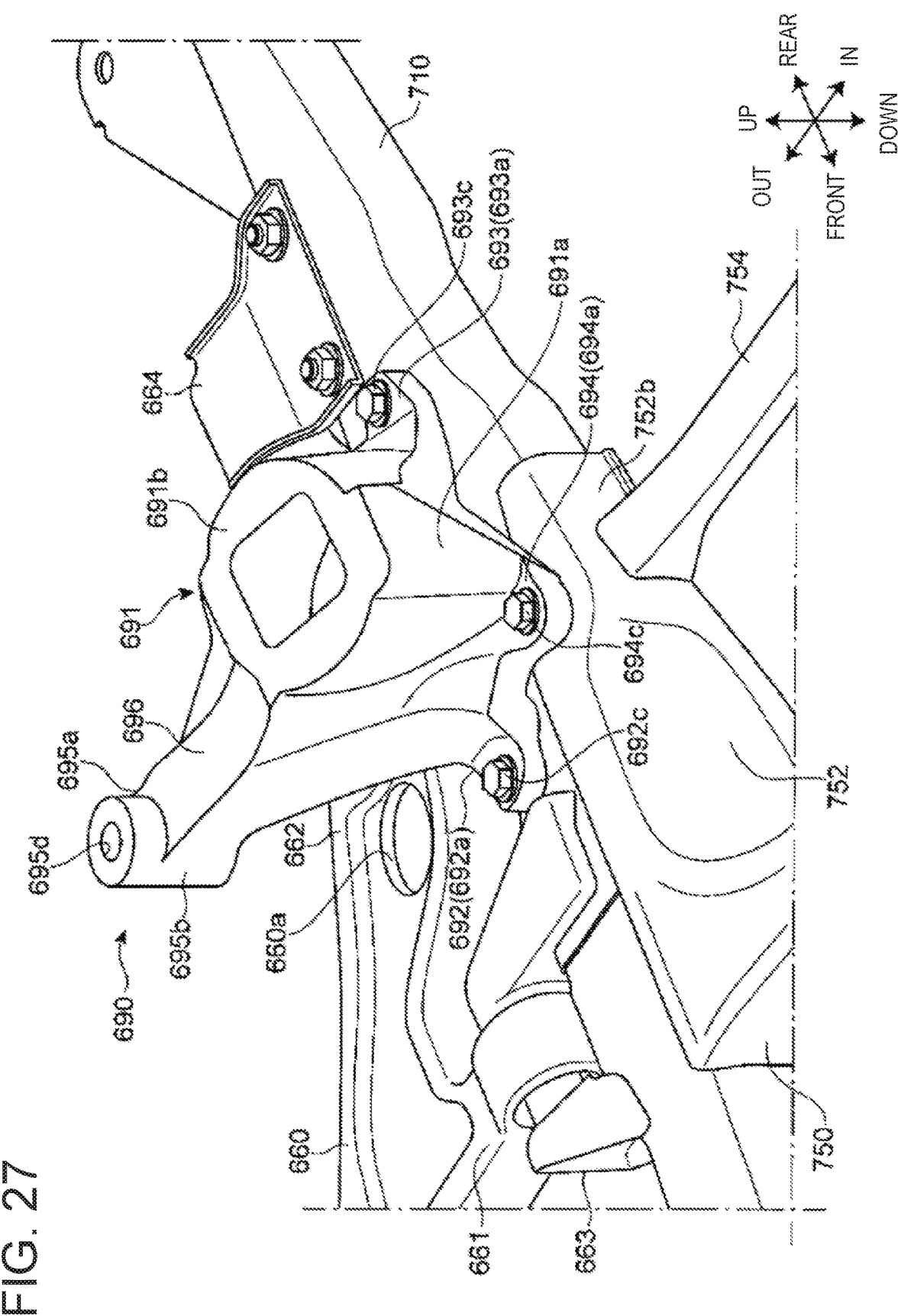
FIG. 27 is an enlarged perspective view illustrating a power train mount and its periphery.

Here, the mount bracket 690 is described in detail with reference to FIGS. 27 to 29.

In this embodiment, the mount bracket 690 is integrally molded by casting, such as aluminum die-casting. Note that the material of the mount bracket 690 is not limited to aluminum.

A hollow accommodating part 691 having an accommodation space which opens downwardly is formed in the mount bracket 690. For example, the accommodating part 691 is formed in a cylindrical shape. Amount support structure (not illustrated) connected to the power-train-side bracket provided to the power train 604 side is accommodated in the accommodating part 691. Note that since the accommodation method and the shape of the mount support structure are similar to those of the first embodiment, description thereof is omitted.

A plurality of fastening parts 692, 693, and 694 for being fastened to the subframe structure 700 are provided to the mount bracket 690. The plurality of fastening parts 692, 693, and 694 are comprised of the front fastening part 692 provided to a front edge part of the mount bracket 690, the rear fastening part 693 provided to a rear edge part of the mount bracket 690, and the middle fastening part 694 disposed between the front fastening part 692 and the rear fastening part 693 in the front-and-rear direction.

These fastening parts 692, 693, and 694 are comprised of a plurality of flange parts 692*a*, 693*a*, and 694*a* extending outwardly from a lower end part of an outer circumferential part 691*a* of the accommodating part 691 in the mount bracket 690. These flange parts 692*a*, 693*a*, and 694*a* are each provided with a bolt insertion hole (not illustrated), and are fastened to the subframe 710 and the second cross member 750 with bolts 692*c*, 693*c*, and 694*c* inserted into the bolt insertion holes.

On the other hand, bolt fastening holes 711*a* and 711*b* for attaching the mount bracket 690 are provided at locations of the subframe 710 corresponding to the bolt insertion holes of the front fastening part 692 and the rear fastening part 693 of the mount bracket 690 (see FIG. 24).

Note that the front fastening part 692 is fixed to the subframe 710 at a location close to the front bracket 663 of the front side lower arm 661 of the suspension device. The rear fastening part 693 is fixed to the subframe 710 at a location close to the rear bracket 664 of the rear lower arm 662 of the suspension device. Thus, the vibration caused by the oscillation of the suspension device can be received by the high rigidity part to which the mount bracket 690 of the subframe 710 is fastened.

A bolt fastening hole 752*a* for attaching the mount bracket 690 is formed in each of the left and right side parts 752 of the second cross member 750 at a location corresponding to a bolt insertion hole 694*b* of the middle fastening part 694 (see FIG. 24).

The middle fastening part 694 is fixed to a rear end part 752*b* of each of the left and right side parts 752 of the second cross member 750 at substantially the same location as the transverse frame part 754 of the reinforcement frame 753 in the front-and-rear direction.

Concretely, the fastening part of the mount bracket 690 is described with reference to FIG. 28, which is the middle fastening part 694, for example. The middle fastening part 694 is fastened to the rear end part 752*b* of each of the left and right side parts 752 of the second cross member 750, as described above.

In the rear end part 752*b* of each of the left and right side parts 752, each of the left and right side part upper members 757 has a substantially L-shape in cross section which opens outwardly and downwardly, when seen in the front-and-rear direction of the vehicle body. A bolt insertion hole 757*e* for fastening the mount bracket 690 is formed in an upper surface 757*d* of each of the left and right side part upper members 757.

A bolt insertion hole 759*e* is formed in the lower member 759 at a location corresponding to the bolt insertion hole 757*e* of each of the left and right side part upper members 757, and a weld nut 759*g* is joined to a lower surface 759*f* of the lower member 759, corresponding to the bolt insertion hole 759*e* of the lower member 759. A sleeve member 759*h* is disposed between each of the left and right side part upper members 757 and the lower member 759.

The mount bracket 690 is fixedly fastened on the upper surface 757*d* of the rear end part 752*b* of each of the left and right side parts 752 of the second cross member 750 by the bolt 694*c* penetrating, from above of the middle fastening part 694, the bolt insertion hole 694*b*, the bolt insertion hole 757*e* of each of the left and right side part upper members 757, the sleeve member 759*h*, and the bolt insertion hole 759*e* of the lower member 759, and threadedly engaging with the weld nut 759*g*.

Also in the front and rear fastening parts 692 and 693, similar to the middle fastening part 694, the mount bracket 690 is fastened to the upper surface 714*a* of the subframe 710 with bolts 692*c* and 693*c*, a sleeve member, and a weld nut, respectively. Thus, the mount bracket 690 is fastened to the subframe 710.

Next, the structure related to the middle vehicle body attaching part X2 in the mount bracket 690 is described in detail.

The mount bracket 690 has, as the middle attaching part X2, the accommodating part 691 described above, a base part 695*a* disposed outward of the accommodating part 691, and a pillar part 695*b* provided so as to extend upwardly from the base part 695*a* and disposed outward and obliquely upward of the accommodating part 691.

The middle vehicle body attaching part X2 is connected to the accommodating part 691 through a connecting surface part 696 extending outwardly from an upper wall surface part 691*b* of the accommodating part 691. An outer end part 696*a* of the connecting surface part 696 constitutes the upper surface part of the base part 695*a*, and is connected to an intermediate part of the pillar part 695b in the height direction. An inner end part 696b of the connecting surface part 696 continues to the upper wall surface part 691b of the accommodating part 691.

The pillar part 695b is connected at its lower end part to an outer end part of the base part 695a. A bolt insertion hole 695d which penetrates the pillar part 695b in the up-and-down direction is formed in the pillar part 695b.

On the other hand, a bolt insertion hole 625b is formed in the rear part of the front straight part 621 of the frontside frame 620 and in the lower surface part 625a of the outer panel 625, and a weld nut 625c is joined to the upper surface of the lower surface part 625a of the outer panel 625, at a location corresponding to the bolt insertion hole 625b.

A bolt 695c which is inserted from below into the bolt insertion hole 695d of the pillar part 695b and the bolt insertion hole 625b of the outer panel 625 is threadedly engaged with the weld nut 625c, so that the middle vehicle body attaching part X2 of the mount bracket 690 is rigidly coupled to the lower surface of the frontside frame 620 without having a dumper element, such as a rubber bush, therebetween. Thus, the rigidity between the middle vehicle body attaching part X2 and the frontside frame 620 is increased.

Figure 28:
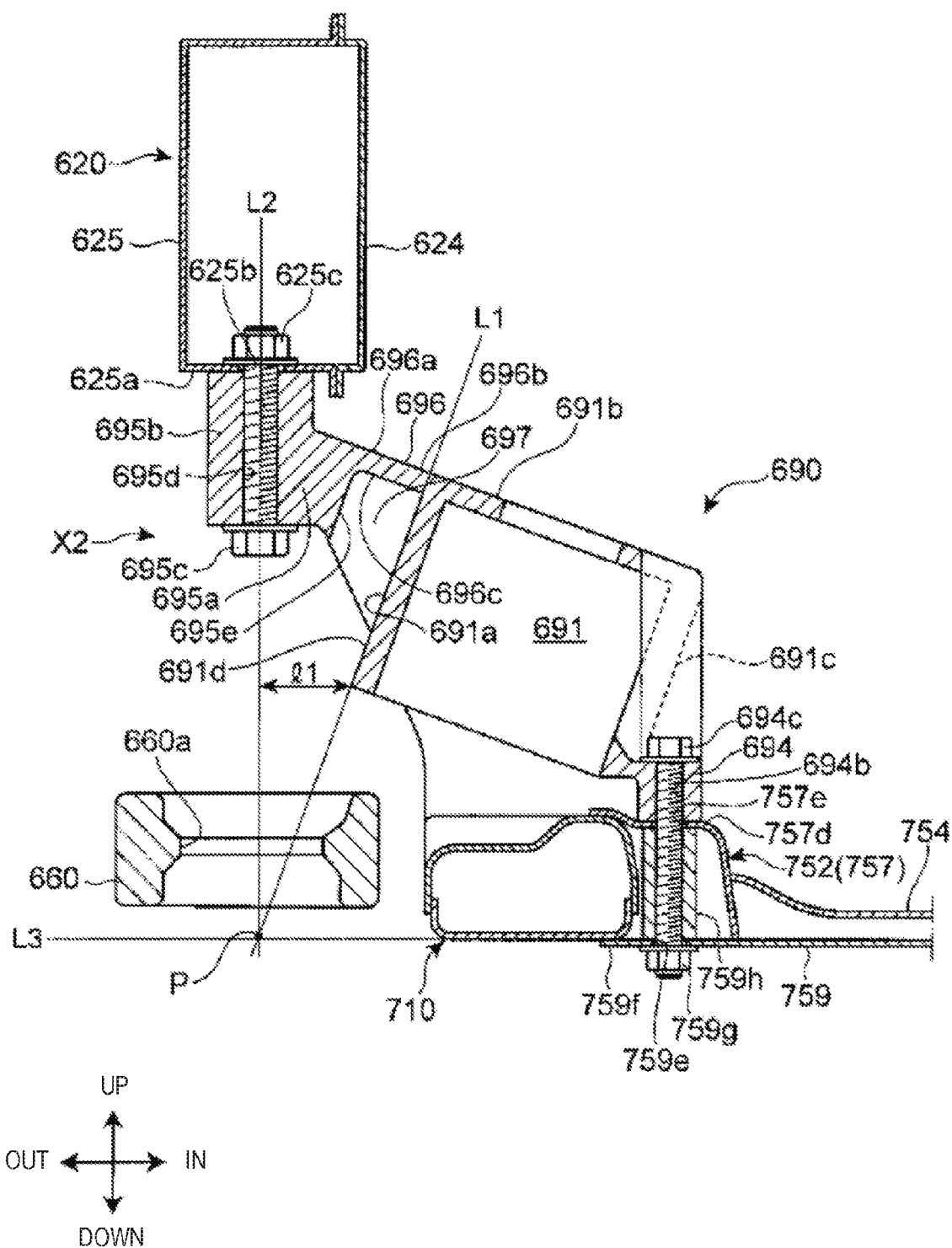
FIG. 28 is a cross-sectional view taken along a line E-E of FIG. 23.

Note that as illustrated in FIG. 23, the middle vehicle body attaching part X2 is provided at a location where it overlaps with the lower arm 660 in the plan view, but the lower arm 660 is provided with a hole part 660a at a location corresponding to the middle vehicle body attaching part X2 (see FIG. 28). Thus, when the subframe structure 700 is fastened to the frontside frame 620, a tool can be inserted into the hole part 660a of the lower arm, and tighten the bolt 695c of the middle vehicle body attaching part X2 from below.

Moreover, as illustrated in FIG. 28, the accommodating part 691 of the mount bracket 690 is disposed so that the axis of the outer circumferential part 691a inclines inwardly and upwardly. That is, the outer circumferential part 691a inclines so that an inner edge part 691c is located below an outer edge part 691d, when seen in the front-and-rear direction.

Figure 29:
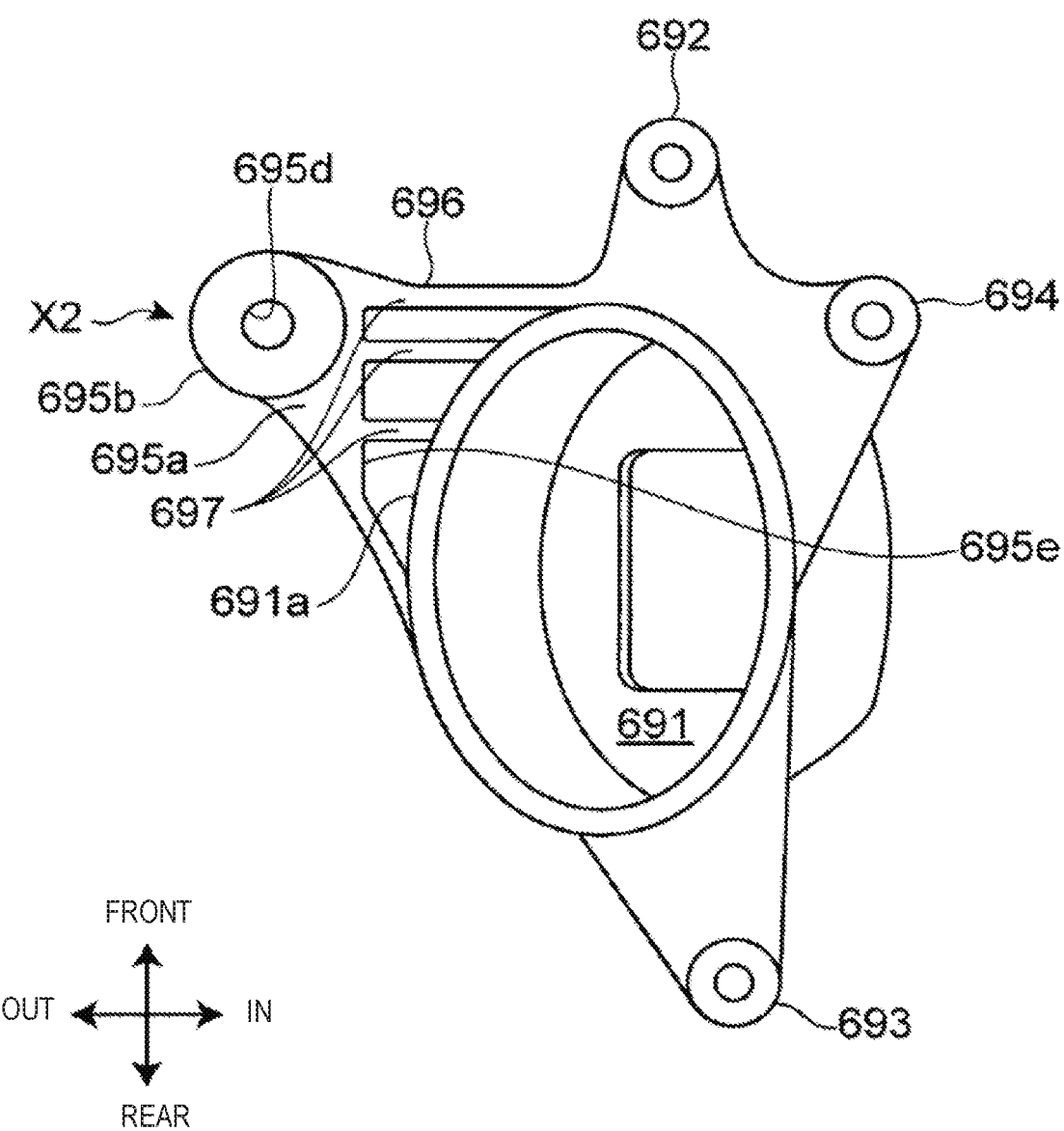
FIG. 29 is a bottom view of the power train mount in a vehicle-mounted state.
Figure 30:
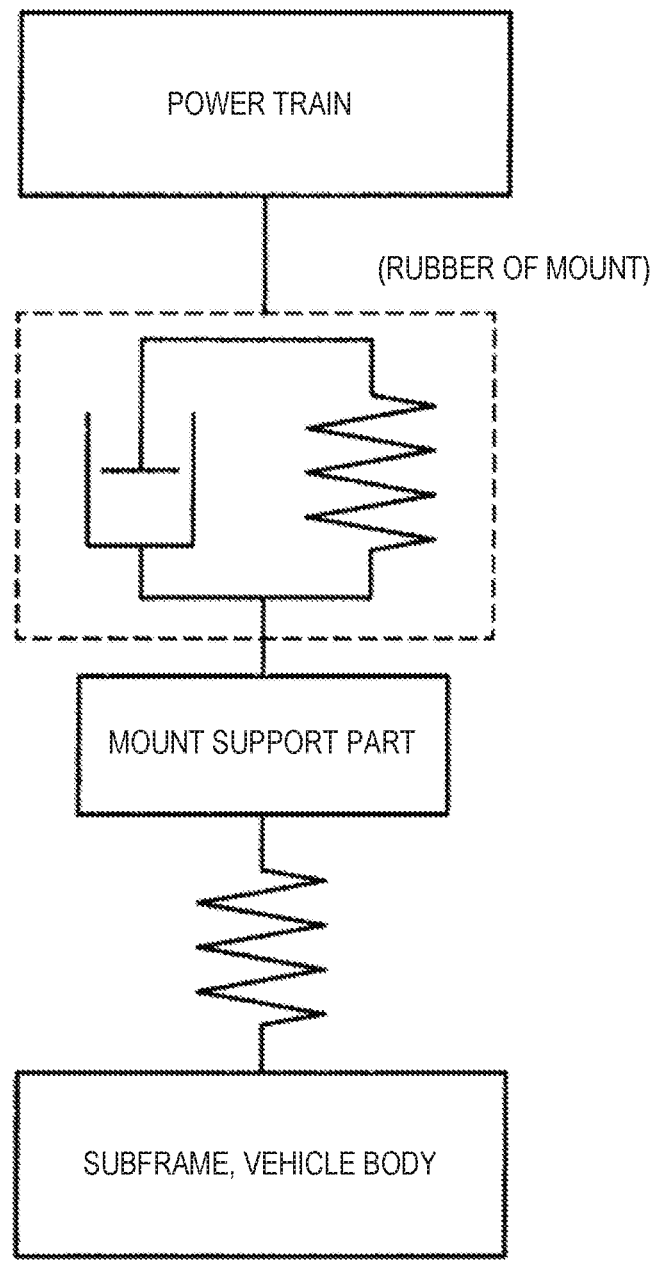
FIG. 30 is an explanatory view schematically illustrating a vibration transmitting path where vibration is inputted from the power train of a vehicle provided with the subframe structure of the present disclosure to the vehicle body through the power train mount.

Further, as illustrated in the bottom view of the mount bracket 690 in a state of FIG. 29 where the vehicle body is mounted, a plurality of ribs 697 as a reinforcement part which reinforces the connecting surface part 696 between the middle vehicle body attaching part X2 and the accommodating part 691 are provided between the middle vehicle body attaching part X2 and the accommodating part 691. Each rib 697 is formed by a plate part disposed along a plane perpendicular to the front-and-rear direction (see FIG. 28).

In more detail, the ribs 697 connect a side surface part 695e inward of the base part 695a, a lower surface 696c of the connecting surface part 696, and the outer circumferential part 691a of the accommodating part 691 so as to connect the base part 695a which constitutes the middle vehicle body attaching part X2 to the accommodating part 691. Thus, the rigidity between the middle vehicle body attaching part X2 and the accommodating part 691 is increased.

Moreover, as illustrated in FIG. 28, the ribs 697 are provided so as to extend in the up-and-down direction along the side surface part 695e inward of the base part 695a and the outer circumferential part 691a of the accommodating part 691, and lower edge parts of the ribs 697 are formed so as to extend obliquely upward from the outer circumferential part 691a of the accommodating part 691 to the side surface part 695e inward of the base part 695a. Thus, it is easy for the vibration inputted into the accommodating part 691 from the power train 604 to be transmitted to the pillar part 695b located obliquely upward of the accommodating part 691 via the plurality of ribs 697 and the base part 695a.

As illustrated in FIGS. 28 and 29, a spacing in the width direction between an outer end part of the outer circumferential part 691a of the accommodating part 691 and a centerline L2 of the bolt 695c is set so that it becomes smaller than a dimension in the width direction of the frontside frame 620, a dimension in the width direction of the suspension subframe 710, and a diameter of the accommodating part 691. Thus, the middle vehicle body attaching part X2 is disposed close to the accommodating part 691 in the width direction.

Moreover, as illustrated in FIG. 28, when seen in the front-and-rear direction, it is desirable that a straight line L1 extending along the outer edge part 691d and the centerline L2 of the bolt 695c of the middle vehicle body attaching part X2 are disposed so as to intersect with each other on a straight line L3 extending horizontally from the lower surface 715a of the subframe 710, or at a point P which is located upward of the straight line L3. Thus, compared with a case where the straight line L1 and the centerline L2 intersect with each other at a point below the lower surface 715a of the subframe 710, the accommodating part 691 and the vehicle body attaching part X2 can be disposed closer to each other in the width direction.

As described above, the middle vehicle body attaching part X2 is disposed close to the accommodating part 691 in the width direction. Particularly, as illustrated in the bottom view of FIG. 29, the side surface part 695e inward of the base part 695a in the middle vehicle body attaching part X2 is adjacent to the outer circumferential part 691a of the accommodating part 691 in the width direction. Thus, by the middle vehicle body attaching part X2 which is disposed adjacent to the accommodating part 691, and the ribs 697, the accommodating part 691 is effectively reinforced.

Also in the third embodiment, the body part 711 of the subframe 710 is fixed to the frontside frame 620 through the mount bracket 690. Therefore, the vibration of the power train 604 which cannot be absorbed by the mount can be transmitted to the vehicle body, without being transmitted through the body part 711 from the mount bracket 690.

Moreover, in the mount bracket 690, the vibration transmitting path from the accommodating part 691 to the vehicle body attaching part X2 which is adjacent to the accommodating part 691 is formed very short, and the rigidity is increased by the ribs 697. Therefore, the vibration transmitting path from the accommodating part 691 of the mount bracket 690 to the vehicle body attaching part X2 can demonstrate the vibration characteristic close to a rigid body as a whole. As a result, by the mount demonstrating the desired damping characteristic, the vibration of the power train 604 can be effectively reduced.

Moreover, the middle vehicle body attaching part X2 and the middle fastening part 694 are disposed over the subframe 710 in the width direction. Since the middle vehicle body attaching part X2 and the middle fastening part 694 are provided so as to have a large offset in the width direction, the deformation of the mount bracket 690 inwardly in the width direction can be suppressed.

Moreover, since the mount bracket 690 is fixed not only to the subframe 710 but also to the second cross member 750, the mount bracket 690 can be supported by the large area in the width direction. Thus, when the subframe 710 and the mount bracket 690 are separately provided, a displacement of the mount bracket 690 leaning inwardly is suppressed.

The present disclosure is not limited only to the structures of the embodiments described above, but may be formed as various other embodiments.

INDUSTRIAL APPLICABILITY

As described above, according to the present disclosure, since the vibration of the power train can be reduced more effectively, while improving the PT mount function of the subframe and the impact absorbing function during the impact-load input from forward of the vehicle body, and while reducing the vehicle weight and the number of components, the subframe structure may be used suitably in the field of manufacturing industry of the vehicle body.

DESCRIPTION OF REFERENCE CHARACTERS

1 Frontside Frame (Vehicle Body Structure of Vehicle)
2 Power Train
10 Subframe Structure
12 Extension Frame
20 Subframe
20A Body Part
32 Mount Support Part
33 Accommodating Part
33s Accommodation Space (Inside)
36 PT Mount
39 Protrusion Piece for Attaching PT Bracket (Connecting Part of PT-side Bracket)
51a, 51b Reinforcement Rib (Reinforcement Part)
51a Reinforcement Rib Extending in Up-and-down Direction (Rib Extending in Up-and-down Direction)
72 Middle Vehicle Body Attaching Part (Vehicle Body Attaching Part)
201 PT-side Bracket
500 Subframe Structure
501 Frontside Frame (Vehicle Body Structure of Vehicle)
502 Engine (Power Train)
505 Subframe
506 Extension Frame (Load Absorbing Member)
542 Compression Lower Arm (Suspension Link)
550 Body Part
555 Support Part
552c Rear Vehicle Body Attaching Part
557b Second Vehicle Body Attaching Part
559 Mount Receiving Part (Mount Support Part)
a Rotational Axis (Rotational Axis of Suspension Link)
b Line Segment Connecting Two Vehicle Body Attaching Parts
604 Power Train
620 Frontside Frame (Vehicle Body Structure of Vehicle)
700 Subframe Structure
710 Subframe
711 Body Part
690 Power Train Mount Bracket (Mount Support Part)
691 Accommodating Part
697 Rib (Reinforcement Part)
750 Second Cross Member (Cross Member)
X2 Middle Vehicle Body Attaching Part (Vehicle Body Attaching Part)

REFERENCE DOCUMENT OF CONVENTIONAL ART

Patent Document

[Patent Document 1] JP2015-058856A

What is claimed is:

1. A subframe structure, comprising:
   a subframe disposed below a vehicle body structure of a vehicle; and
   an extension frame extending forward from the subframe and configured to absorb an impact load from forward of a vehicle body,
   wherein the subframe has a body part extending in a vehicle front-and-rear direction and a mount support part supporting a power train through a mount, and
   wherein the body part is fixed to the vehicle body structure through the mount support part.

2. The subframe structure of claim 1, wherein the mount support part and the vehicle body structure are rigidly coupled, without having an attenuating element therebetween.

3. The subframe structure of claim 2, wherein the mount support part is provided with:
   an accommodating part configured to permit a connection of the mount with a bracket provided to a power train side and accommodate the mount therein from below;
   a vehicle body attaching part extending upward from near the accommodating part; and
   a reinforcement part disposed between the accommodating part and the vehicle body attaching part, and reinforcing between the accommodating part and the vehicle body attaching part.

4. The subframe structure of claim 3, wherein the reinforcement part is a rib connecting the vehicle body attaching part and a part of the accommodating part below the vehicle body attaching part, between the vehicle body attaching part and the part of the accommodating part.

5. The subframe structure of claim 4, wherein the vehicle body attaching part is disposed adjacent to the accommodating part in a bottom view.

6. The subframe structure of claim 3, wherein the vehicle body attaching part is disposed adjacent to the accommodating part in a bottom view.

7. The subframe structure of claim 1, wherein the mount support part is provided with:
   an accommodating part configured to permit a connection of the mount with a bracket provided to a power train side and accommodate the mount therein from below;
   a vehicle body attaching part extending upward from near the accommodating part; and
   a reinforcement part disposed between the accommodating part and the vehicle body attaching part, and reinforcing between the accommodating part and the vehicle body attaching part.

8. The subframe structure of claim 7, wherein the reinforcement part is a rib connecting the vehicle body attaching part and a part of the accommodating part below the vehicle body attaching part, between the vehicle body attaching part and the part of the accommodating part.

9. The subframe structure of claim 8, wherein the vehicle body attaching part is disposed adjacent to the accommodating part in a bottom view.

10. The subframe structure of claim 7, wherein the vehicle body attaching part is disposed adjacent to the accommodating part in a bottom view.

11. The subframe structure of claim 1, wherein the body part and the mount support part are separate parts,
- wherein a cross member extending inward from the body part in a vehicle width direction is coupled to the body part, and
- wherein the mount support part is fixed to the body part and the cross member.

12. The subframe structure of claim 1, wherein the subframe includes a pair of left and right subframes, each of the subframes further including:
- a link support part supporting a suspension link;
- a rear vehicle body attaching part fixing the body part to the vehicle body structure at a location rearward of the link support part; and
- a second vehicle body attaching part fixing the body part to the vehicle body structure at a location forward of the link support part,
- wherein the suspension link extends forward from the link support part, and
- wherein a rotational axis of the suspension link is provided so as to intersect with a line segment connecting between the rear vehicle body attaching part and the second vehicle body attaching part.

13. The subframe structure of claim 1, wherein the vehicle body structure includes a frontside frame extending in the vehicle front-and-rear direction above the extension frame and the body part, and
- wherein the subframe is fixed to the frontside frame.

* * * * *